(12) United States Patent  (10) Patent No.: US 8,090,517 B2
Kobayashi et al.  (45) Date of Patent: Jan. 3, 2012

(54) INTER-VEHICLE DISTANCE MAINTENANCE SUPPORTING SYSTEM AND METHOD

(75) Inventors: Yosuke Kobayashi, Yokohama (JP); Takeshi Sugano, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 430 days.

(21) Appl. No.: 12/337,420

(22) Filed: Dec. 17, 2008

(65) Prior Publication Data

US 2009/0164082 A1 Jun. 25, 2009

(30) Foreign Application Priority Data

Dec. 19, 2007 (JP) ................. 2007-327069
Dec. 19, 2007 (JP) ................. 2007-327070
Aug. 21, 2008 (JP) ................. 2008-212718

(51) Int. Cl.
 *G08G 1/16* (2006.01)
 *G06F 17/00* (2006.01)
(52) U.S. Cl. .......................... 701/94; 701/96
(58) Field of Classification Search ............. 342/71; 340/436
 See application file for complete search history.

(56) References Cited

U.S. PATENT DOCUMENTS 6,574,541 B2 * 6/2003 Katakura et al. ............... 701/54
7,570,156 B2 * 8/2009 Cicilloni et al. .............. 340/435
2003/0236624 A1 * 12/2003 Kimura et al. ................. 701/301
2004/0140143 A1 7/2004 Saeki et al.
2007/0213916 A1 * 9/2007 Sugano et al. ................... 701/96

FOREIGN PATENT DOCUMENTS

| EP | 1 346 892 A2 | | 9/2003 |
| EP | 1 375 234 A2 | | 1/2004 |
| EP | 1375234 A2 | * | 1/2004 |
| EP | 1 832 486 A2 | | 9/2007 |
| JP | 06251300 A | * | 9/1994 |
| JP | 2001171389 A | * | 6/2001 |
| JP | 2003048450 A | * | 2/2003 |
| JP | 2007022239 A | * | 2/2007 |
| JP | 2007-269307 A | | 10/2007 |

OTHER PUBLICATIONS

U.S. Appl. No. 12/337,397, filed Dec. 17, 2008, Kurata et al.

* cited by examiner

*Primary Examiner* — Thomas Black
*Assistant Examiner* — Sara Lewandroski
(74) *Attorney, Agent, or Firm* — Foley & Lardner LLP

(57) ABSTRACT

An inter-vehicle distance maintenance supporting system may include an operational reactive force generating device that generates an operational reactive force on a driving operational equipment based on a first inter-vehicle distance threshold. A driving operational equipment state detector detects an operational state of the driving operational equipment and acceleration intent of the driver. An engine controller controls an engine torque corresponding to the operational state of the driving operational equipment. An engine torque correcting device decreases the engine torque before the operational reactive force is generated. The decrease correction is suppressed when the inter-vehicle distance is greater than a second inter-vehicle distance threshold that is larger than the first inter-vehicle distance, and the driving operational equipment state detector detects the acceleration intent of the driver.

23 Claims, 34 Drawing Sheets

SCENARIO WHEN PRECEDING VEHICLE IS OUT OF SIGHT

SCENE WHEN PRECEDING
VEHICLE IS OUT OF SIGHT
(WITH DELAY PROCESS)

$$\alpha = [-\frac{D0}{2} - \frac{D1}{2}, \frac{D0}{2} + \frac{D1}{2}]$$

INTER-VEHICLE DISTANCE MAINTENANCE SUPPORTING SYSTEM AND METHOD

CROSS-REFERENCE TO RELATED APPLICATIONS

This application claims priority from Japanese Patent Application Serial No. 2007-327070, filed on Dec. 19, 2007, Japanese Patent Application Serial No. 2007-327069, filed on Dec. 19, 2007, and Japanese Patent Application Serial No. 2008-212718, filed Aug. 21, 2008, each of which is incorporated herein by reference in its entirety.

TECHNICAL FIELD

The present invention pertains to a supporting technology for maintaining inter-vehicle distance.

BACKGROUND

Japanese Kokai Patent Application No. 2007-269307 disclosed related technology pertaining to a change in an operational reactive force of an accelerator pedal corresponding to an inter-vehicle distance with a preceding vehicle. According to the device disclosed in said related technology, by detecting the inter-vehicle distance with the preceding vehicle and increasing the reactive force of the accelerator pedal in accordance with a decrease in the inter-vehicle distance, the driver is alerted. Then, based on a detected running state of the host vehicle, the relationship is corrected so that the driving torque of the host vehicle is decreased with respect to the operational quantity of the accelerator pedal such that the operational reactive force of the accelerator pedal can be more easily noticed by the driver. Consequently, the operational quantity required of the driver to depress the accelerator pedal to maintain the vehicle speed is increased. As a result, the reactive force applied to the accelerator pedal can be actively noticed by the driver. Then, when the preceding vehicle leaves, or the preceding vehicle changes lanes so that it is no longer ahead of the host vehicle, and there is no need for a decrease correction for the output level of the engine torque, the relationship of the engine torque generation quantity to the accelerator pedal depression quantity is reset to normal characteristics.

SUMMARY

Disclosed herein is a inter-vehicle distance maintenance supporting system for a host vehicle that provides an improved support running of a host vehicle. According to one embodiment of the present invention, an inter-vehicle distance maintenance supporting system may include an obstacle detector configured to detect a state of an obstacle located ahead of the host vehicle, a first inter-vehicle distance threshold computing device configured to compute a first inter-vehicle distance threshold based on the state of the obstacle detected with said obstacle detector, a driving operational equipment configured to operate the host vehicle via input from a driver of the host vehicle, an operational reactive force generating device, in communication with said driving operational equipment, configured to generate an operational reactive force for said driving operational equipment based on said first inter-vehicle distance threshold, a second inter-vehicle distance threshold computing device configured to compute a second inter-vehicle distance threshold with a value larger than said first inter-vehicle distance threshold based on the state of the obstacle detected by said obstacle detector, a driving operational equipment state detector, in communication with said driving operational equipment, configured to detect an operational state of said driving operational equipment and an acceleration intent of the driver, an engine controller configured to control an engine torque corresponding to the operational state of said driving operational equipment detected by said driving operational equipment state detector, and an engine torque correcting device configured to correct the engine torque such that the engine torque generated with respect to the operational state is decreased before the operational reactive force generating device generates the operational reactive force for said driving operational equipment, wherein said decrease correction is suppressed when a distance to the obstacle located ahead of the host vehicle is greater than said second inter-vehicle distance threshold and said driving operational equipment state detector detects the acceleration intent of the driver.

According to another embodiment of the present invention, an inter-vehicle distance maintenance supporting method for a host vehicle may include detecting a state of an obstacle located ahead of the host vehicle, computing a first inter-vehicle distance threshold based on said detected state of the obstacle, generating an operational reactive force for a driving operational equipment operated by a driver of the host vehicle based on said first inter-vehicle distance threshold, computing a second inter-vehicle distance threshold having a value larger than said first inter-vehicle distance threshold based on said detected state of the obstacle, detecting an operational state of said driving operational equipment and an acceleration intent of the driver, controlling an engine torque corresponding to the detected operational state of said driving operational equipment, correcting the engine torque such that the engine torque generated with respect to the operational state is decreased before the operational reactive force is generated for said driving operational equipment, and suppressing the decrease correction when a distance to the detected obstacle located ahead of the host vehicle is greater than said computed second inter-vehicle distance threshold, and the acceleration intent of the driver is detected.

According to another embodiment of the present invention, an inter-vehicle distance maintenance supporting system for a host vehicle may include an obstacle detecting means for detecting a state of an obstacle located ahead of the host vehicle, a first inter-vehicle distance threshold computing means for computing a first inter-vehicle distance threshold based on the state of the obstacle detected with said obstacle detecting means, a driving operational equipment means for operating the host vehicle by a driver of the host vehicle, an operational reactive force generating means for generating an operational reactive force for said driving operational equipment means based on said first inter-vehicle distance threshold, a second inter-vehicle distance threshold computing means for computing a second inter-vehicle distance threshold with a value larger than said first inter-vehicle distance threshold based on the state of the obstacle detected by said obstacle detecting means, a driving operational equipment state detecting means for detecting an operational state of said driving operational equipment means and an acceleration intent of the driver, an engine controlling means for controlling an engine torque corresponding to the operational state of said driving operational equipment means detected by said driving operational equipment state detecting means, and an engine torque correcting means for correcting the engine torque such that the engine torque generated with respect to the operational state is decreased before the operational reactive force generating means generates an operational reactive force on said driving operational equipment means, wherein said decrease correction is suppressed when a distance for the obstacle located ahead of the host vehicle is greater than said second inter-vehicle distance threshold and said driving operational equipment state detecting means detects the acceleration intent of the driver.

It is to be understood that both the foregoing general description and the following detailed descriptions are exemplary and explanatory only, and are not restrictive of the invention as claimed.

BRIEF DESCRIPTION OF DRAWINGS

These and other features, aspect, and advantages of the present invention will become apparent from the following description, appended claims, and the accompanying exemplary embodiments shown in the drawings, which are briefly described below.

DETAILED DESCRIPTION

In the device of said related technology, when the preceding vehicle leaves or the preceding vehicle changes lanes so that the preceding vehicle is no longer ahead of a host vehicle, although the depression quantity by the driver on the accelerator pedal is constant, the host vehicle may still accelerate so that the driver may have a feeling of discomfort. In the embodiments to be presented below, a system is provided to enable support for maintenance of an inter-vehicle distance matching the feeling of the driver so that such a feeling of discomfort can be eliminated.

Embodiment 1

Figure 1:
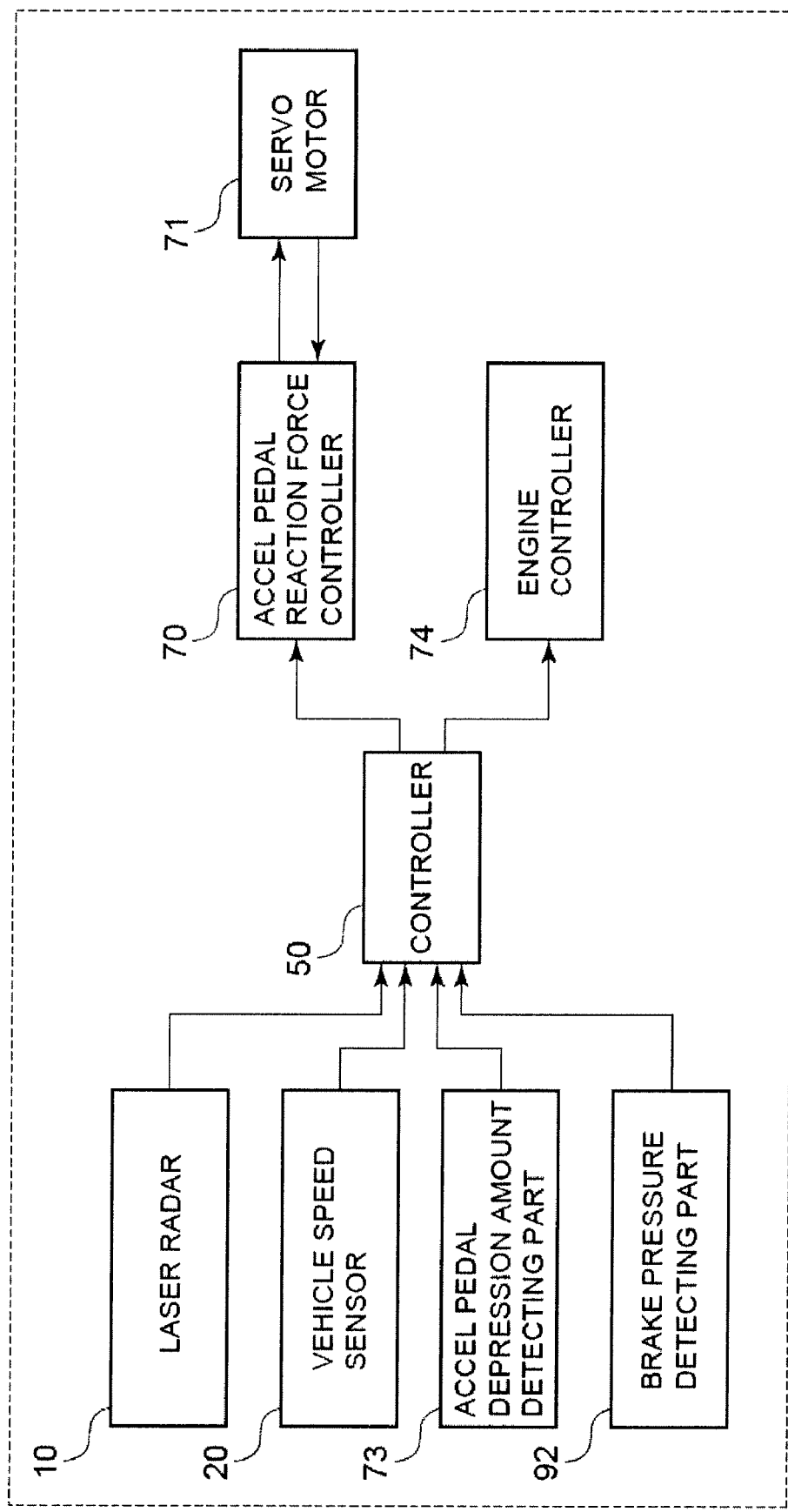
FIG. 1 is a system diagram illustrating the inter-vehicle distance maintenance supporting system 1 in Embodiment 1 of the present invention.
Figure 2:
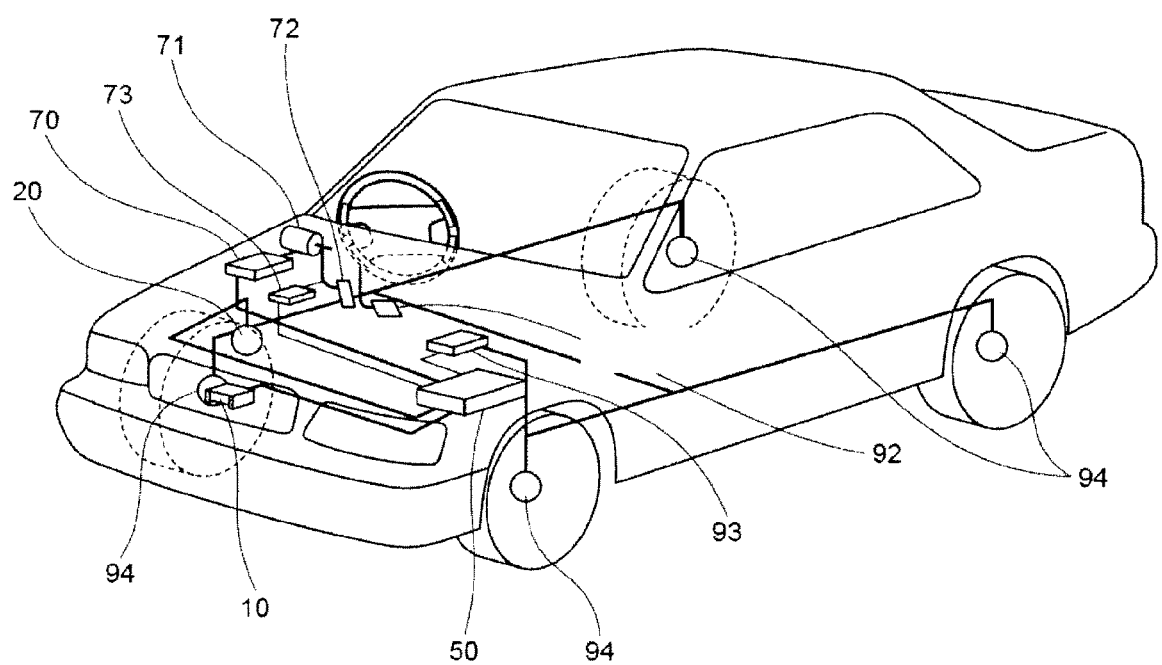
FIG. 2 is a diagram schematically illustrating a vehicle in which inter-vehicle distance maintenance supporting system 1 is carried.

In the following, an explanation will be given regarding Embodiment 1 of the inter-vehicle distance maintenance supporting device and inter-vehicle distance maintenance supporting method of the present invention. FIG. 1 is a system diagram illustrating inter-vehicle distance maintenance supporting system 1 in Embodiment 1 of the present invention. FIG. 2 is a diagram illustrating a vehicle in which inter-vehicle distance maintenance supporting system 1 is carried.

First, an inter-vehicle distance maintenance supporting system 1 will be explained. Here, laser radar 10 is installed on the front grille portion or bumper portion of the vehicle, and laser radar 10 emits IR light pulses that scan horizontally. Laser radar 10 measures reflected waves of the IR light pulses reflected from plural reflective objects (usually the rear end of a preceding vehicle) ahead of the host vehicle, and, from the arrival time of the reflected waves, laser radar 10 detects the inter-vehicle distance to the preceding vehicle and the direction of its presence. The detected inter-vehicle distance and the direction of presence are output to controller 50. The front region scanned by laser radar 10 is about ±60° with respect to the direction normal to the front of the host vehicle, and objects ahead of the host vehicle located in the region can be detected.

In this case, vehicle speed sensor 20 measures the rotational velocity of the wheels and the rotational velocity on the output side of the transmission, and outputs the detected vehicle speed to controller 50. Controller 50 comprises a CPU as well as a ROM, RAM and other CPU peripheral members. Controller 50 performs overall control of inter-vehicle distance maintenance supporting system 1. Controller 50 uses the vehicle speed input from vehicle speed sensor 20 and the distance information input from laser radar 10 to detect the state of obstacles surrounding the host vehicle, such as the relative distance and relative speed between the host vehicle and each obstacle as the running state with respect to the obstacle. Based on the obstacle state, controller 50 computes a first inter-vehicle distance threshold and a second inter-vehicle distance threshold, which will be explained later. Then, controller 50 controls as follows based on the computed first inter-vehicle distance threshold and second inter-vehicle distance threshold. In FIG. 2, 92 represents a brake pedal, 93 represents a brake force controller, and 94 represents a brake (braking device) set on each wheel.

Inter-vehicle distance maintenance supporting system 1 controls the reactive force generated when accelerator pedal 72 is depressed, so that the driver is notified about the surrounding environment, and the inter-vehicle distance maintenance supporting system thus can appropriately assist the driving operation of the driver, especially in maintaining an appropriate inter-vehicle distance with an obstacle ahead of the host vehicle. Also, by controlling the output level of the engine torque with respect to the depression quantity of accelerator pedal 72, in the case of a tracking mode of driving while tracking the obstacle ahead of the host vehicle, it is possible to reduce the operation performed by the driver in correcting the accelerator pedal 72 and thus to reduce the physical load on the driver, and, at the same time, since the depression quantity of accelerator pedal 72 is usually larger than that in the related art, by controlling the operational reactive force, it is easier for the driver to detect the operational reactive force generated on the accelerator pedal. In addition, if the output level of the engine torque with respect to the accelerator pedal depression quantity is reset at conventional characteristics (relationship), by means of resetting corresponding to the accelerator pedal depression operation of the driver, it is possible to reduce the feeling of discomfort caused by acceleration of the host vehicle although the depression quantity of accelerator pedal 72 is kept constant.

Then, controller 50 computes the first inter-vehicle distance threshold with respect to the obstacle ahead of the host vehicle, and, based on the computed first inter-vehicle distance threshold, computes the target accelerator pedal reactive force. Then, controller 50 outputs the computed target accelerator pedal reactive force to accelerator pedal reactive force controller 70.

Then, controller 50 computes the second inter-vehicle distance threshold with respect to the obstacle ahead of the host vehicle, and, based on the computed second inter-vehicle distance threshold and the depression quantity of the driver on accelerator pedal 72, computes the target accelerator pedal opening. Also, based on the depression quantity of the driver on accelerator pedal 72 detected with accelerator pedal depression quantity detecting part 73, controller 50 judges whether a depression operation of accelerator pedal 72 has been performed. When the target accelerator pedal opening is reset to the accelerator pedal depression quantity by the driver, controller 50 outputs to engine controller 74 the results of the target accelerator pedal opening resetting treatment based on the result of judgment on yes/no of the accelerator pedal depression operation.

Corresponding to the target accelerator pedal reactive force, that is, the reactive force control quantity output from controller 50, accelerator pedal reactive force controller 70 controls the torque generated by servo motor 71 assembled in the link mechanism of the accelerator pedal. Servo motor 71 controls the generated reactive force corresponding to an instruction value (target accelerator pedal reactive force) from accelerator pedal reactive force controller 70, and servo motor 71 can control the depression force generated when the driver depresses accelerator pedal 72 as desired. Also, accelerator pedal depression quantity detecting part 73 is connected via a link mechanism to accelerator pedal 72. Accelerator pedal depression quantity detecting part 73 detects the depression quantity (operational quantity) of accelerator pedal 72 converted to the rotating angle of servo motor 71 via a link mechanism, and outputs it to controller 50.

Also, with regard to conventional accelerator pedal reactive force characteristics when the accelerator pedal reactive force is not controlled, for example, the setting is such that the accelerator pedal reactive force is higher when the operational quantity of accelerator pedal 72 is larger. Conventional accelerator pedal reactive force characteristics can be realized by means of, e.g., the elastic force of a torsion spring (not shown in the figure) set at the rotating center of accelerator pedal 72.

Engine controller 74 controls such that the generated engine torque corresponds to the target accelerator pedal opening output from controller 50. Engine controller 74 presets a relationship of the engine torque generation quantity corresponding to the accelerator pedal depression quantity. Here, engine controller 74 controls the engine torque by determining the engine torque generation quantity based on the target accelerator pedal opening output from controller 50 instead of the actual accelerator pedal depression quantity due to depression by the driver, and adjusting the degree of opening of, e.g., a throttle valve. That is, the target accelerator pedal opening is the control instruction value of the engine torque.

Figure 3:
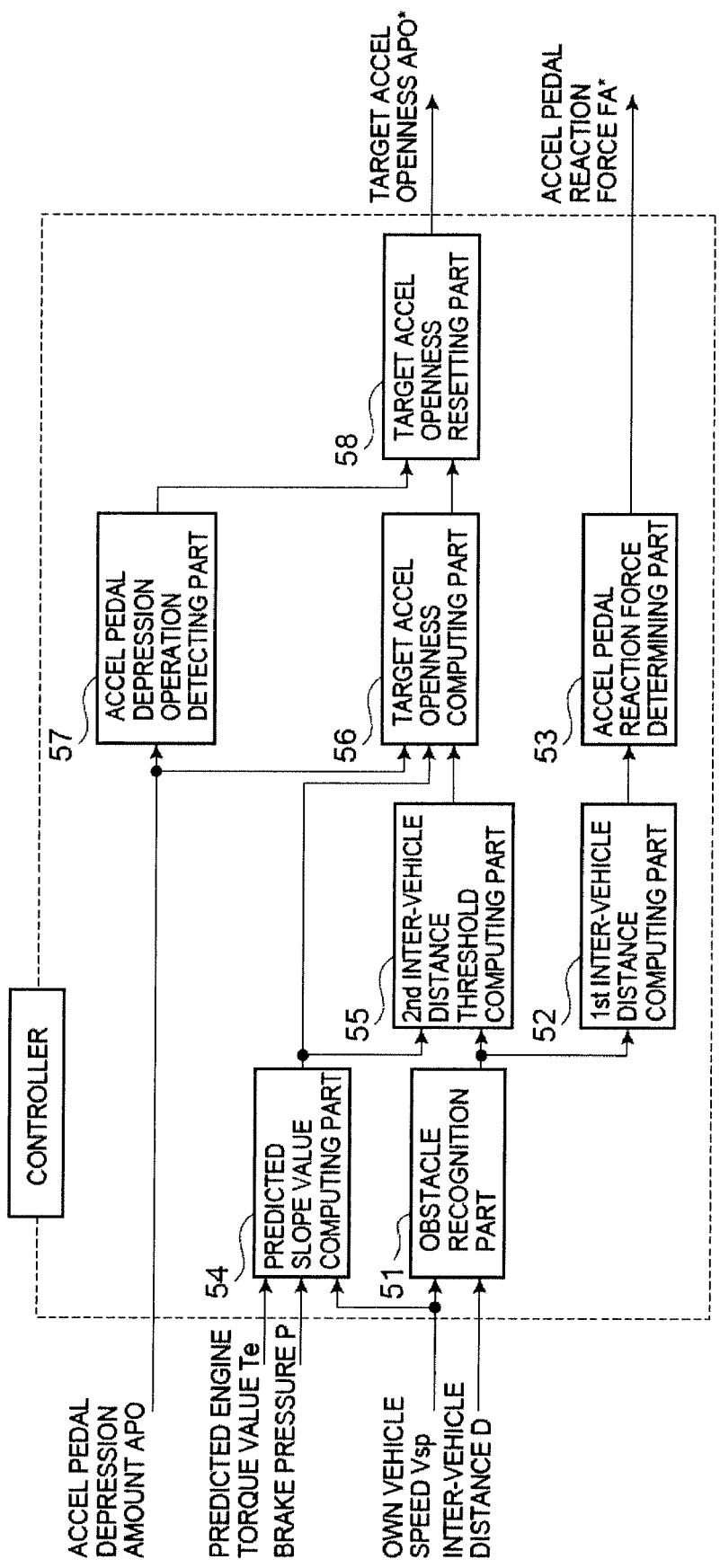
FIG. 3 is a block diagram illustrating an arrangement of controller 50.

FIG. 3 is a block diagram illustrating an arrangement of controller 50. For example, controller 50 may comprise the following parts depending on the software state of the CPU: obstacle recognition part 51, first inter-vehicle distance threshold computing part 52, accelerator pedal reactive force determining part 53, gradient determined value computing part 54, second inter-vehicle distance threshold computing part 55, target accelerator pedal opening computing part 56, accelerator pedal depression operation detecting part 57, and target accelerator pedal opening resetting part 58.

Obstacle recognition part 51 computes the inter-vehicle distance and relative speed with respect to the obstacle, such as a preceding vehicle, ahead of the host vehicle based on a signal input from laser radar 10. In addition, obstacle recognition part 51 detects the state of the obstacle ahead of the host vehicle from the inter-vehicle distance, the relative speed, and the vehicle speed input from vehicle speed sensor 20. First inter-vehicle distance threshold computing part 52 computes the first inter-vehicle distance threshold with respect to the obstacle ahead of the host vehicle based on the state of the obstacle input from obstacle recognition part 51. Based on the first inter-vehicle distance threshold computed with first inter-vehicle distance threshold computing part 52 and the inter-vehicle distance input from obstacle recognition part 51, accelerator pedal reactive force determining part 53 determines the accelerator pedal reactive force applied on accelerator pedal 72.

Gradient determined value computing part 54 determines the gradient of the road on which the host vehicle runs from the brake pressure input from brake pressure detecting part 92, the determined value of the engine torque input from engine controller 74, and the vehicle speed input from vehicle speed sensor 20. Second inter-vehicle distance threshold computing part 55 computes the second inter-vehicle distance threshold with respect to the obstacle ahead of the host vehicle based on the state of the obstacle input from obstacle recognition part 51 and the gradient of the road on which the host vehicle runs input from gradient determined value computing part 54. Target accelerator pedal opening computing part 56 computes a target accelerator pedal opening for use as the control instruction value of the engine torque to be finally realized (final value of the target accelerator pedal opening) from the second inter-vehicle distance threshold computed with second inter-vehicle distance threshold computing part 55 and the accelerator pedal depression quantity input from accelerator pedal depression quantity detecting part 73.

From the accelerator pedal depression quantity input from accelerator pedal depression quantity detecting part 73, accelerator pedal depression operation detecting part 57 detects the accelerator pedal depression operation by the driver. Based on the detection result of accelerator pedal depression operation detecting part 57, target accelerator pedal opening resetting part 58 resets the final value of the target accelerator pedal opening computed with target accelerator pedal opening computing part 56, and re-computes the target accelerator pedal opening. This target accelerator pedal opening resetting part 58 is a characteristic feature of the present invention, and it will be explained in detail later.

Figure 4:
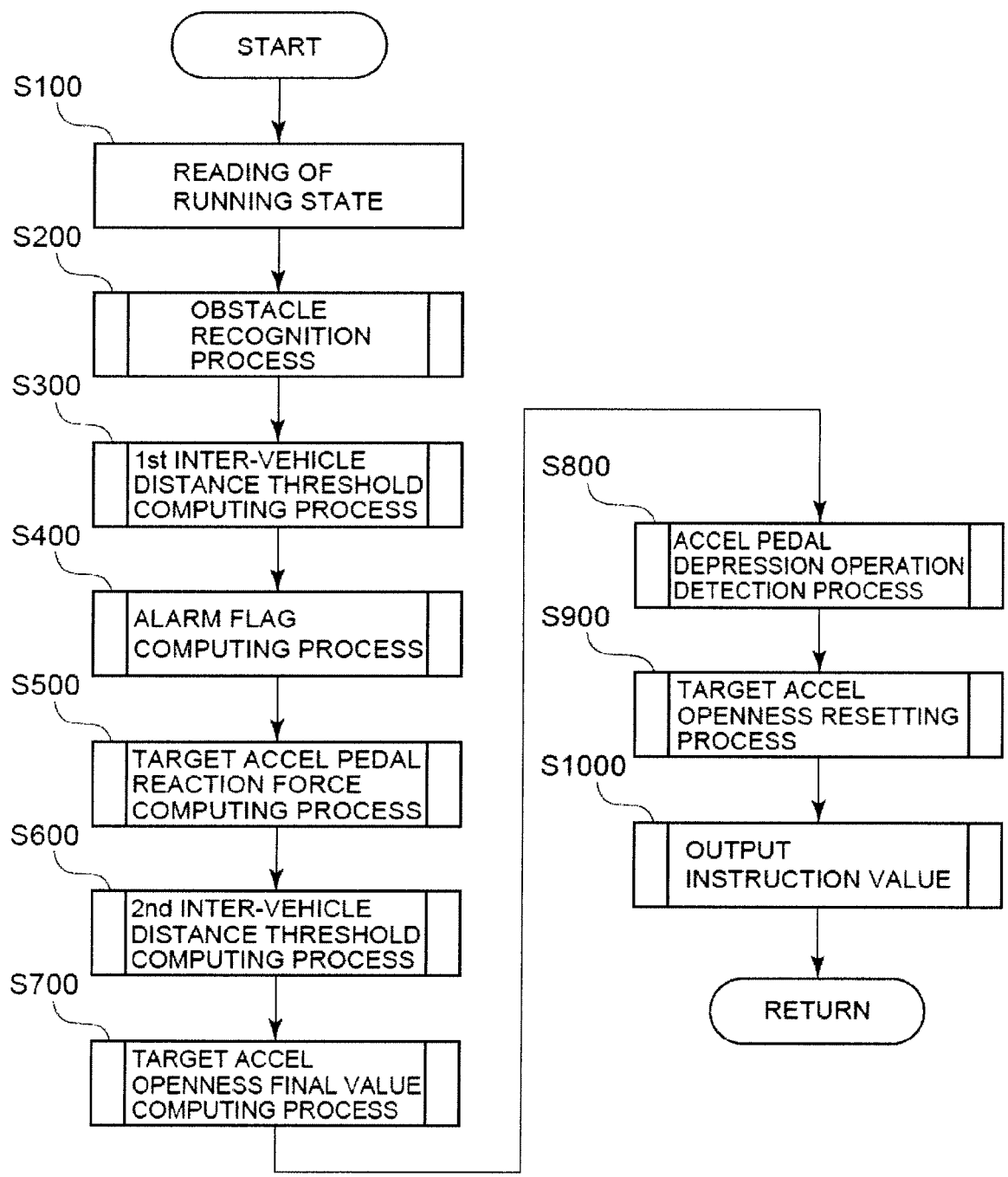
FIG. 4 is a flow chart illustrating a process of the inter-vehicle distance maintenance supporting control in controller 50.
Figure 5:
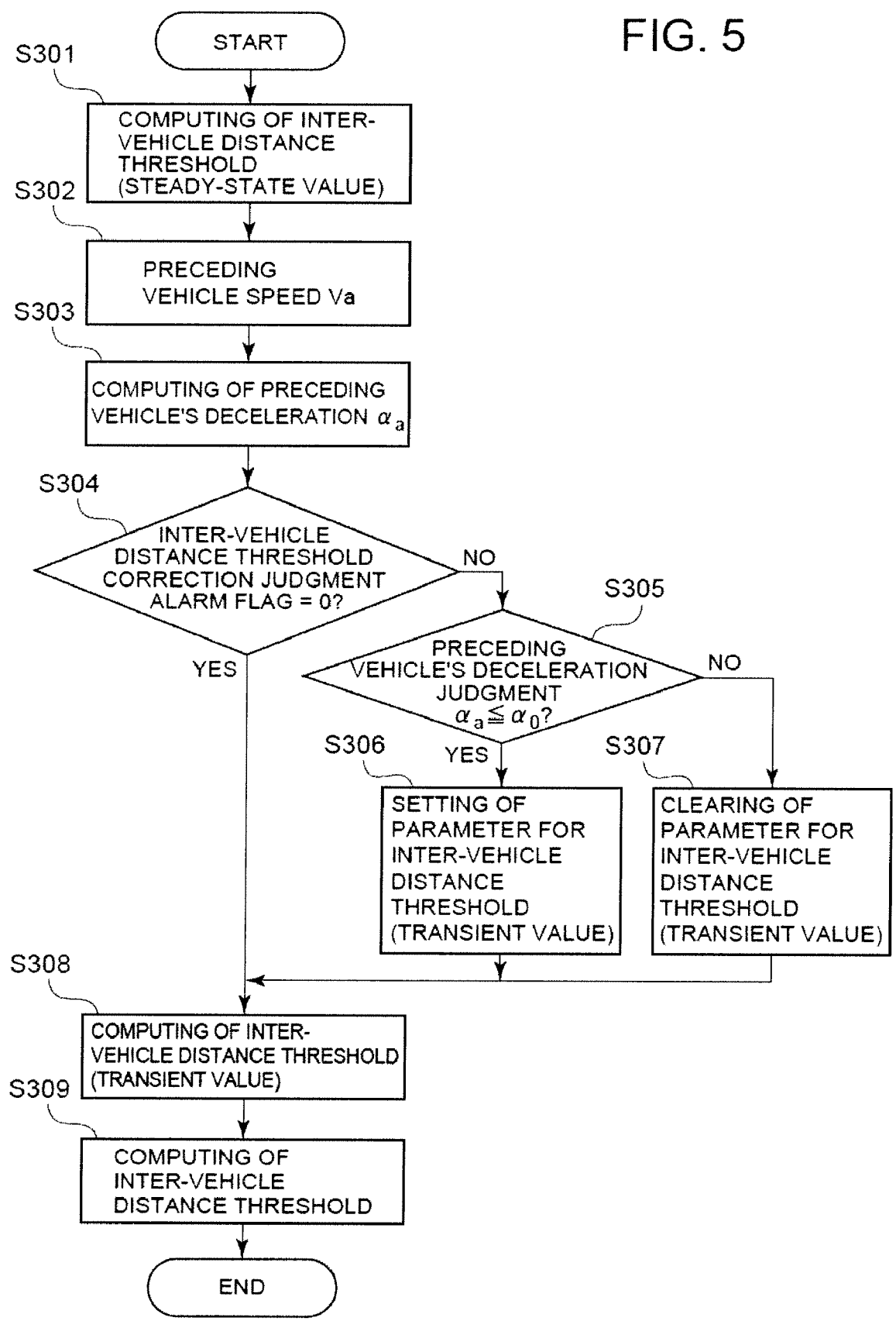
FIG. 5 is a flow chart illustrating a process for computing the first inter-vehicle distance threshold.

In the following, an explanation will be given in more detail regarding the operation of inter-vehicle distance maintenance supporting system 1 in this embodiment with reference to FIGS. 4-17. FIG. 4 is a flow chart illustrating a process of the inter-vehicle distance maintenance control in controller 50 in this embodiment. This treatment is performed consecutively once every prescribed interval, e.g., 50 msec.

First, in step S100, the running state is read. Here, the running state refers to information pertaining to the running state of the host vehicle including the state of the obstacle ahead of the host vehicle. Here, the inter-vehicle distance to the obstacle ahead of the host vehicle and the direction of presence of the preceding vehicle detected with laser radar 10 and the vehicle speed detected with vehicle speed sensor 20 are read.

In step S200, based on the running state data read and recognized in step S100, the state of the obstacle ahead of the host vehicle is recognized. Here, based on the relative position of the obstacle and its movement direction/movement speed with respect to the host vehicle detected in the preceding treatment period and before that and stored in the memory of controller 50, and the current running state obtained in step S100, the current relative position and the movement direction/movement speed of the obstacle with respect to the host vehicle are recognized. Then, the setting of the obstacle with respect to running of the host vehicle and its relative movement are recognized.

In step S300, the first inter-vehicle distance threshold with respect to the obstacle ahead of the host vehicle for use in controlling the accelerator pedal reactive force is computed. In the following, an explanation will be given regarding the treatment performed here with reference to the flow chart shown in FIG. 5.

In step S301, first, inter-vehicle distance threshold (steady item) $L^*h1$ is computed. Inter-vehicle distance threshold (steady item) $L^*h1$ is the item corresponding to the inter-vehicle distance threshold when it is assumed that the vehicle speed of the obstacle, such as a preceding vehicle, is constant in the formula for computing the first inter-vehicle distance threshold for the obstacle ahead of the host vehicle. In this embodiment, it is set corresponding to vehicle speed VSP and relative speed Vr with respect to the obstacle (preceding vehicle) recognized in steps S100 and S200.

$$L^*h1 = f(VSP, Vr)$$

In step S302, preceding vehicle speed Va is computed using formula (1) based on vehicle speed VSP and relative speed Vr.

$$Va = VSP + Vr \quad (1)$$

In step S303, the following formula is used to compute acceleration/deceleration $\alpha a$ of the preceding vehicle.

$$\alpha a = d(Va)/dt \quad (2)$$

In step S304, whether parameter Tr1 for the inter-vehicle distance threshold (transient item) for computing inter-vehicle distance threshold (transient item) $L^*r1$ has been computed/refreshed is judged. As the condition for computing/refreshing the parameter Tr1 for the inter-vehicle distance threshold (transient item), it is judged whether alarm flag Fw computed in step S400, which is to be explained later, has been set.

1) If an alarm flag is not set (Fw=OFF), the flow goes to step S305.

2) If an alarm flag is set (Fw=ON), the flow goes to step S308 without refreshing the parameter for the inter-vehicle distance threshold (transient item).

In step S305, judgment is made on deceleration of the preceding vehicle. In this application example, judgment is made on whether acceleration/deceleration $\alpha a$ of the preceding vehicle computed in step S303 is over a prescribed level.

1) If the acceleration/deceleration of the preceding vehicle is lower than a prescribed level ($\alpha a \leq \alpha 0$), preceding vehicle deceleration judgment flag Fdec_a is turned ON.

2) Otherwise ($\alpha a > \alpha 0$), preceding vehicle deceleration judgment flag Fdec_a is turned OFF.

Here, prescribed level $\alpha 0$ is a threshold for judging whether the preceding vehicle is decelerating, and it is preset at an appropriate value. Here, the acceleration/deceleration $\alpha a$ of the preceding vehicle and deceleration judgment threshold $\alpha 0$ are taken to have positive values in acceleration, and negative values in deceleration.

When it is judged in step S305 that the preceding vehicle is decelerating, in step S306, the following formula is used to compute and refresh parameter Tr1 for the inter-vehicle distance threshold (transient item).

$$Tr1=(L-L*h1)/Vr \quad (3)$$

As can be seen from formula 3, the parameter Tr1 for the inter-vehicle distance threshold (transient item) is for representing the portion (L−L*h1) corresponding to the tolerable distance of real inter-vehicle distance L with respect to inter-vehicle distance threshold (steady item) L*h1 at the time that the preceding vehicle starts decelerating as a relative speed coefficient time.

In step S307, when it is judged in step S305 that the preceding vehicle is not decelerating, parameter Tr1 for the inter-vehicle distance threshold (transient item) is cleared.

$$Tr1=0 \quad (4)$$

In step S308, the following formula is used to compute inter-vehicle distance threshold (transient item) L*r1.

$$L*r1=Tr1 \times Vr \quad (5)$$

Here, inter-vehicle distance threshold (transient item) L*r1 is an item corresponding to the inter-vehicle distance threshold when it is assumed that the obstacle ahead of the host vehicle, such as a preceding vehicle, is decelerating in the formula for computing the first inter-vehicle distance threshold.

In step S309, first inter-vehicle distance threshold L*1 is computed. In this embodiment, the following formula is used to compute it as the sum of the inter-vehicle distance threshold (steady item) L*h1 and the inter-vehicle distance threshold (transient item) L*r1.

$$L*1=L*h1+L*r1 \quad (6)$$

In step S400, the alarm flag is set/clear.
1) When L*1>L,
the alarm flag Fw is turned ON.
2) Otherwise (L*1≦L),
the alarm flag Fw is turned OFF.

Then, in step S500, target accelerator pedal reactive force FA* is determined based on first inter-vehicle distance threshold L*1. In order to compute target accelerator pedal reactive force FA*, first, difference (deviation in inter-vehicle distance) ΔL1 between first inter-vehicle distance threshold L*1 and actual inter-vehicle distance L is computed using the following formula.

$$\Delta L1 = L*1 - L \quad (7)$$

Then, from first inter-vehicle distance threshold L*1 and inter-vehicle distance deviation ΔL1, target accelerator pedal reactive force FA* is computed.

$$FA* = Kp \times \Delta L1 \quad (8)$$

Here, Kp represents a gain for computing the target accelerator pedal reactive force from inter-vehicle distance deviation ΔL1. Corresponding to target accelerator pedal reactive force FA* computed in step S500, accelerator pedal reactive force controller 70 controls the reactive force generated on accelerator pedal 72.

In step S600, second inter-vehicle distance threshold L*2 with respect to the obstacle is computed. Here, the second inter-vehicle distance threshold L*2 has a value larger than that of the first inter-vehicle distance threshold L*1 (L*1<L*2). In the following, an explanation will be given in more detail regarding the treatment in computing the second inter-vehicle distance threshold in step S600 with reference to FIGS. 6-10.

Figure 6:
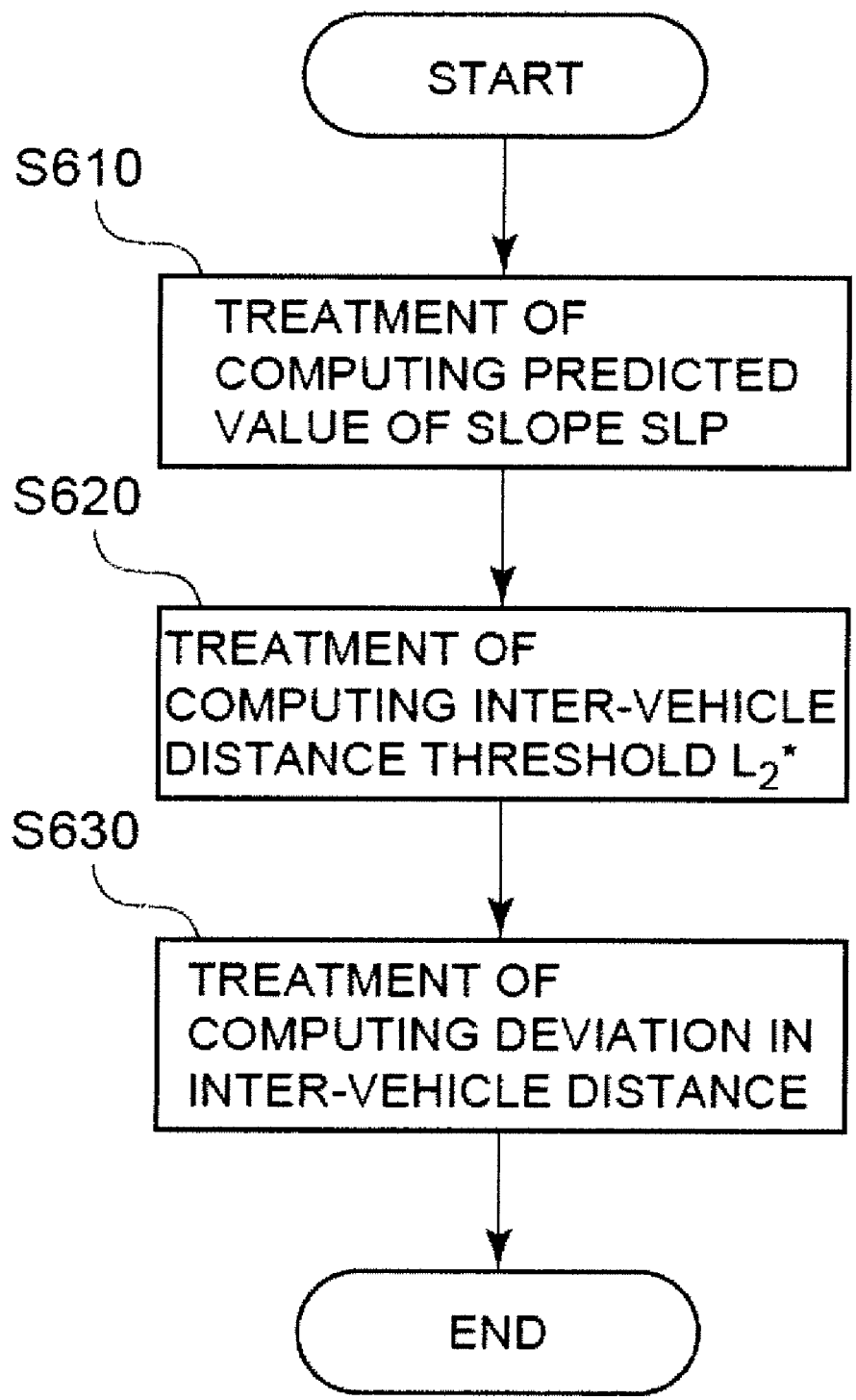
FIG. 6 is a flow chart illustrating a process for computing the second inter-vehicle distance threshold.

The treatment performed in step S600 is performed according to the flow chart shown in FIG. 6.

In step S610, the gradient of the road on which the host vehicle runs is determined.

First, if the torque amplification rate of the engine torque converter is Rt, the automatic transmission gear ratio is Rat, and the differential gear ratio is Rdef, the relationship between driving shaft torque Tw and engine torque Te can be represented by the following formula.

$$Tw = Rt Rat Rdef Te \quad (9)$$

Also, if the brake cylinder area is Ab, the rotor effective radius is Rb, and the pad frictional coefficient is μb, the relationship between brake hydraulic pressure instruction value Pbr and brake torque Thr is as in the following formula.

$$Tbr = 8 Ab Rb \mu b Pbr \quad (10)$$

In addition, aerodynamic resistance Fa and rotary resistance Fr acting on the host vehicle can be computed using the following formulas.

$$Fa = \mu a sv VSP2 \quad (11)$$

$$Fr = \mu r Mvg \quad (12)$$

Here, μa represents the aerodynamic resistivity, sv represents the front projection area, μr represents the rotary resistivity, Mv represents the weight of the vehicle, and g represents the gravity acceleration.

From the engine torque, the driving shaft torque due to the brake hydraulic pressure, as well as the aerodynamic resistance and the rotary resistance, the acceleration of the host vehicle is determined and compared with the actual acceleration, so that gradient SLP of the road on which the host vehicle runs can be determined using the following formula (13).

$$SLP = \{Tw - Tbr - Rw(Fa+Fr)\}/MvRw - s \cdot VSP \quad (13)$$

Here, s represents the Laplace operator, and Rw represents a coefficient used in computing the gradient.

In step S620, second inter-vehicle distance threshold L*2 is computed. In the following, an explanation will be given in more detail regarding the computation of the second inter-vehicle distance threshold performed in step S620 with reference FIGS. 7-9.

Figure 7:
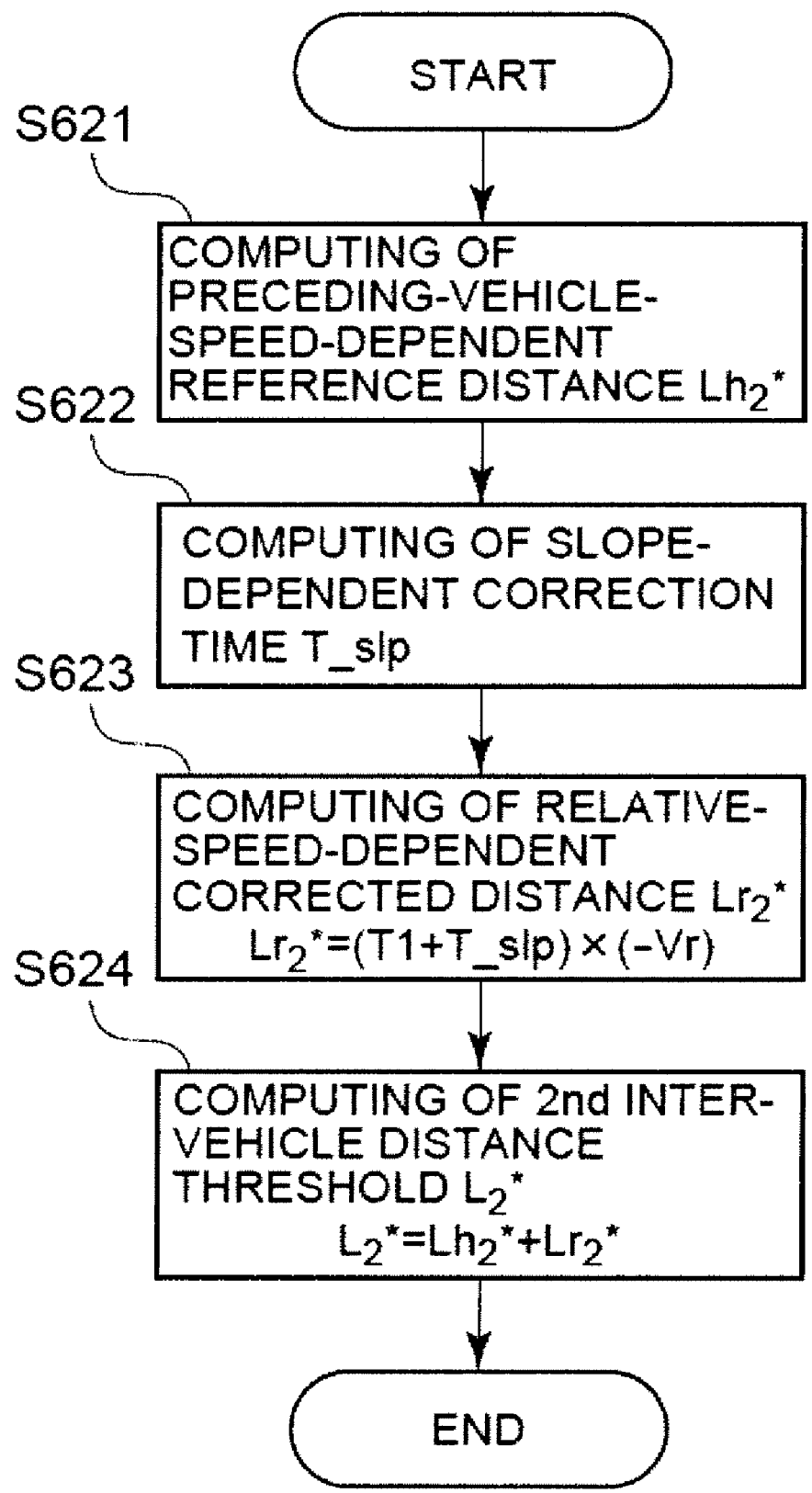
FIG. 7 is a flow chart further illustrating a process for computing the second inter-vehicle distance threshold.

The treatment of step S620 is executed according to the flow chart shown in FIG. 7.

Figure 8:
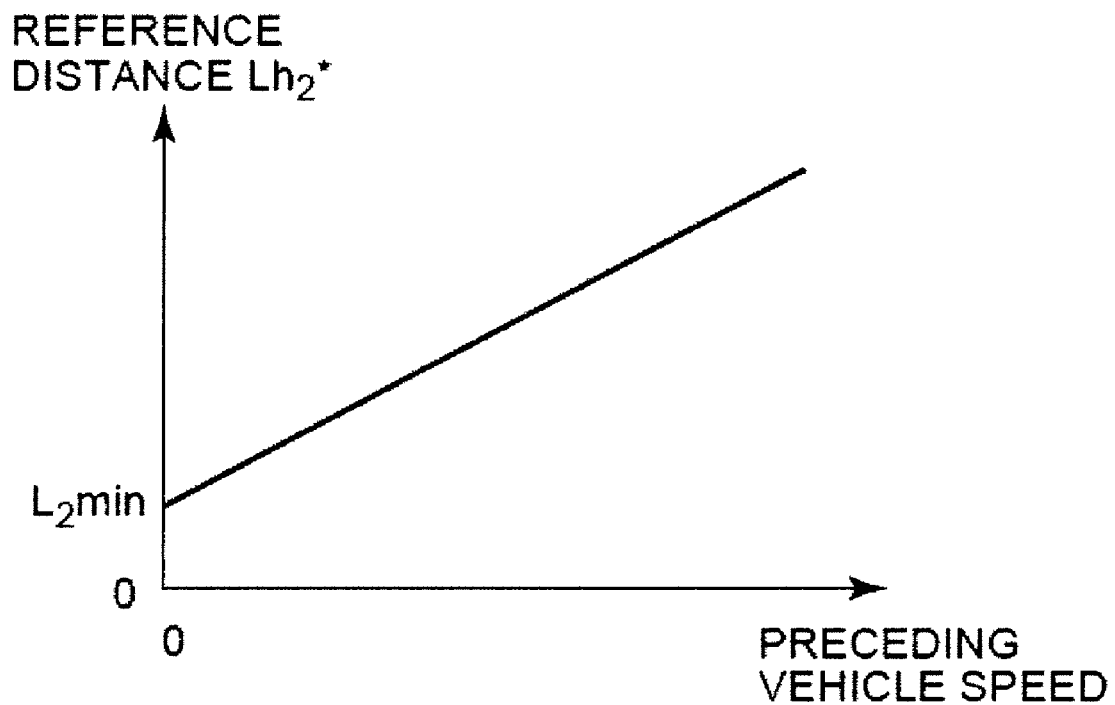
FIG. 8 is a diagram illustrating the relationship between the preceding vehicle speed and the preceding-vehicle-speed-depending reference distance.

First, in step S621, preceding-vehicle-speed-depending reference distance L*h2 is computed from the map shown in FIG. 8. As shown in FIG. 8, the preceding-vehicle-speed-depending reference distance is computed such that the higher the preceding vehicle speed Va, the greater the distance from which the output level of the engine torque is controlled with respect to the accelerator pedal depression quantity.

Figure 9:
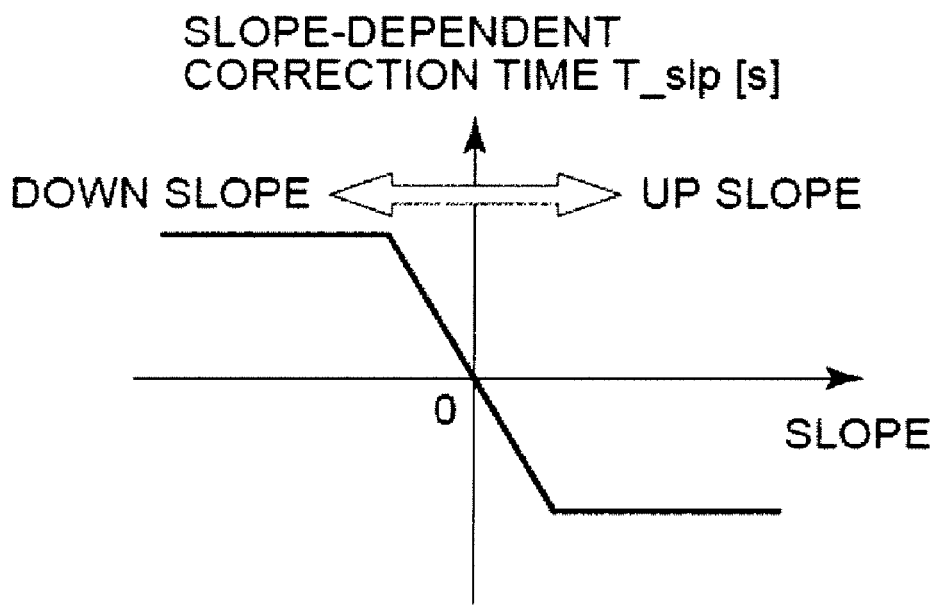
FIG. 9 is a diagram illustrating the relationship between the gradient of the road on which the host vehicle runs and the gradient-dependent correction time.

In step S622, gradient-depending correction time T_slp is computed from the map shown in FIG. 9. As shown in FIG. 9, if the gradient is positive, that is, if the vehicle runs up a slope, the gradient-depending correction time is set at a negative value. On the other hand, if the gradient is negative, that is, if the vehicle runs down a slope, the gradient-depending correction time is set at a positive value, and it is set such that the larger the absolute value of the gradient, the larger the absolute value of the gradient-depending correction time. Also, if the absolute value of the gradient is over a prescribed level, the absolute value of the gradient-depending correction time is fixed at a prescribed value. By multiplying relative velocity Vr with respect to the obstacle by the gradient-depending correction time T_slp, the preceding-vehicle-depending reference distance computed in step S621 is corrected. The treatment for correcting the preceding-vehicle-depending reference distance will be explained later.

In step S623, relative-speed-depending correction distance L*r2 is computed. From the preset reference time T1 and gradient-depending correction time T_slp computed in step S622, relative-speed-depending correction distance L*r2 is computed using the following formula.

$$L*r2=(T1+T\_slp)\cdot(-Vr) \quad (14)$$

In step S624, second inter-vehicle distance threshold L*2 is computed. From preceding-vehicle-speed-depending reference distance L*h2 computed in step S621 and relative-speed-depending correction distance L*r2, second inter-vehicle distance threshold L*2 is computed using the following formula.

$$L*2=L*h2+L*r2 \quad (15)$$

In step S630, deviation in the inter-vehicle distance is computed from actual inter-vehicle distance L and second inter-vehicle distance threshold L*2.

Figure 10:
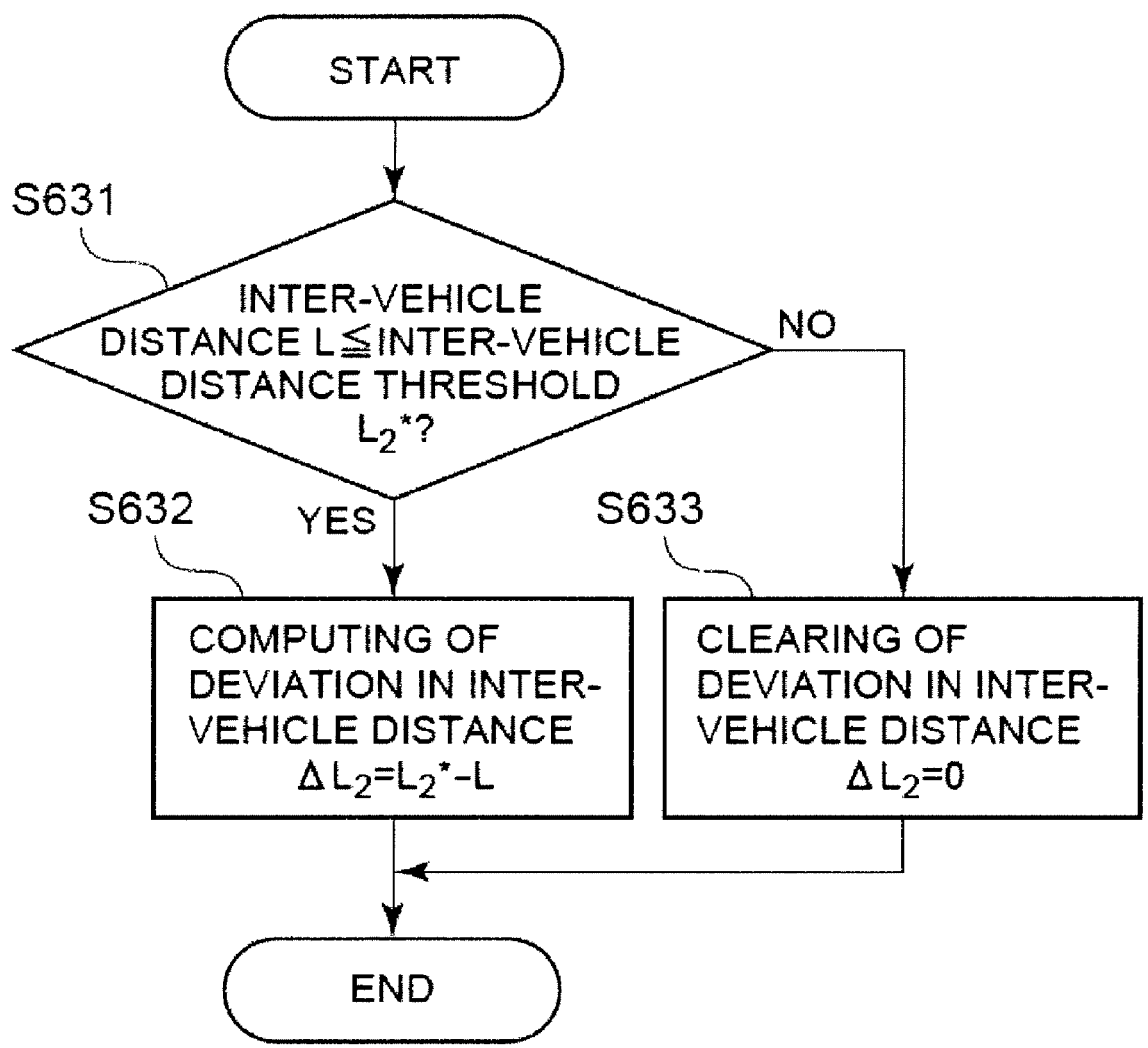
FIG. 10 is a flow chart illustrating a process for computing deviation in the inter-vehicle distance.

The treatment of step S630 is performed according to the flow chart shown in FIG. 10.

In step S631, judgment is made on whether the actual inter-vehicle distance L is less than second inter-vehicle distance threshold L*2. If YES, the flow goes to step S632, and inter-vehicle distance deviation ΔL2 is computed according to the following formula.

$$\Delta L2=L*2-L \quad (16)$$

On the other hand, if the judgment result is NO in step S631, the flow goes to step S633, and inter-vehicle distance deviation ΔL2 is cleared.

In step S700, from the second inter-vehicle distance threshold computed in step S600 as well as inter-vehicle distance deviation ΔL2, target accelerator pedal opening final value APO0* for controlling the output level of the engine torque with respect to accelerator pedal depression quantity APO by the driver is computed. In the following, an explanation will be given in more detail regarding the treatment for computing the final value of the target accelerator pedal opening performed in step S700 with reference to FIGS. 11-14.

Figure 11:
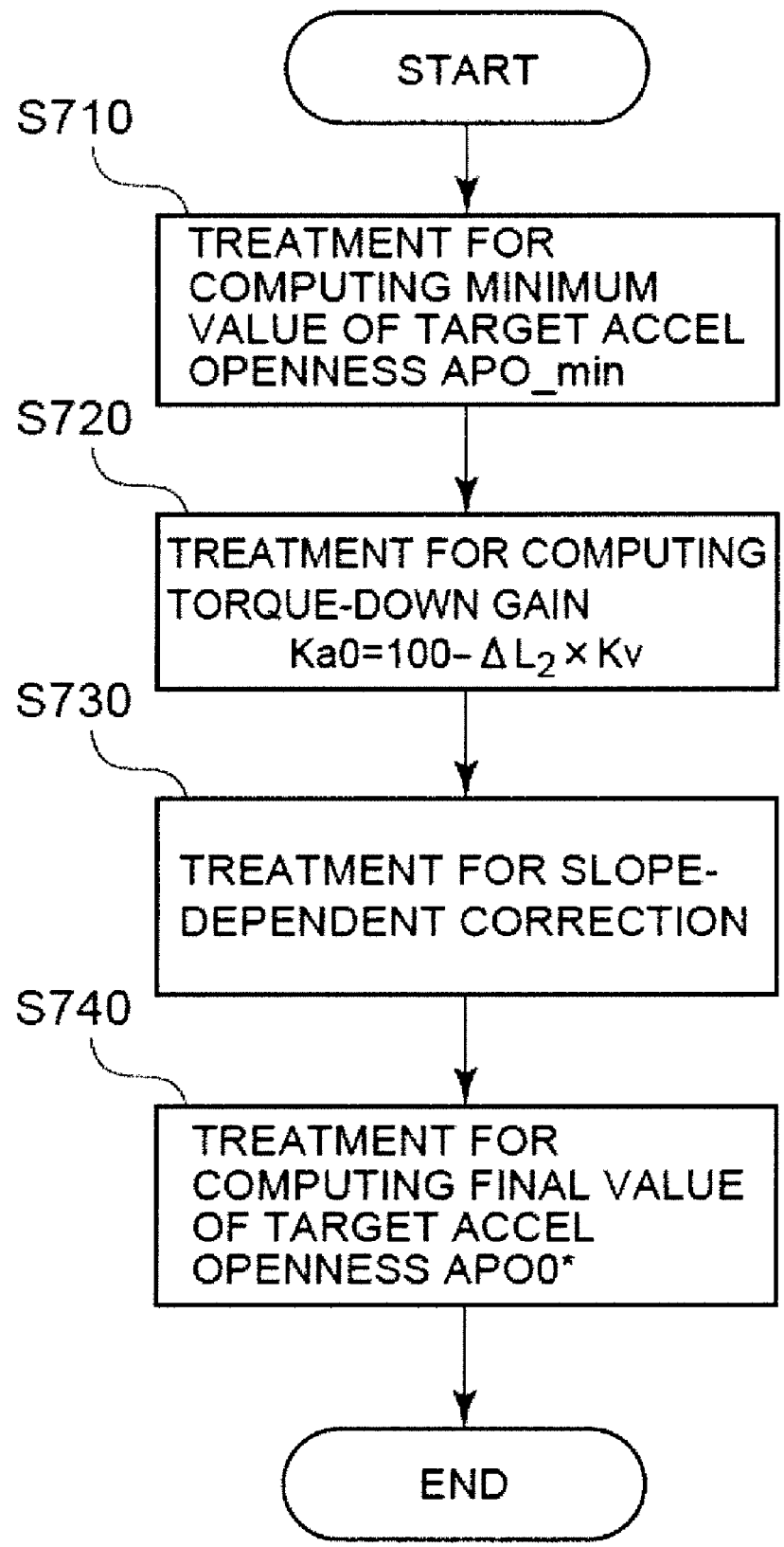
FIG. 11 is a flow chart illustrating a process for computing the final value of the target accelerator pedal opening.
Figure 12:
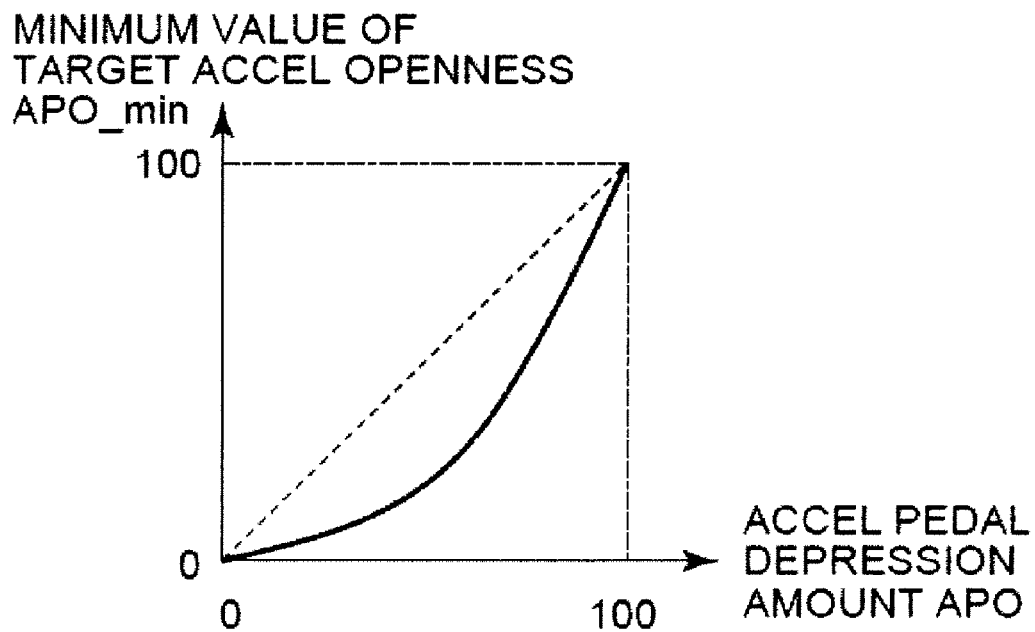
FIG. 12 is a diagram illustrating the relationship between the accelerator pedal depression quantity and the target accelerator pedal opening minimum value.

The treatment of step S700 is performed according to the flow chart shown in FIG. 11. In step S710, target accelerator pedal opening minimum value APO_min is computed from the map shown in FIG. 12. As shown in FIG. 12, the value is set such that it is determined uniquely with respect to accelerator pedal depression quantity APO, and, the larger the accelerator pedal depression quantity, the larger the target accelerator pedal opening minimum value APO_min.

In step S720, using the following formula, torque down gain Ka0 is computed from inter-vehicle distance deviation ΔL2 computed in step S630 and vehicle-speed-depending gain kv is determined separately.

$$Ka0=100-\Delta L2\times Kv \quad (17)$$

Figure 13:
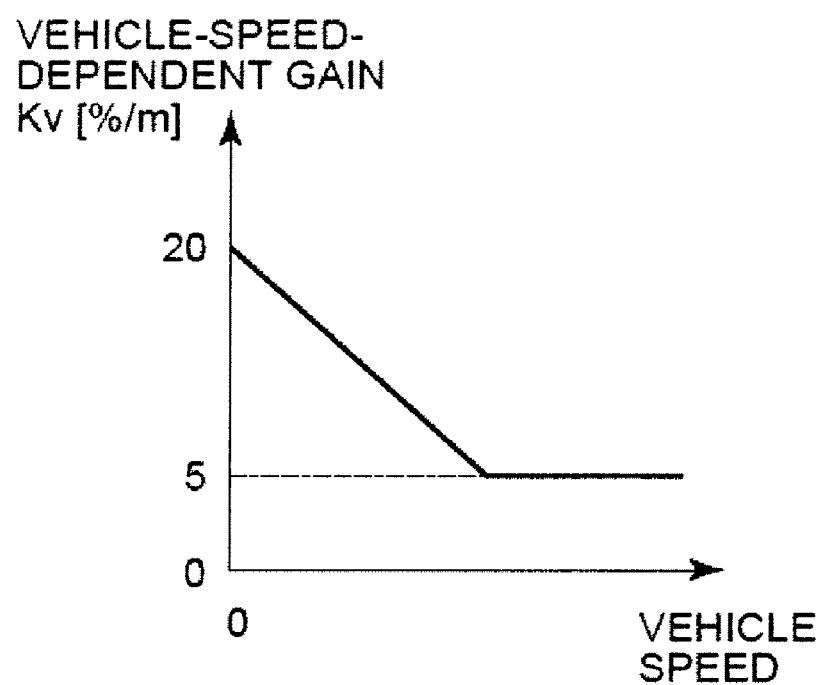
FIG. 13 is a diagram illustrating the relationship between the vehicle speed and the vehicle-speed-dependent gain.
Figure 14:
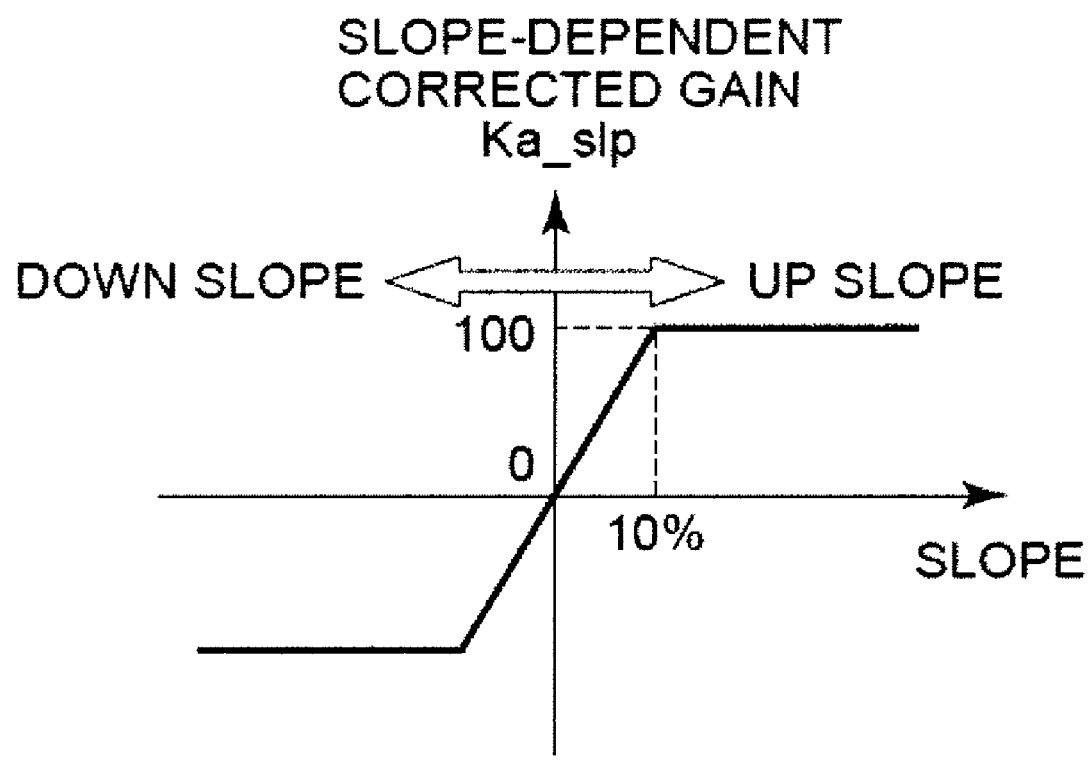
FIG. 14 is a diagram illustrating the relationship between the gradient of the road on which the host vehicle runs and the gradient-dependent corrected gain.
Figure 15:
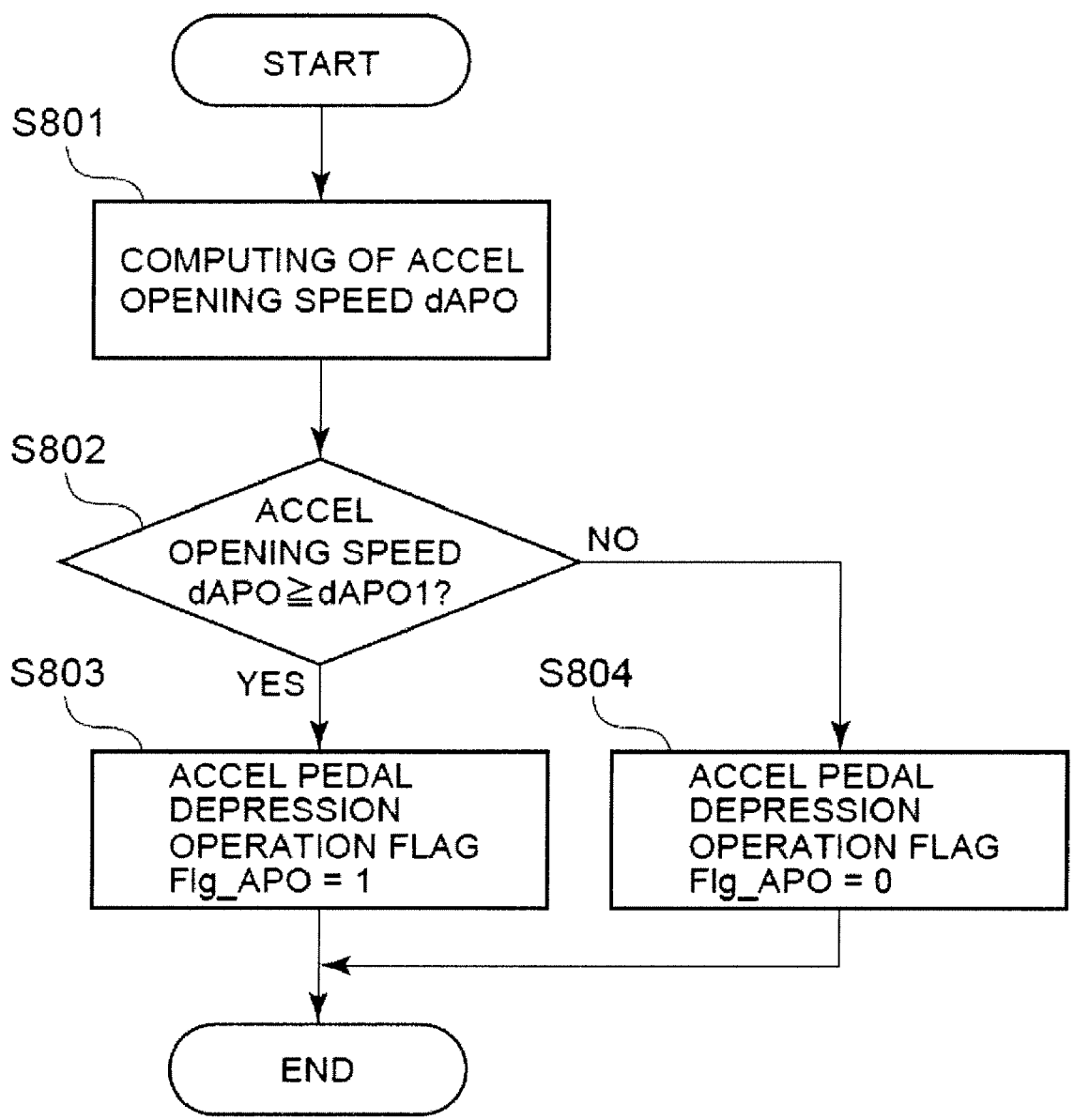
FIG. 15 is a flow chart illustrating a process for detecting the accelerator pedal depression operation.
Figure 16:
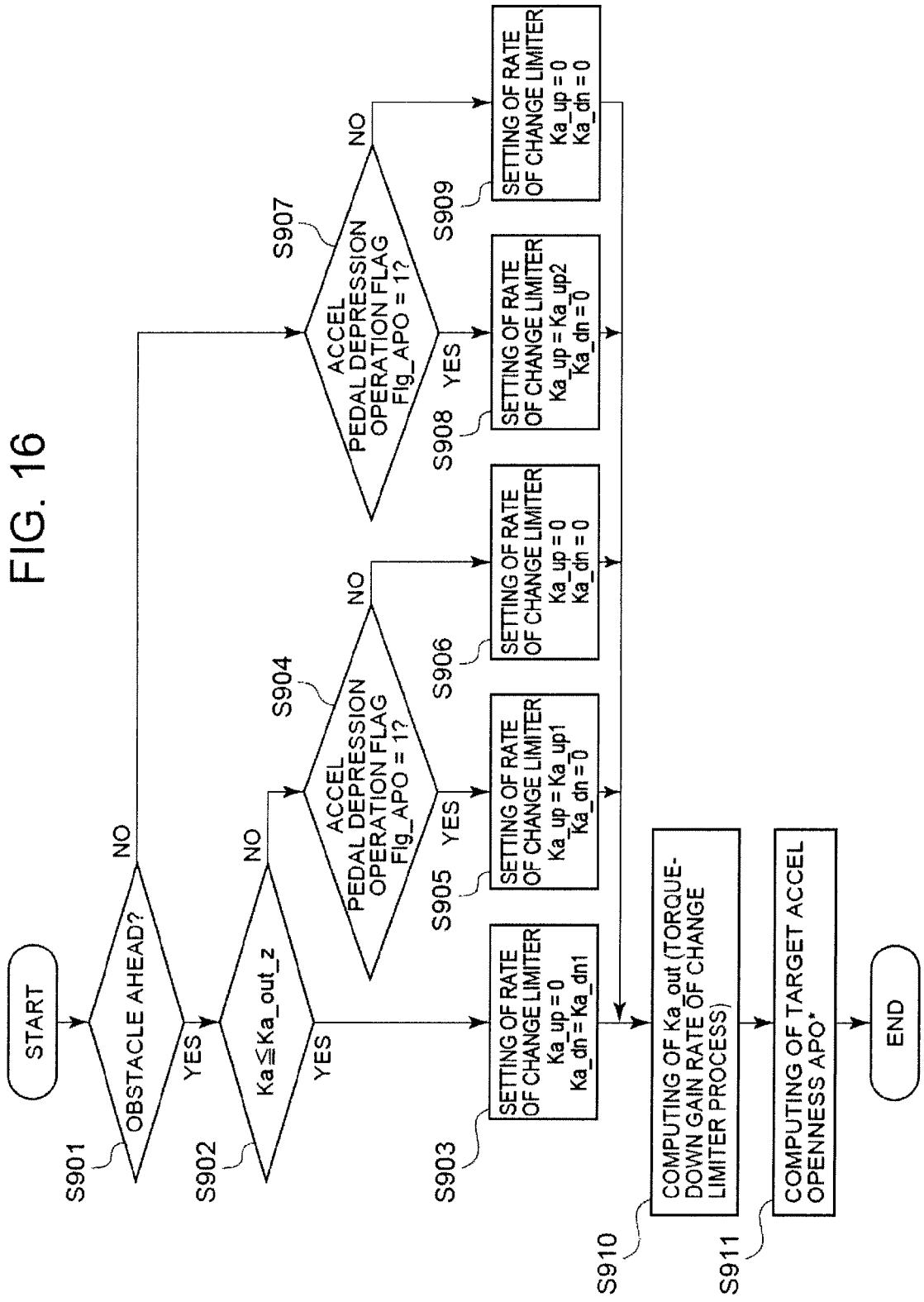
FIG. 16 is a flow chart illustrating a process for resetting the target accelerator pedal opening.

Here, vehicle-speed-depending gain Kv is the change in torque down gain Ka0 with respect to inter-vehicle distance deviation ΔL2, and it is computed from the map shown in FIG. 13. As shown in FIG. 13, as vehicle speed VSP increases, the vehicle-speed-depending gain Kv is decreased, so that the change in torque down gain Ka0 with respect to inter-vehicle distance deviation ΔL2 is decreased. If vehicle speed VSP rises above a prescribed level, vehicle-speed-depending gain Kv is fixed at a prescribed value.

In step S730, torque down gain Ka0 computed in step S720 is corrected corresponding to gradient SLP of the road on which the host vehicle runs. First, from the map shown in FIG. 14, gradient-depending corrected gain Ka_slp is computed. When the gradient SLP is positive, that is, when the vehicle runs up a slope (upward slope), gradient-depending corrected gain Ka_slp is set at a positive value. On the contrary, when gradient SLP is negative, that is, when the vehicle runs down a slope (downward slope), gradient-depending corrected gain Ka_slp is set at a negative value. The larger the absolute value of gradient SLP, the larger the absolute value of gradient-depending corrected gain Ka_slp is set. Also, if the absolute value of gradient SLP is over a prescribed level (e.g., a gradient of 10%), the absolute value of gradient-depending corrected gain Ka_slp is fixed at a prescribed value (e.g., 100). For example, if the road on which the host vehicle runs is neither an upward slope nor a downward slope (SLP=0), the value of gradient-depending corrected gain Ka_slp is set at zero. By means of the gradient-depending corrected gain Ka_slp computed here, torque down gain Ka0 computed in step S720 is corrected, and finally torque down gain Ka is computed. Here, torque down gain Ka is computed using the following formula.

$$Ka=\min(\max(Ka0+Ka\_slp, 0), 100) \quad (18)$$

In step S740, target accelerator pedal opening final value APO0* is computed. Target accelerator pedal opening final value APO0* is computed by internally dividing target accelerator pedal opening minimum value APO_min computed in step S710 and accelerator pedal depression quantity APO of the driver in torque down gain Ka computed in step S730.

$$APO0*=APO\times(Ka/100)+APO\_\min\times((100-Ka)/100) \quad (19)$$

In this way, after computing target accelerator pedal opening final value APO0* in step S700, the flow goes to step S800. In step S800, a treatment for detecting the accelerator pedal depression operation is performed. In the following, an explanation will be given regarding the treatment performed in step S800 with reference to the flow chart shown in FIG. 15.

In step S801, by differentially treating accelerator pedal depression quantity APO of the driver, accelerator pedal opening speed dAPO is computed.

In step S802, judgment is made on whether accelerator pedal opening speed dAPO is over preset accelerator pedal opening speed threshold dAPO1. If dAPO≧dAPO1, accelerator pedal 72 is judged to be depressed, and the flow goes to step S803, and accelerator pedal depression operation flag Flg_APO is set at 1. On the other hand, if dAPO<dAPO1, it is judged that the driver is not depressing accelerator pedal 72, that is, accelerator pedal 72 is kept as is or is reset, or accelerator pedal 72 is released. Then, the flow goes to step S804, and accelerator pedal depression operation flag Flg_APO is set at 0, that is, it is cleared.

In step S900, a treatment for resetting the target accelerator pedal opening is performed. The treatment for resetting the target accelerator pedal opening is one of the characteristic features of the present invention. When target accelerator pedal opening final value APO0* computed in step S700 should be increased to approach accelerator pedal depression quantity APO by the driver, based on accelerator pedal depression operation flag Flg_APO computed in step S800, the target accelerator pedal opening is reset. In the following, an explanation will be given regarding the treatment performed in step S900 with reference to the flow chart shown in FIG. 16.

In step S901, judgment is made on whether an obstacle exists ahead of the host vehicle. When an obstacle ahead of the host vehicle is detected with laser radar 10, the flow goes to step S902, and judgment is made on whether torque down gain Ka computed in step S730 is smaller than the last-round value of the torque down gain output value Ka_out_z. If Ka≦Ka_out_z, the flow goes to step S903, and a change rate limiter for torque down gain Ka is set. Here, limiter Ka_up for increasing torque down gain Ka and limiter Ka_dn for decreasing it are set, respectively. Here, limiter Ka_up for increasing the torque down gain is set at zero, and limiter Ka_dn for decreasing the torque down gain is set at preset value Ka_dn1.

Figure 17:
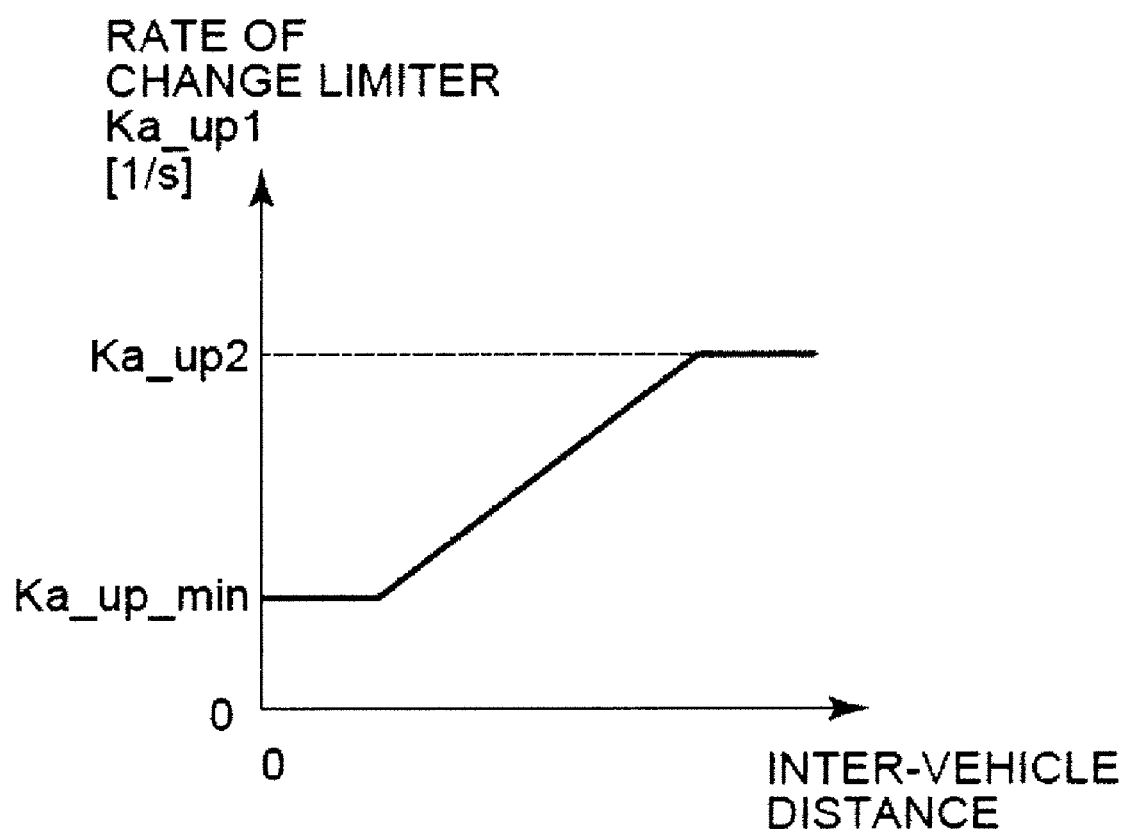
FIG. 17 is a diagram illustrating the relationship between the inter-vehicle distance and the increase limiter.

When it is judged that Ka>Ka_out_z in step S902, the flow goes to step S904, and judgment is made on whether accelerator pedal depression operation flag Flg_APO is 1. If the accelerator pedal depression operation flag Flg_APO is 1, that is, if accelerator pedal 72 is depressed, the flow goes to step S905. In step S905, as limiter Ka_up for increasing the torque down gain, value Ka_up1 is set based on inter-vehicle distance L between the host vehicle and the obstacle ahead of the host vehicle, while limiter Ka_dn for decreasing the torque down gain is set at zero. FIG. 17 is a diagram illustrating the relationship between inter-vehicle distance L and limiter Ka_up1 for increasing the torque down gain. As shown in FIG. 17, with a minimum value of Ka_up_min and a maximum value of Ka_up2, the limiter Ka_up1 for increasing the torque down gain is set such that it is increased slowly as inter-vehicle distance L becomes greater.

When it is judged in step S904 that accelerator pedal depression operation flag Flg_APO=0, that is, accelerator pedal 72 is not depressed, the flow goes to step S906. In step S906, both limiter Ka_up for increasing the torque down gain and limiter Ka_dn for decreasing the torque down gain are set at zero.

When it is judged in step S901 that no obstacle exists ahead of the host vehicle, the flow goes to step S907, and judgment is made on whether accelerator pedal depression operation flag Flg_APO is 1. If Flg_APO=1, the flow goes to step S908, and, as limiter Ka_up for increasing the torque down gain, Ka_up2 corresponding to the maximum value on the map shown in FIG. 17 is set. In addition, limiter Ka_dn for decreasing the torque down gain is set at zero.

When it is judged in step S907 that Flg_APO=0, the flow goes to step S909, and both limiter Ka_up for increasing the torque down gain and limiter Ka_dn for decreasing the torque down gain are set at zero.

In step S910, change rate limiter treatment is performed using limiter Ka_up for increasing the torque down gain and limiter Ka_dn for decreasing the torque down gain for torque down gain Ka computed in step S730 to compute torque down gain output value Ka_out. That is, in step S910, if torque down gain Ka computed in step S730 and torque down gain output value Ka_out_z of the last round differ, treatment is performed such that the computed torque down gain output value Ka_out moves from torque down gain output value Ka_out_z of the last round to torque down gain Ka computed in step S730 within the range of preset limiter Ka_up for increasing the torque down gain and limiter Ka_dn for decreasing the torque down gain. Also, if the deviation between torque down gain Ka computed in step S730 and torque down gain output value Ka_out_z of the last round is within the range of preset limiter Ka_up for increasing the torque down gain and limiter Ka_dn for decreasing the torque down gain, torque down gain output value Ka_out computed in step S910 becomes equal to torque down gain Ka computed in step S730.

In step S911, based on torque down gain output value Ka_out computed in step S910, target accelerator pedal opening APO* for use as the instruction value to engine controller 74 is computed.

•When Ka=Ka_out

With the following formula, target accelerator pedal opening final value APO0* computed in step S700 is set in target accelerator pedal opening APO*.

$$APO^* = APO0^* \quad (20)$$

•When Ka≠Ka_out

By means of the following formula, target accelerator pedal opening APO* is computed.

$$APO^* = APO \times Ka\_out/100 + APO\_min \times (100 - Ka\_out)/100 \quad (21)$$

In step S1000, target accelerator pedal opening APO* computed in step S900 is output to engine controller 74, and, at the same time, target accelerator pedal reactive force corrected value FA*corr computed in step S500 is output to accelerator pedal reactive force controller 70. Engine controller 74 controls the engine torque generation quantity according to target accelerator pedal opening APO* to perform engine torque control. Accelerator pedal reactive force controller 70 controls the accelerator pedal depression reactive force generated on accelerator pedal 72 corresponding to the target accelerator pedal reactive force FA*. At this point, the treatment of the current round comes to an end.

Figure 19A:
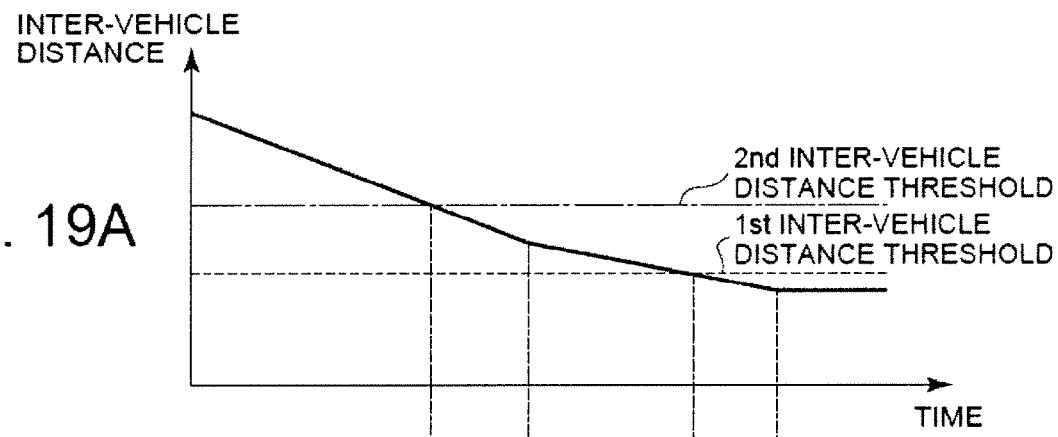
FIG. 19 shows the evolution over time of the inter-vehicle distance between the preceding vehicle and the host vehicle (actual inter-vehicle distance) L, accelerator pedal depression quantity APO, target accelerator pedal opening APO* and the accelerator pedal reactive force applied on servo motor 71.
Figure 19B:
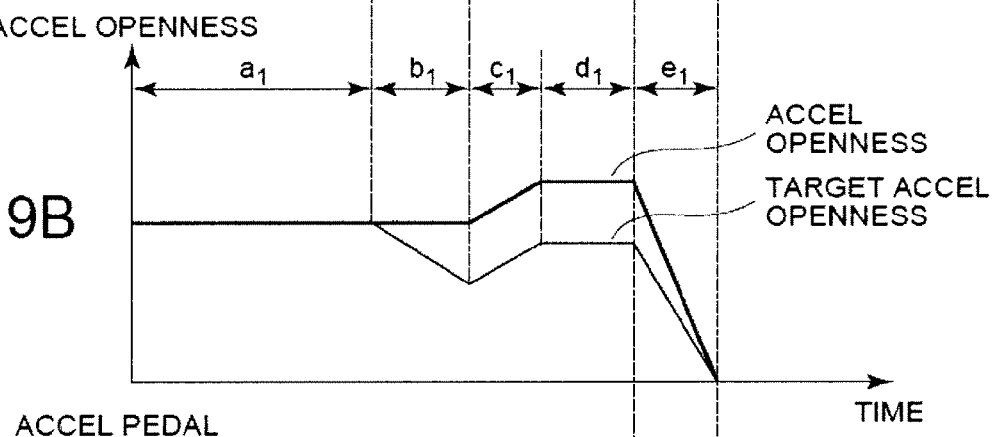
Figure 19C:
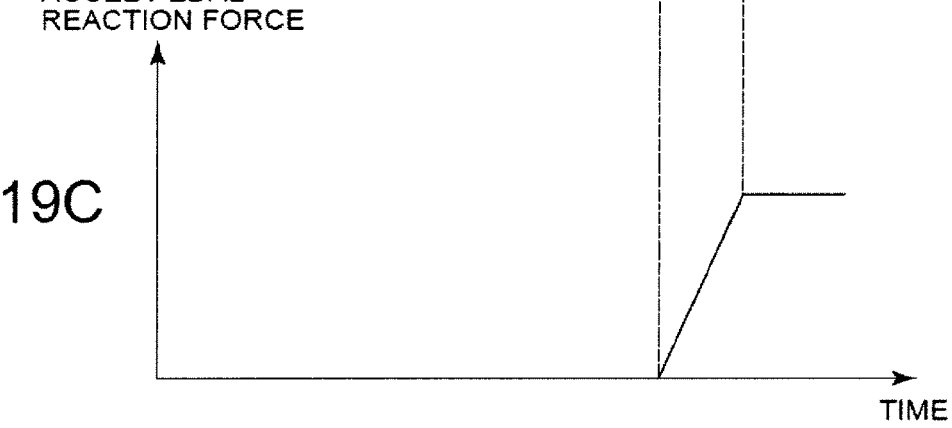

In the following, an explanation will be given regarding an example of the relationship between accelerator pedal depression quantity APO and target accelerator pedal opening APO* and evolution of the accelerator pedal operational reactive force applied on servo motor 71 when a vehicle carrying the inter-vehicle distance maintenance supporting system of Embodiment 1 gradually approaches the preceding vehicle. FIG. 19A is a diagram illustrating the evolution in time of inter-vehicle distance L between the preceding vehicle and the host vehicle (actual inter-vehicle distance). FIG. 19B is a diagram illustrating the evolution in time of accelerator pedal depression quantity APO (broad line) and target accelerator pedal opening APO* (fine line). FIG. 19C is a diagram illustrating the evolution in time of the accelerator pedal operational reactive force applied on servo motor 71. In order to facilitate explanation, in FIGS. 19A-C, intervals a1-e1 divided along the time axis will be explained.

When actual inter-vehicle distance L rises above the second inter-vehicle distance threshold (interval a1), accelerator pedal depression quantity APO (broad line) and target accelerator pedal opening APO* (fine line) reach agreement (FIGS. 19(a), (b)). When actual inter-vehicle distance L falls below the second inter-vehicle distance threshold (interval b1), even if accelerator pedal depression quantity APO by the driver is constant, target accelerator pedal opening APO* still gradually falls. That is, even if accelerator pedal depression quantity APO by the driver is kept constant, the engine torque generation quantity still gradually falls. In this case, the rate of decrease rate in target accelerator pedal opening APO* depends on the limiter Ka_dn for decreasing the torque down gain. In this way, when actual inter-vehicle distance L falls below the second inter-vehicle distance threshold, the relationship of the engine torque generation quantity versus accelerator pedal depression quantity APO is corrected in the decreasing direction.

When the actual inter-vehicle distance L falls below the second inter-vehicle distance threshold, if the driver further depresses accelerator pedal 72 (interval c1), target accelerator pedal opening APO* increases corresponding to the further depression operation by the driver on accelerator pedal 72. If actual inter-vehicle distance L falls below the second inter-vehicle distance threshold, even if the driver further depresses accelerator pedal 72, target accelerator pedal opening APO* remains smaller than accelerator pedal depression quantity APO (intervals b1-d1). Also, although not shown in the figure, for example, if the preceding vehicle accelerates, and actual inter-vehicle distance L is increased above the second inter-vehicle distance threshold, if the driver further depresses accelerator pedal 72, increase correction is performed such that target accelerator pedal opening APO*, which has been subjected to decrease correction with respect to accelerator pedal depression quantity APO, is reset to the original state (conventional characteristics). That is, the decrease correction is suppressed. Here, as long as actual inter-vehicle distance L is less than the second inter-vehicle distance threshold, increase correction is not performed until accelerator pedal depression quantity APO and target accelerator pedal opening APO* reach agreement.

When the host vehicle further approaches the preceding vehicle, so that actual inter-vehicle distance L falls below the first inter-vehicle distance threshold (interval e1), servo motor 71 applies an accelerator pedal operational reactive force on the accelerator pedal (FIGS. 19A, C). When the driver feels this operational reactive force and resets accelerator pedal 72, corresponding to the resetting operation of the driver for accelerator pedal 72, target accelerator pedal opening APO* decreases. When accelerator pedal depression quantity APO reaches zero, target accelerator pedal opening APO* also reaches zero.

Figure 20A:
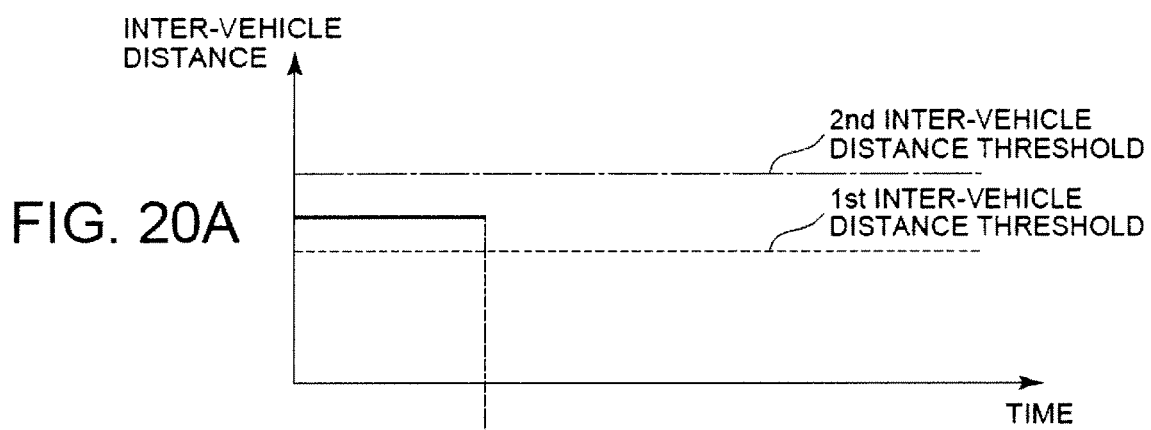
FIG. 20 shows the evolution over time of the inter-vehicle distance between the preceding vehicle and the host vehicle (actual inter-vehicle distance) L, accelerator pedal depression quantity APO, and target accelerator pedal opening APO*.
Figure 20B:
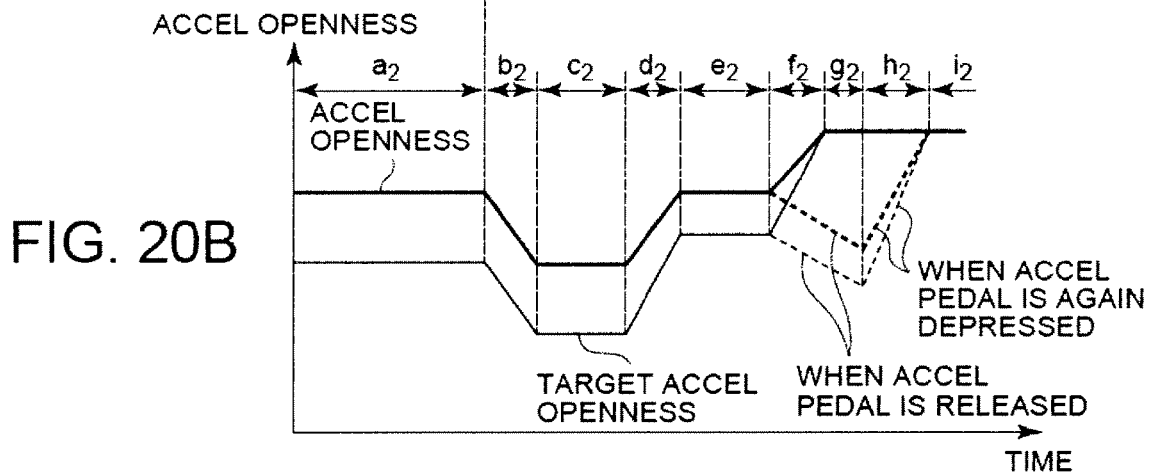

In the following, an explanation will be given regarding an example of evolution of the relationship between accelerator pedal depression quantity APO and target accelerator pedal opening APO* when a preceding vehicle is not detected with laser radar 10 due to a change of lane of the preceding vehicle or of the host vehicle when a host vehicle having the inter-vehicle distance maintenance supporting system of Embodiment 1 carried on it runs follows a preceding vehicle. FIG. 20A is a diagram illustrating the evolution in time of inter-vehicle distance (actual inter-vehicle distance) L with respect to the preceding vehicle. FIG. 20B is a diagram illustrating the evolution in time of accelerator pedal depression quantity APO (broad line) and target accelerator pedal opening APO* (fine line). In FIGS. 20A, B, in order to facilitate explanation, intervals a2-i2 divided along the time axis will be explained.

As explained above, when actual inter-vehicle distance L is less than the second inter-vehicle distance threshold (interval a2), target accelerator pedal opening APO* becomes lower than accelerator pedal depression quantity APO by the driver. Here, when the preceding vehicle is no longer detected by laser radar 10 (that is, the preceding vehicle is lost), only during a period when accelerator pedal 72 is further depressed (intervals d2, f2 (solid line portion), interval h2 (broken line portion)), increase correction is performed for accelerator pedal depression quantity APO so that decrease corrected target accelerator pedal opening APO* is reset to the original state (conventional characteristics), that is, the state in which accelerator pedal depression quantity APO and target accelerator pedal opening APO* reach agreement. Here, the rate of increase of target accelerator pedal opening APO* depends on limiter Ka_up for increasing the torque down gain.

Consequently, even if accelerator pedal 72 is reset (interval b2, interval f2 (broken line portion), interval g2 (broken line portion)), or if the depression quantity is kept constant as is (intervals c2, e2), target accelerator pedal opening APO* is continually corrected to decrease with respect to accelerator pedal depression quantity APO, and no increase correction is performed. In this way, the configuration is such that the relationship between the accelerator pedal depression quantity APO and the engine torque generation quantity when decrease correction has been performed is reset to the conventional characteristics (increase correction is performed). As a result, when accelerator pedal 72 is reset and when the depression quantity of accelerator pedal 72 is constant, that is, when the driver has no intention to accelerate, it is possible to prevent the following problem, namely, that target accelerator pedal opening APO* is subjected to increase correction with respect to accelerator pedal depression quantity APO, and the vehicle is accelerated against the intention of the driver.

In the Embodiment 1, the following operational effects can be realized.

(1) The first inter-vehicle distance threshold L*1 is computed based on the state of an obstacle located ahead of the host vehicle, and a reactive force to be generated on accelerator pedal 72 is determined based on computed first inter-vehicle distance threshold L*1 and the positional relationship between the host vehicle and the obstacle. Also, based on the state of the obstacle, second inter-vehicle distance threshold L*2 is computed, and the relationship of the engine torque generation quantity versus accelerator pedal depression quantity APO is corrected in the decreasing direction based on the computed second inter-vehicle distance threshold L*2 and the positional relationship between the host vehicle and the obstacle. With the Embodiment 1, for example, when the host vehicle approaches an obstacle ahead of the host vehicle from a more distant site, the engine torque generation quantity is decreased with respect to the depression quantity of accelerator pedal 72, so that the host vehicle can easily enter the running mode in tracking the preceding vehicle. Also, because even in the tracking driving mode the engine torque is still controlled based on the positional relationship between the host vehicle and the obstacle and second inter-vehicle distance threshold L*2, it is possible to reduce the correction operation of accelerator pedal 72 performed by the driver in the tracking driving mode, and it is possible to reduce the physical load on the driver. Also, by performing a decrease correction for the output level of the engine torque, the accelerator pedal depression quantity rises above the depression quantity by the driver. Consequently, when the inter-vehicle distance between the preceding vehicle and the host vehicle falls below the first inter-vehicle distance threshold, the operational reactive force of accelerator pedal 72 is controlled and the driver is prompted to operate appropriately. Even in this case, a message still can be sent to the driver more reliably.

(2) The configuration is such that when decrease correction is performed for the output level of the engine torque, if the scenario is changed so that there is no need to perform a decrease correction of the output level of the engine torque, such as when the preceding vehicle has changed lanes so that it disappears from ahead of the host vehicle, the relationship of the engine torque generation quantity versus accelerator pedal depression quantity APO is reset to the conventional characteristics. As a result, if there is no longer a preceding vehicle or if a preceding vehicle moves far away, it is possible to reduce the feeling of discomfort caused by poor acceleration due to an unnecessary decrease in torque. Also, the configuration is such that when the relationship of the engine torque generation quantity versus accelerator pedal depression quantity APO is reset to the conventional characteristics, then at this time, the rate of increase of target accelerator pedal opening APO* depends on limiter Ka_up for increasing the torque down gain. As a result, the relationship of the engine torque generation quantity versus accelerator pedal depression quantity APO does not change dramatically, and generation of a vehicle behavior not intended by the driver can be suppressed. Consequently, a feeling of discomfort does not take place for the driver.

(3) The configuration is such that when the output level of the engine torque is decreased, if the relationship of the engine torque generation quantity versus the accelerator pedal depression quantity under decrease correction is reset to a normal relationship, such as when the preceding vehicle has disappeared or the preceding vehicle changed lanes, the relationship is gradually reset to that in which the driver depresses the accelerator pedal. As a result, it is possible to reduce the feeling of discomfort of the driver caused by acceleration of the host vehicle although the driver maintains a constant depression level of the accelerator pedal.

(4) The configuration is such that when it is detected that the driver has released accelerator pedal 72 or the driver has performed a resetting operation for accelerator pedal 72, the increase correction of accelerator pedal target opening APO* with respect to accelerator pedal depression quantity APO is finished. As a result, it is possible to control the inter-vehicle distance while better matching the feeling of the driver, that is, better reflecting the intention of the driver in ending acceleration or in deceleration.

(5) As shown in FIG. 17, the configuration is such that by setting limiter Ka_up1 for increasing the torque down gain to gradually increased when actual inter-vehicle distance L increases, the rate of increase of target accelerator pedal opening APO* when increase correction is performed for target accelerator pedal opening APO* with respect to accelerator pedal depression quantity APO becomes higher. That is, when the relationship of the engine torque generation quantity versus accelerator pedal depression quantity APO is reset to the normal characteristics, the longer the distance to the obstacle ahead of the host vehicle, the earlier the characteristics are reset to the normal characteristics as compared with the case when the inter-vehicle distance is shorter. Also, when no obstacle exists ahead of the host vehicle, the characteristics can be reset to the normal characteristics earlier than the case in which the obstacle exists. As a result, it is possible for the behavior of the vehicle to itself better match the intention of the driver for acceleration, and it is thus possible to reduce the feeling of discomfort. Also, for example, if the preceding vehicle is being passed and if the preceding vehicle has changed lanes and disappeared, by resetting the characteristics to the normal characteristics as compared with the case when the preceding vehicle exists, it is possible to reduce the feeling of discomfort of the driver with respect to poor acceleration.

(6) The configuration is such that when the second inter-vehicle distance threshold is computed, in consideration of gradient-depending correction time T_slp, the second inter-vehicle distance threshold is shorter when it is determined that the gradient of the road on which the host vehicle runs has an upward slope, and the second inter-vehicle distance threshold is computed to be longer when it is determined that the road on which the host vehicle runs has a downward slope. As a result, for example, when the road on which the host vehicle runs has an upward slope, the timing for starting the decrease correction of the engine torque generation quantity can be delayed from that when the road on which the host vehicle runs does not have a slope. Also, if the road on which the host vehicle runs has a downward slope, the timing for starting the decrease correction of the engine torque generation quantity can be pushed ahead of that when the road on which the host vehicle runs does not have a slope. Consequently, even if decrease correction of the engine torque generation quantity is performed, it is still possible to suppress the feeling of discomfort of the driver on sloped roads.

(7) The configuration is such that by correcting torque down gain Ka0 corresponding to gradient SLP of the road on which the host vehicle runs, when decrease correction of the engine torque generation quantity is performed, if it is determined that the road on which the host vehicle runs has an upward slope, correction is performed so that the relationship of the engine torque generation quantity versus the accelerator pedal depression quantity is nearer the normal characteristics than the case when it is determined that the road on which the host vehicle runs has a downward slope. That is, when it is determined that the road on which the host vehicle runs has an upward slope, the engine torque generation quantity with respect to the accelerator pedal depression quantity is larger than that when the road on which the host vehicle runs is determined to have a downward slope. As a result, for example, it is possible to suppress the feeling of discomfort that it is difficult to track the preceding vehicle due to decrease correction of the engine torque generation quantity on an upward slope.

Embodiment 2

Figure 18:
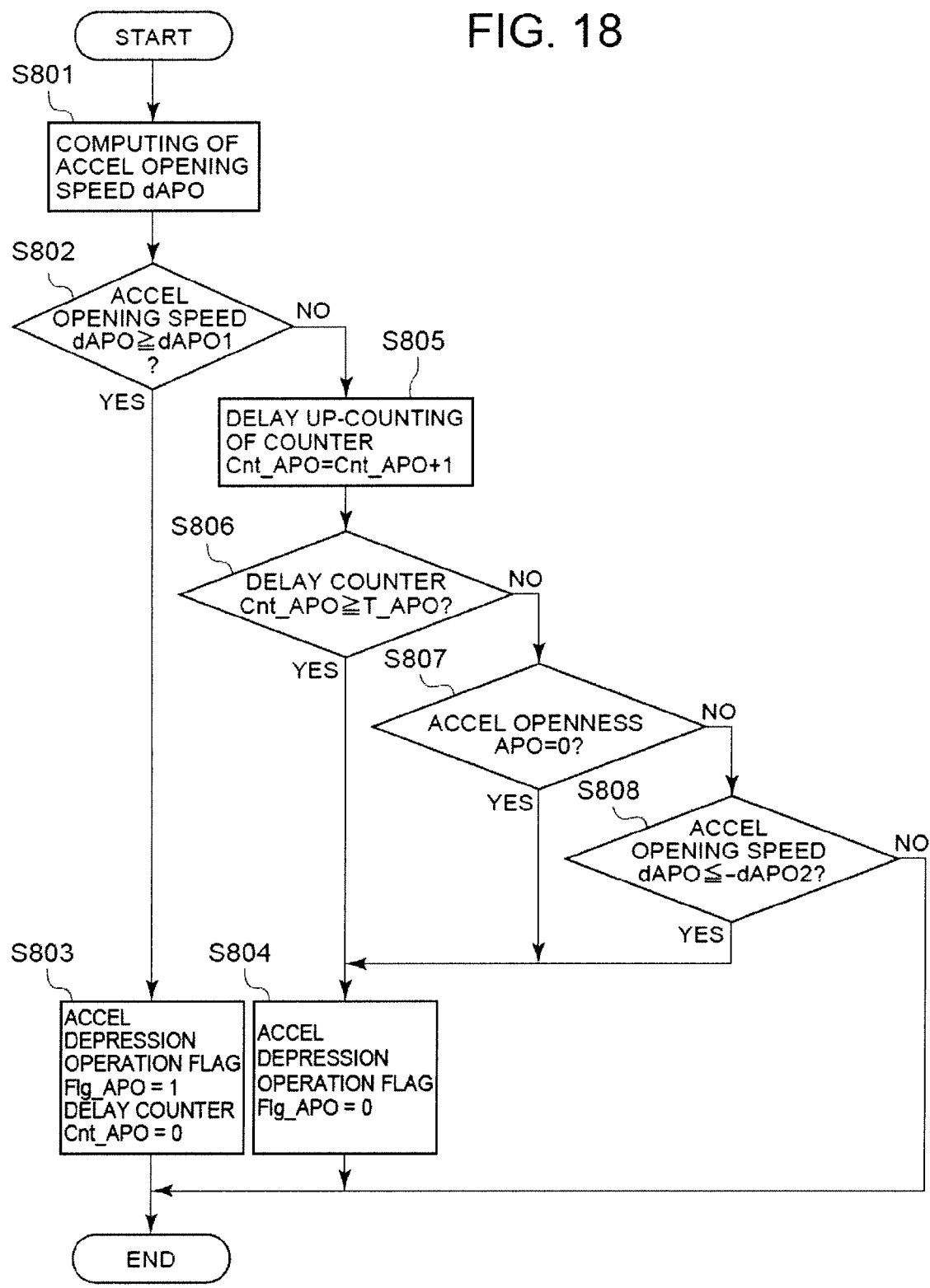
FIG. 18 is a flow chart illustrating a process for detecting the accelerator pedal depression operation in Embodiment 2.

In the following, an explanation will be given regarding Embodiment 2 of the inter-vehicle distance maintenance supporting system and inter-vehicle distance maintenance supporting method of the present invention with reference to FIGS. 18 and 21. In the following explanation, the same symbols as those above in Embodiment 1 are adopted, and features not specifically explained are the same as those in Embodiment 1. This embodiment differs from Embodiment 1 in that when increase correction is performed for the engine torque generation quantity with respect to accelerator pedal depression quantity APO after performing a decrease correction, even if the depression operation of the driver on accelerator pedal 72 is stopped, the increase correction is still continued for a prescribed time. More specifically, inter-vehicle distance maintenance supporting system 1 in Embodiment 2 differs from that in Embodiment 1 with respect to the contents of treatment in step S800 in the flow chart indicating a process of the inter-vehicle distance maintenance supporting control treatment in Embodiment 1 (FIG. 4). In the following, an explanation will be given regarding the operation of inter-vehicle distance maintenance supporting system 1 in Embodiment 2.

FIG. 4 is a flow chart illustrating a process of the inter-vehicle distance maintenance supporting control treatment performed with controller 50. In step S700, target accelerator pedal opening final value APO0* is computed. Then, the flow goes to step S800. In step S800, an accelerator pedal depression operation detection treatment is performed. The treatment performed in step S800 is performed according to the flow chart shown in FIG. 18.

The treatment performed in steps S801-S803 are the same as that in Embodiment 1. In step S802, if it is found that dAPO<dAPO1, it is judged that the driver does not depress accelerator pedal 72, that is, accelerator pedal 72 is kept as is or reset, or accelerator pedal 72 is released. The flow then goes to step S805, and delay counter Cnt_APO is counted up. In step S806, judgment is made on whether delay counter Cnt_APO is over a preset time T_APO (e.g., 1 sec). If delay counter Cnt_APO is longer than prescribed time T_APO, the flow goes to step S804, and accelerator pedal depression operation flag Flg_APO is set at 0, that is, it is cleared.

On the other hand, when delay counter Cnt_APO is shorter than prescribed time T_APO, the flow goes to step S807, and judgment is made on whether accelerator pedal depression quantity APO is zero. If accelerator pedal depression quantity APO is zero, it is judged that the driver has lifted his foot from accelerator pedal 72, and the flow then goes to step S804. Then, accelerator pedal depression operation flag Flg_APO is set at zero, that is, it is cleared.

In step S807, if it is judged that accelerator pedal depression quantity APO is non-zero, the flow goes to step S808, and judgment is made on whether accelerator pedal opening speed dAPO is lower than preset accelerator pedal opening speed threshold dAPO2. If accelerator pedal opening speed dAPO is lower than preset accelerator pedal opening speed threshold dAPO2, it is judged that the driver performs a resetting operation for accelerator pedal 72 at a speed higher than the prescribed operational speed, so that the flow goes to step S804, and accelerator pedal depression operation flag Flg_APO is set at zero, that is, it is cleared. Also, accelerator pedal opening speed dAPO has a positive value when accelerator pedal 72 is depressed, and it has a negative value when accelerator pedal 72 is reset. On the other hand, if it is judged that accelerator pedal opening speed dAPO is higher than preset accelerator pedal opening speed threshold dAPO2, it is judged that the driver performs a resetting operation of accelerator pedal 72 at a speed lower than the prescribed speed, or the driver keeps the depression quantity of accelerator pedal 72 nearly constant. It is finished as is.

Figure 21A:
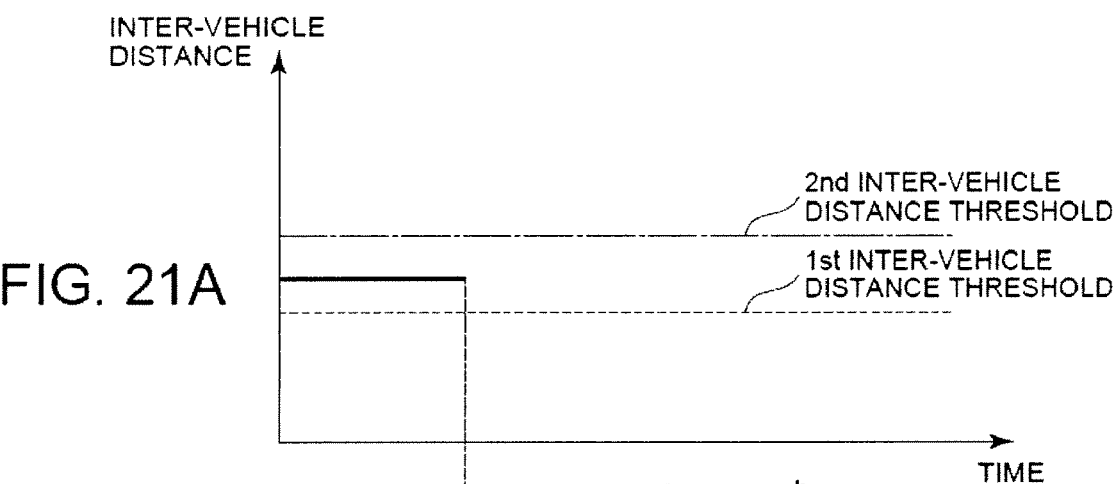
FIG. 21 shows the evolution over time of the inter-vehicle distance between the preceding vehicle and the host vehicle (actual inter-vehicle distance) L, accelerator pedal depression quantity APO, and target accelerator pedal opening APO* in Embodiment 2.
Figure 21B:
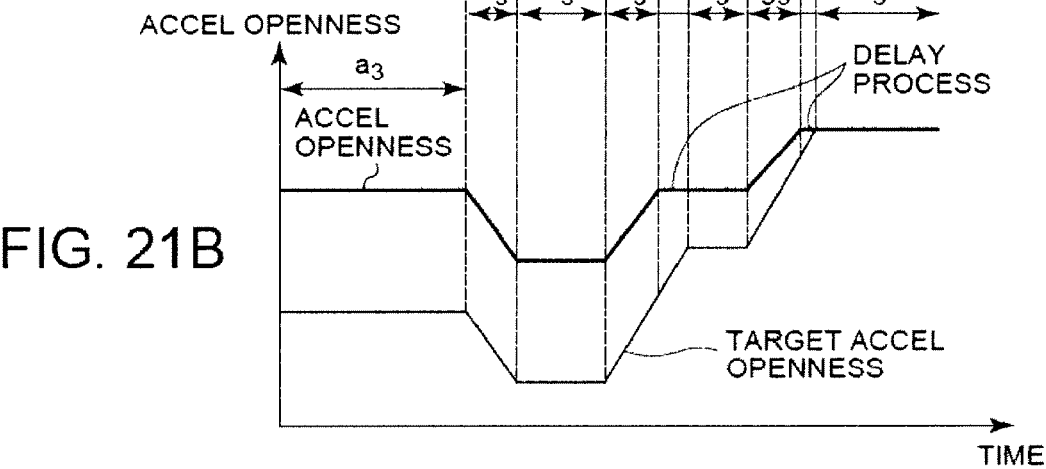

In the following, an explanation will be given regarding an example of evolution of the relationship between accelerator pedal depression quantity APO and target accelerator pedal opening APO* when a vehicle carrying the inter-vehicle distance maintenance supporting system of Embodiment 2 loses a preceding vehicle from laser radar 10 due to changing of lanes of the preceding vehicle or the host vehicle when the host vehicle performs tracking driving with respect to the preceding vehicle. FIG. 21A is a diagram illustrating the evolution in time of inter-vehicle distance L between the preceding vehicle and the host vehicle (actual inter-vehicle distance). FIG. 21B is a diagram illustrating the evolution in time of accelerator pedal depression quantity APO (broad line) and target accelerator pedal opening APO* (fine line). In FIGS. 21A, B, intervals a3-i3 divided along the time axis will be explained.

As explained above, when actual inter-vehicle distance L falls below the second inter-vehicle distance threshold (interval a3), target accelerator pedal opening APO* decreases as compared with accelerator pedal depression quantity APO by the driver. Here, when laser radar 10 loses the preceding vehicle (the preceding vehicle is lost), an increase correction of target accelerator pedal opening APO* is performed with respect to accelerator pedal depression quantity APO not only in the intervals where accelerator pedal 72 is further depressed (intervals d3, g3), but also over a prescribed time after the end of the depression increase operation of accelerator pedal 72 (intervals e3, h3). That is, the increase correction is continued for a prescribed time after the end of the depression increase operation of accelerator pedal 72.

In Embodiment 2, in addition to the operational effects of Embodiment 1, the following operational effect can be realized.

(1) The configuration is such that in addition to the period when accelerator pedal 72 is being further depressed, also during a prescribed time after the end of the further depression operation of accelerator pedal 72, increase correction of target accelerator pedal opening APO* with respect to accelerator pedal depression quantity APO is performed. As a result, for example, in the case when the driver depresses the accelerator pedal in trying to pass a vehicle ahead of the host vehicle, it is possible to reduce the feeling of discomfort caused by poor acceleration. Also, when accelerator pedal 72 is reset or when the depression quantity of accelerator pedal 72 is constant, that is, when the driver has no intention of acceleration, it is possible to prevent acceleration of the host vehicle against the wishes of the driver due to increase correction of target accelerator pedal opening APO* with respect to accelerator pedal depression quantity APO, while the relationship of the engine torque generation quantity versus accelerator pedal depression quantity APO can be reset to the normal characteristics earlier, and the feeling of discomfort of the driver in the acceleration operation can be suppressed.

Embodiment 3

In the following, an explanation will be given regarding Embodiment 3 of the inter-vehicle distance maintenance supporting system and inter-vehicle distance maintenance supporting method of the present invention with reference to FIGS. 22-37. In the following explanation, the points of difference from Embodiments 1 and 2 will mainly be presented, and the same symbols as those adopted above in the embodiments will be adopted in this embodiment. The points not explained specifically are the same as those of Embodiments 1 and 2. In this embodiment, a confidence factor for the continuous presence of an obstacle ahead of the host vehicle is computed, and, based on the computed confidence factor, decrease correction of the engine torque is further performed. This is a feature different from Embodiments 1 and 2. In the following, an explanation will be given regarding the operation of inter-vehicle distance maintenance supporting system 1 in Embodiment 3.

As explained above, in inter-vehicle distance maintenance supporting system 1, laser radar 10 measures the reflected waves of IR light pulses reflected from plural reflective objects (usually the rear end of a preceding vehicle) ahead of the host vehicle, and, from the arrival time of the reflected waves, it detects the inter-vehicle distance of each of plural preceding vehicles and the direction of presence of each of them. In the present embodiment, the direction of presence of the object ahead of the vehicle can be represented by the relative angle with respect to the host vehicle.

Controller 50 comprises a CPU as well as a ROM, RAM and other CPU peripheral members. It performs overall control of inter-vehicle distance maintenance supporting system 1. Controller 50 uses distance information input from laser radar 10 and the vehicle speed input from vehicle speed sensor 20 to recognize the state of obstacles around the host vehicle, such as the relative distance and the relative speed between the host vehicle and each obstacle as the running state with respect to the obstacle. Based on the obstacle state, controller 50 computes the confidence factor for the obstacle located ahead of the host vehicle, a first inter-vehicle distance threshold and a second inter-vehicle distance threshold. Then, it performs the following control based on the computed confidence factor, the first inter-vehicle distance threshold and the second inter-vehicle distance threshold.

Inter-vehicle distance maintenance supporting system 1 corrects the accelerator pedal operational reactive force and the engine torque output level corresponding to the confidence factor of the obstacle. Here, the confidence factor of the obstacle ahead of the host vehicle is defined as a value that indicates the confidence that the obstacle ahead of the host vehicle as the control object of the operational reactive force and engine torque is located ahead of the host vehicle, that is, a value that indicates the reliability in making a judgment that the obstacle ahead of the host vehicle is a preceding vehicle ahead of the host vehicle. In this way, by correcting corresponding to the confidence factor of the obstacle ahead of the host vehicle, when the driver tries to pass the obstacle ahead of the host vehicle, so that a lateral deviation takes place between the host vehicle and the obstacle ahead of the host vehicle, it is possible to release the control at an earlier timing, so that the feeling of discomfort of the driver can be reduced.

More specifically, controller 50 computes the confidence factor of the obstacle ahead of the host vehicle from the relationship in lateral position (left/right direction) between the host vehicle and the obstacle ahead of the host vehicle. Then, based on the first inter-vehicle distance threshold for the obstacle ahead of the host vehicle, the target accelerator pedal reactive force is computed, and the computed target accelerator pedal reactive force is corrected corresponding to the confidence factor. The computed target accelerator pedal reactive force corrected value is output to accelerator pedal reactive force controller 70.

Then, just as in the Embodiments 1 and 2, controller 50 computes the target accelerator pedal opening based on the second inter-vehicle distance threshold with respect to the obstacle ahead of the host vehicle and the accelerator pedal depression quantity by the driver. Then, the computed target accelerator pedal opening is corrected corresponding to the confidence factor, and the corrected target accelerator pedal opening is output to engine controller 74. Also, based on the accelerator pedal depression quantity by the driver detected with accelerator pedal depression quantity detecting part 73, controller 50 judges whether the depression operation of accelerator pedal 72 is performed. When the target accelerator pedal opening is reset to the accelerator pedal depression quantity by the driver, controller 50 outputs to engine controller 74 the result of the target accelerator pedal opening resetting treatment based on the judged accelerator pedal depression operation.

Figure 22:
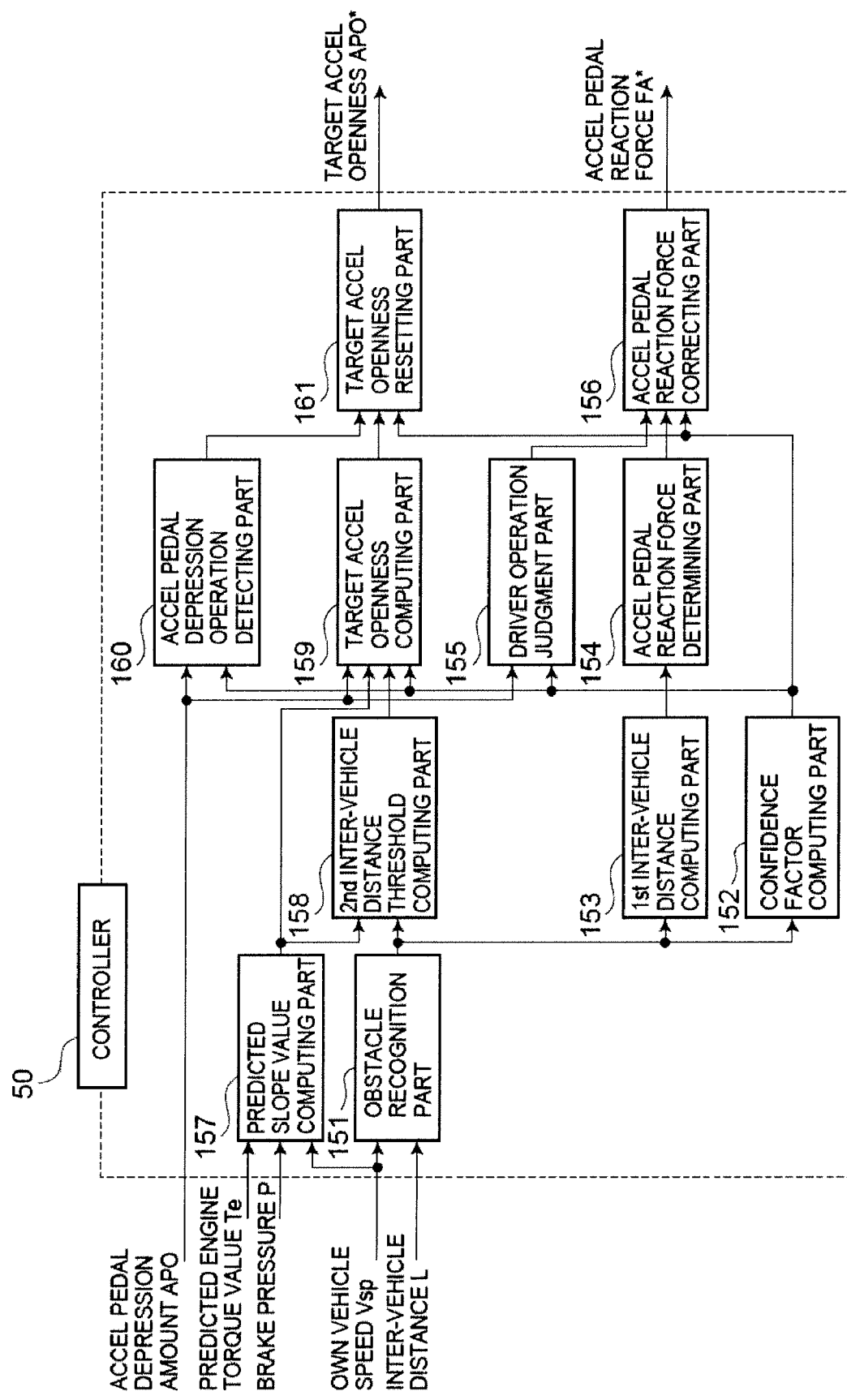
FIG. 22 is a block diagram illustrating an arrangement of the controller in Embodiment 3.

FIG. 22 is a block diagram illustrating an arrangement of controller 50. For example, controller 50 may comprise the following parts depending on the software state of the CPU: obstacle recognition part 151, confidence factor computing part 152, first inter-vehicle distance threshold computing part 153, accelerator pedal reactive force determining part 154, driver operation judgment part 155, accelerator pedal reactive force correcting part 156, gradient estimated value computing part 157, second inter-vehicle distance threshold computing part 158, target accelerator pedal opening computing part 159, accelerator pedal depression operation detecting part 160, and target accelerator pedal opening resetting part 161.

Obstacle recognition part 151 computes the inter-vehicle distance and relative speed with respect to an obstacle, such as a preceding vehicle, ahead of a host vehicle based on a signal input from laser radar 10. In addition, it detects the state of the obstacle ahead of the host vehicle from the inter-vehicle distance, the relative speed, and the vehicle speed input from vehicle speed sensor 20. Confidence factor computing part 152 computes a confidence factor of the obstacle located ahead of the host vehicle based on the state of obstacle input from obstacle recognition part 151

First inter-vehicle distance threshold computing part 153 computes the first inter-vehicle distance threshold with respect to the obstacle ahead of the host vehicle based on the obstacle state input from obstacle recognition part 151. Accelerator pedal reactive force determining part 154 determines the accelerator pedal reactive force applied on accelerator pedal 72 based on the first inter-vehicle distance threshold computed with first inter-vehicle distance threshold computing part 153 and the inter-vehicle distance input from obstacle recognition part 151. Driver operation judgment part 155 judges whether the driver depresses accelerator pedal 72 based on an accelerator pedal depression quantity input from accelerator pedal depression quantity detecting part 73 and the confidence factor computed with confidence factor computing part 152. Accelerator pedal reactive force correcting part 156 uses the judgment result of driver operation judgment part 155 and the confidence factor computed with confidence factor computing part 152 to correct the accelerator pedal reactive force computed with accelerator pedal reactive force determining part 154, and outputs a corrected accelerator pedal reactive force to accelerator pedal reactive force controller 70.

Second inter-vehicle distance threshold computing part 158 computes the second inter-vehicle distance threshold with respect to the obstacle ahead of the host vehicle based on the state of the obstacle input from obstacle recognition part 151. Based on the second inter-vehicle distance threshold computed with second inter-vehicle distance threshold computing part 158, the accelerator pedal depression quantity input from accelerator pedal depression quantity detecting part 73, and the confidence factor computed with confidence factor computing part 152, target accelerator pedal opening computing part 159 computes a target accelerator pedal opening (final value of a target accelerator pedal opening) for use as the control instruction value of the engine torque to be finally realized.

From the accelerator pedal depression quantity input from accelerator pedal depression quantity detecting part 73 and the confidence factor computed with confidence factor computing part 152, accelerator pedal depression operation detecting part 160 detects the accelerator pedal depression operation by the driver. Based on the detection result of accelerator pedal depression operation detecting part 160 and the confidence factor computed with confidence factor computing part 152, target accelerator pedal opening resetting part 161 resets the final value of the target accelerator pedal opening computed with target accelerator pedal opening computing part 159, and it re-computes the target accelerator pedal opening.

Figure 23:
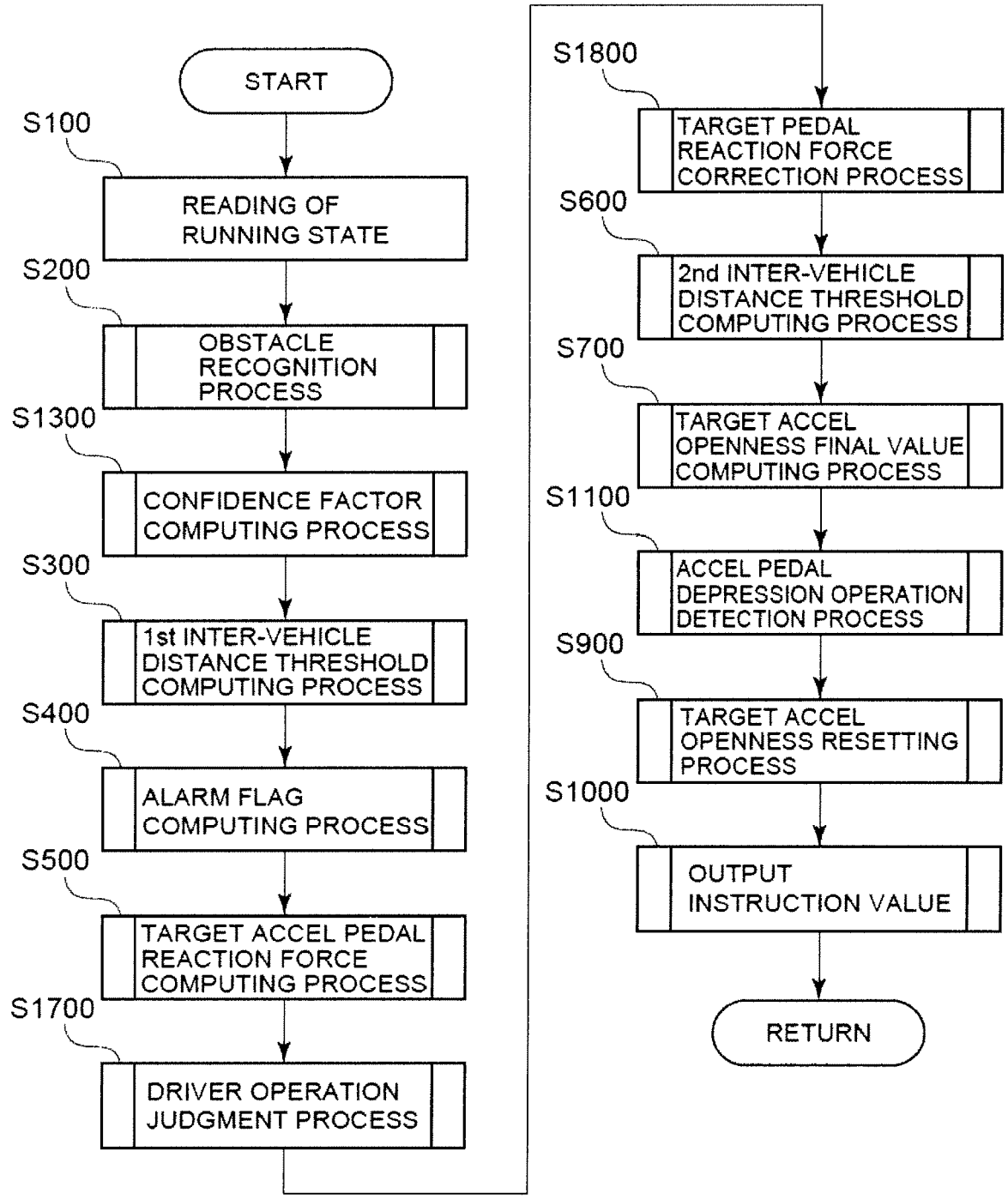
FIG. 23 is a flow chart illustrating the treatment procedure of the inter-vehicle distance maintenance supporting control program in the inter-vehicle distance maintenance supporting device in Embodiment 3.
Figure 24:
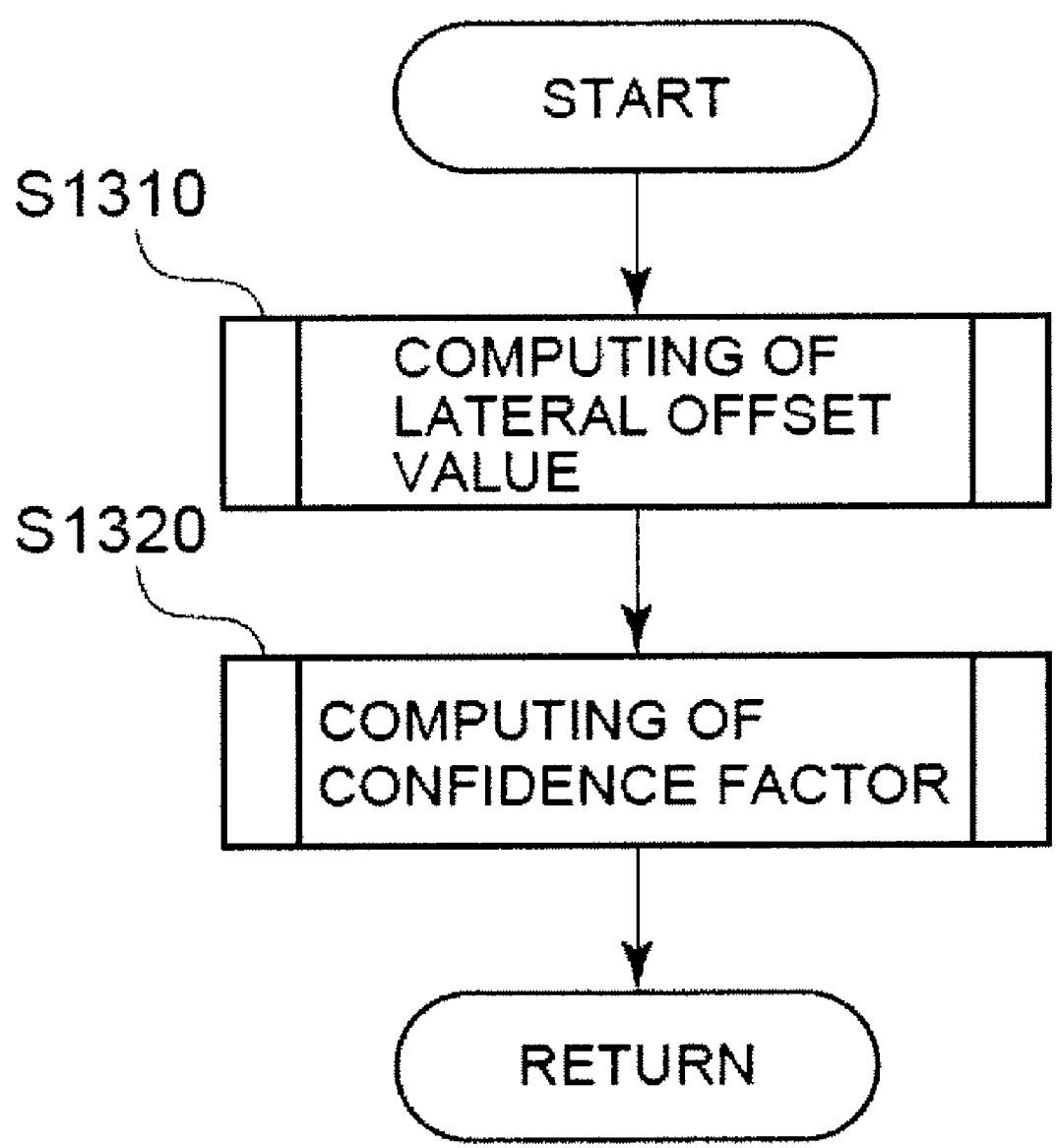
FIG. 24 is a flow chart illustrating a process for computing the confidence factor.

In the following, an explanation will be given in more detail regarding the operation of inter-vehicle distance maintenance supporting system 1 in this embodiment. FIG. 23 is a flow chart illustrating the procedure of the inter-vehicle distance maintenance control treatment in controller 50 in this embodiment. This treatment is performed consecutively once every prescribed interval, e.g., 50 msec.

First, in step S100, the running state is read. Step S100 shown in FIG. 23 is the same as step S100 shown in FIG. 4 in Embodiment 1. That is, the inter-vehicle distance to the obstacle ahead of the host vehicle and the direction of presence of the obstacle ahead of the host vehicle, such as a preceding vehicle, detected with laser radar 10 and the vehicle speed detected with vehicle speed sensor 20 are read.

Step S200 is the same as step S200 in FIG. 4 of Embodiment 1.

In step S1300, the confidence factor of the obstacle is computed as the value representing the confidence that the obstacle ahead of the host vehicle and as the object for the operational reactive force control and engine torque control will continue to be present as the control object ahead of the host vehicle. In the following, an explanation will be given regarding the treatment for computing the confidence factor with reference to the flow chart shown in FIG. 24.

Figure 25:
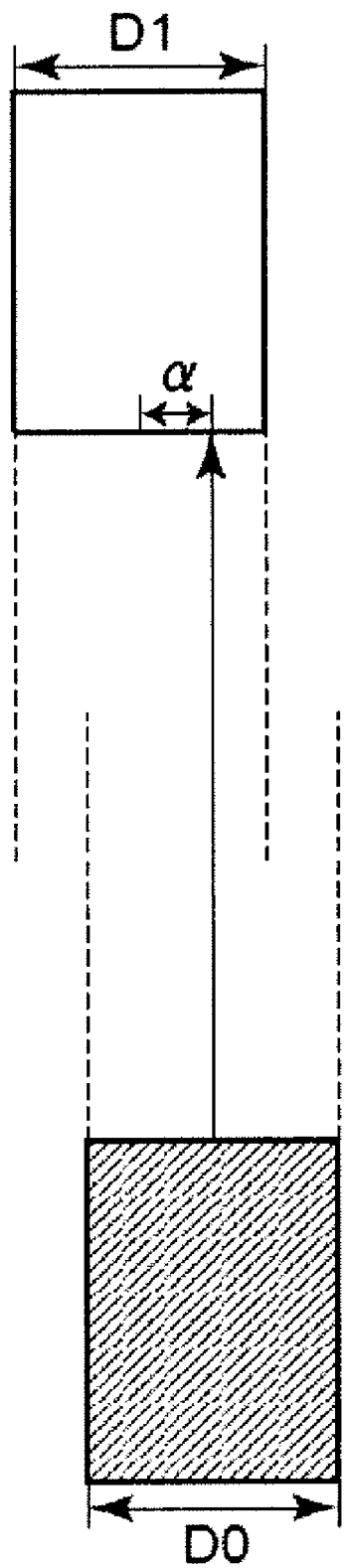
FIG. 25 is a diagram illustrating the method for computing the lateral offset value when the host vehicle runs on a straight road.
Figure 26:
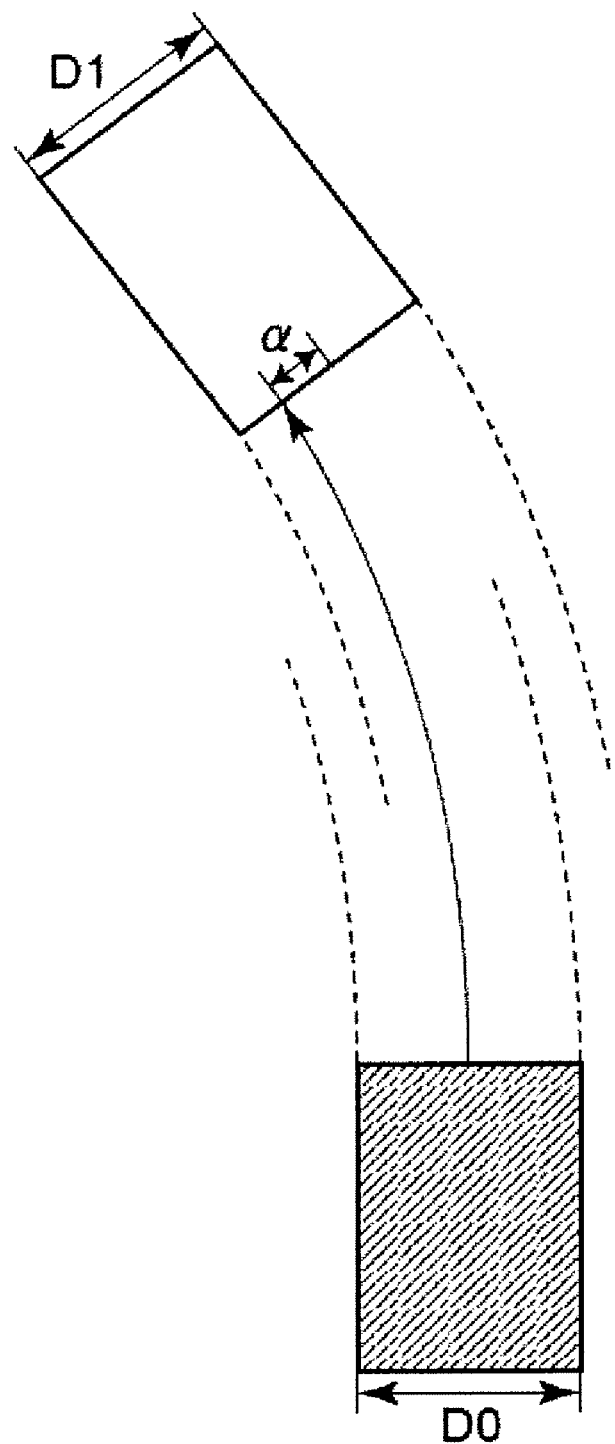
FIG. 26 is a diagram illustrating the method for computing the lateral offset value when the host vehicle runs on a curved road.

FIG. 25 is a schematic diagram illustrating the case when an obstacle ahead of the host vehicle appears while the host vehicle runs on a straight road. On the other hand, FIG. 26 is a schematic diagram illustrating the relative positional relationship between the host vehicle and the obstacle when the obstacle appears ahead of the host vehicle while the host vehicle runs on a curved road. As shown in FIGS. 25 and 26, when deviation takes place in the lateral direction between the center of the host vehicle and the center of the obstacle, this lateral deviation is computed as offset value α, and, from the computed lateral offset value α, the confidence factor is computed.

First, in step S1310, lateral offset value α between the obstacle ahead of the host vehicle and the host vehicle is computed. In the following, an explanation will be given with reference to FIG. 27 regarding the method for computing lateral offset value α when there is an obstacle ahead of the host vehicle while the host vehicle runs on a straight road.

Figure 27:
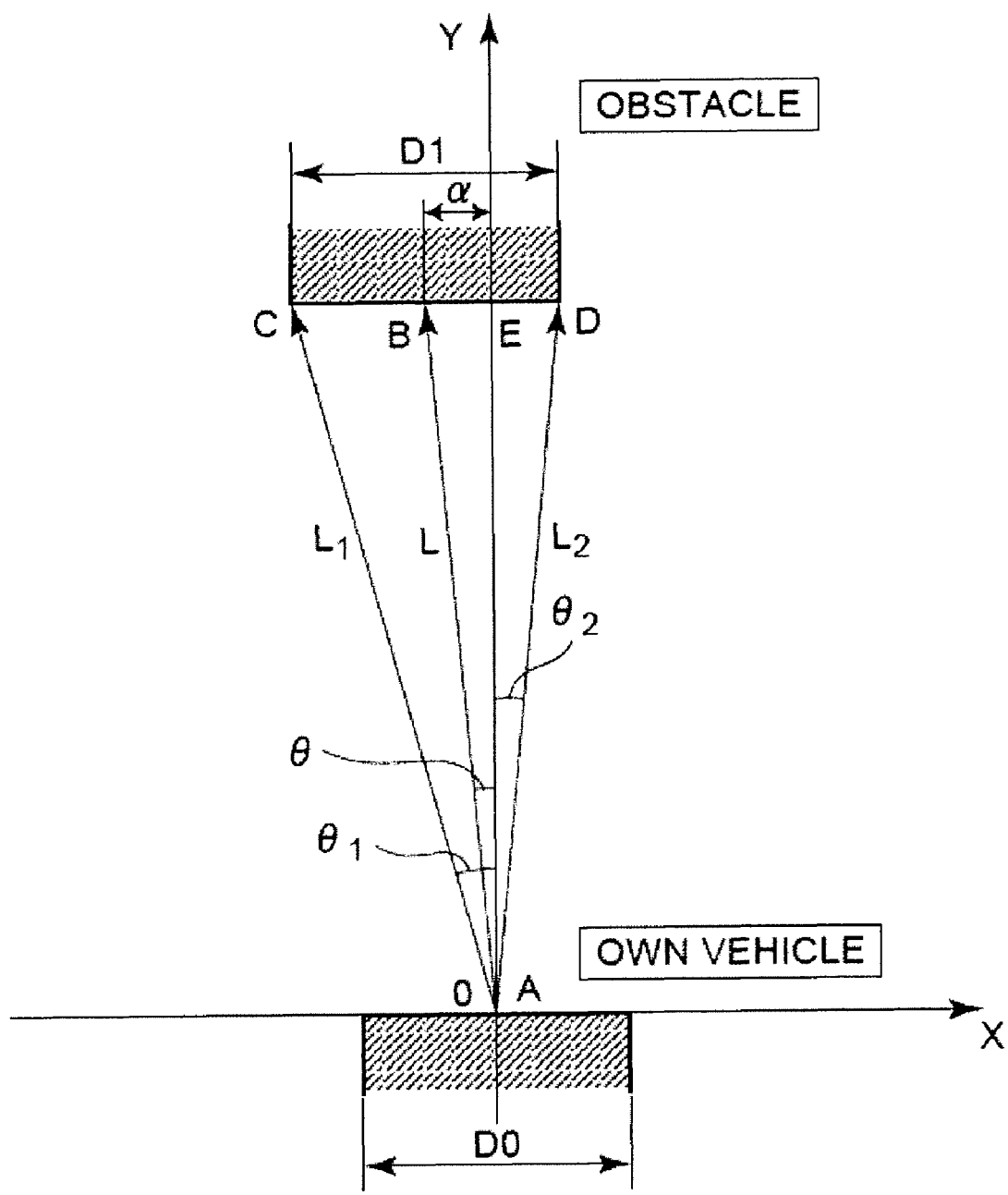
FIG. 27 is a diagram illustrating the method for computing the lateral offset value when the host vehicle runs on a straight road.

In FIG. 27, the center position of the host vehicle is A, and the center position of the obstacle ahead of the host vehicle as well as the left/right edges are represented by B, C, D, respectively. The distances from center position A of the host vehicle to center position B, left edge C and right edge D of the obstacle are L, L1, L2; and the angles are θ, θ1, θ2, respectively. Also, the width of the host vehicle is D0, the width of the obstacle is D1. In addition, the center position of the host vehicle when the host vehicle reaches the current position of the obstacle is E, and the lateral offset value α is the distance between position E and center position B of the obstacle.

In the following, an explanation will be given regarding a geometric method for determining lateral offset value α using distances L1, L2 and angles θ1, θ2 to the left/right edges of the obstacle. The various vectors in FIG. 27 are represented by following formulas (22-24).

$$\vec{AC} = \begin{pmatrix} -L_1 \cdot \sin\theta_1 \\ L_1 \cdot \cos\theta_1 \end{pmatrix} \quad (22)$$

$$\vec{AD} = \begin{pmatrix} -L_2 \cdot \sin\theta_2 \\ L_2 \cdot \cos\theta_2 \end{pmatrix} \quad (23)$$

$$\vec{AE} = \begin{pmatrix} -L \cdot \sin\theta \\ L \cdot \cos\theta \end{pmatrix} \quad (24)$$

Also, vector AE can be represented by following formula (25).

$$\vec{AE} = \frac{\vec{AC} + \vec{AD}}{2} \quad (25)$$

Consequently, vector AE becomes $$\vec{AE} = \frac{1}{2} \cdot \begin{pmatrix} -L_1 \cdot \sin\theta_1 - L_2 \cdot \sin\theta_2 \\ L_1 \cdot \cos\theta_1 + L_2 \cdot \cos\theta_2 \end{pmatrix} \quad (26)$$

Using the formulas (24) and (26), the lateral offset value α can be computed using following formula (27).

$$\alpha = L \cdot \cos\theta = \frac{L_1 \cdot \cos\theta_1 + L_2 \cdot \sin\theta_2}{2} \quad (27)$$

Also, obstacle width D1 can be computed using the following formula (28).

$$D_1^2 = L_1^2 + L_2^2 - 2L_1 \cdot L_2 \cos(\theta_1 - \theta_2) \quad (28)$$

$$\therefore D_1 = \sqrt{L_1^2 + L_2^2 - 2L_1 \cdot L_2 \cos(\theta_1 - \theta_2)}$$

In the following, with reference to FIG. 28, an explanation will be given regarding the method for computing lateral offset value α when there is an obstacle ahead of the host vehicle when the host vehicle runs on a curved road as shown in FIG. 26.

Figure 28:
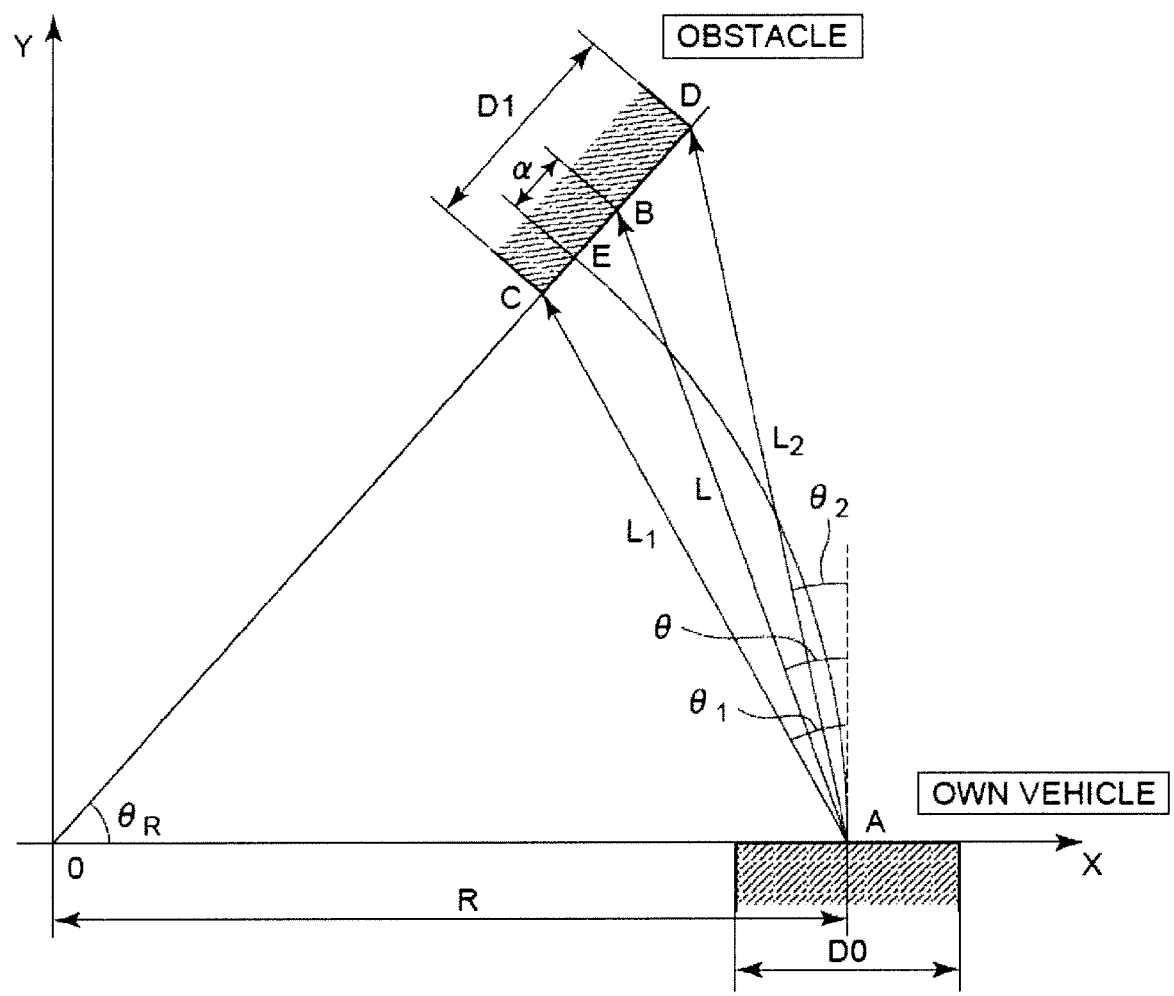
FIG. 28 is a diagram illustrating the method for computing the lateral offset value when the host vehicle runs on a curved road.

As shown in FIG. 28, the position of the center of the curved road is taken as O, and the central angle between the host vehicle and the obstacle is taken as θR. Also, the position of the center of the host vehicle when the host vehicle reaches the current position of the obstacle is taken as E, and the distance between position E and obstacle center position B is taken as α. Also, R represents the turning radius of the curved road.

In the following, an explanation will be given regarding a geometric method for determining lateral offset value α using distances L1, L2 and angles θ1, θ2 to the left/right edges of the obstacle, as well as vehicle speed V. The various vectors in FIG. 28 are represented by following formulas (29-37).

$$\vec{OA} = \begin{pmatrix} R \\ 0 \end{pmatrix} \quad (29)$$

$$\vec{AB} = \begin{pmatrix} -L \cdot \sin\theta \\ L \cdot \cos\theta \end{pmatrix} \quad (30)$$

$$\vec{AC} = \begin{pmatrix} -L_1 \cdot \sin\theta_1 \\ L_1 \cdot \cos\theta_1 \end{pmatrix} \quad (31)$$

$$\vec{AD} = \begin{pmatrix} -L_2 \cdot \sin\theta_2 \\ L_2 \cdot \cos\theta_2 \end{pmatrix} \quad (32)$$

$$\vec{CB} = \begin{pmatrix} -L_2 \cdot \sin\theta_2 \\ L_2 \cdot \cos\theta_2 \end{pmatrix} \quad (33)$$

$$\vec{OE} = \begin{pmatrix} R \cdot \cos\theta_R \\ R \cdot \sin\theta_R \end{pmatrix} \quad (34)$$

$$\vec{CB} = \vec{AB} - \vec{AC} = \begin{pmatrix} -L \cdot \sin\theta + L_1 \cdot \sin\theta_1 \\ L \cdot \cos\theta - L_1 \cdot \cos\theta_1 \end{pmatrix} \quad (35)$$

$$\vec{BD} = \vec{AD} - \vec{AB} = \begin{pmatrix} -L_2 \cdot \sin\theta_2 + L_1 \cdot \sin\theta \\ L_2 \cdot \cos\theta_2 - L \cdot \cos\theta \end{pmatrix} \quad (36)$$

$$\vec{OB} = \vec{OA} + \vec{AB} = \begin{pmatrix} R - L \cdot \sin\theta \\ L \cdot \cos\theta \end{pmatrix} \quad (37)$$

Also, radius of curvature R of the curved road can be determined using formula (38) from steering wheel gear ratio STR_GR, wheel base 1, and stability factor A.

$$R = (1 + A \cdot V^2) \cdot l \cdot \frac{STR\_GR}{STR} \quad (38)$$

Width D1 of the obstacle can be determined using formula (28) in the same way as the state of driving on a straight road. By means of width D1 of the obstacle, it is possible to compute distance L to the center of the obstacle using formula (39).

$$L_1^2 + L_2^2 = 2 \cdot \left(\left(\frac{D_1}{2}\right)^2 + L^2\right) \tag{39}$$

$$\therefore L = \sqrt{\frac{L_1^2 + L_2^2}{2} - \left(\frac{D_1}{2}\right)^2}$$

With regard to angle θ between obstacle center position B and the central line of the host vehicle in the longitudinal direction, because vector CB=vector BD, it can be represented by formula (40).

$$\sin\theta = \frac{L_1 \cdot \sin\theta_1 + L_2 \cdot \sin\theta_2}{2L} \tag{40}$$

$$\cos\theta = \frac{L_1 \cdot \cos\theta_1 + L_2 \cdot \cos\theta_2}{2L}$$

Also, because vector OB and vector OE are parallel with each other, the central angle θR between the host vehicle and the obstacle can be represented by formula (41) below.

$$\tan\theta_R = \frac{L \cdot \cos\theta}{R - L \cdot \sin\theta} \tag{41}$$

If the angle in the front-left direction of the host vehicle is positive, the offset value α between the host vehicle and the obstacle can be computed with following formulas (42), (43).

When θ > 0

$$\alpha = |\vec{EB}| = |\vec{OB} - \vec{OE}| = \left|\begin{pmatrix} R - L \cdot \sin\theta - R \cdot \cos\theta_R \\ L \cdot \cos\theta - R \cdot \sin\theta_R \end{pmatrix}\right| \tag{42}$$

When θ < 0

$$\alpha = -|\vec{EB}| = -|\vec{OB} - \vec{OE}| = -\left|\begin{pmatrix} R - L \cdot \sin\theta - R \cdot \cos\theta_R \\ L \cdot \cos\theta - R \cdot \sin\theta_R \end{pmatrix}\right| \tag{43}$$

Figure 29:
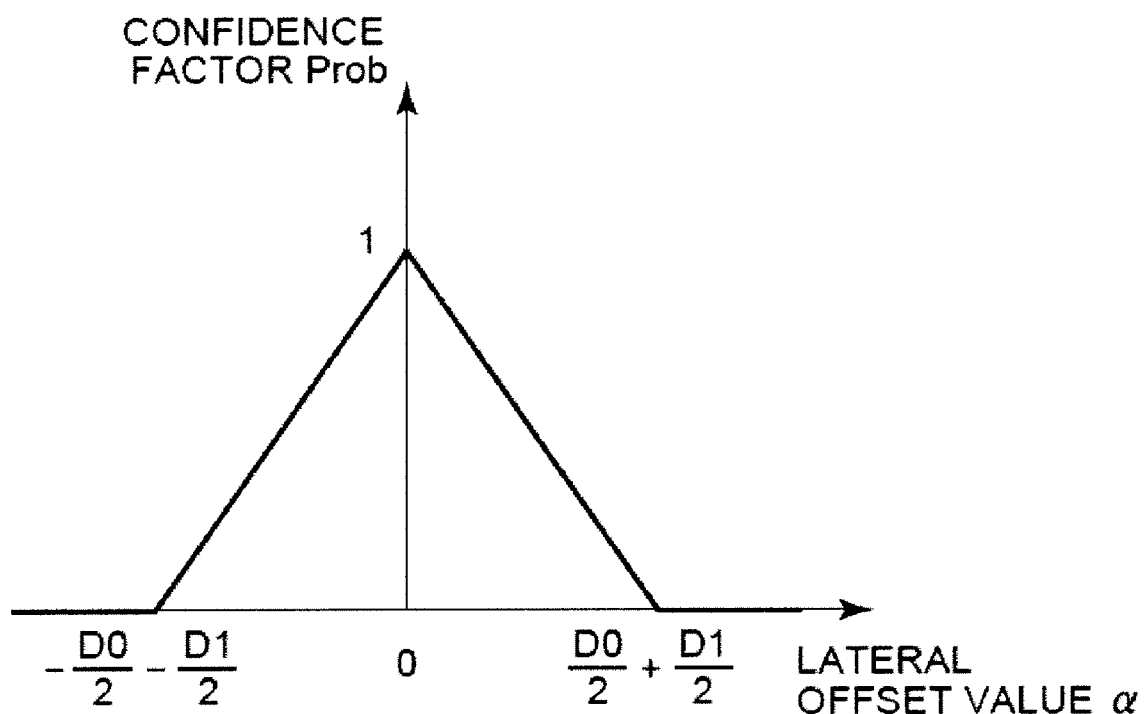
FIG. 29 is diagram illustrating the relationship between the lateral offset value and the confidence factor.

In this way, after lateral offset value α is computed in step S1310 when the host vehicle runs on a straight road or on a curved road, the flow goes to step S1320. In step S1320, the computed lateral offset value α is used to compute confidence factor Prob of the obstacle. FIG. 29 is a diagram illustrating the relationship between lateral offset value α and confidence factor Prob.

As shown in FIG. 29, when lateral offset value α=0, that is, when vehicle center position A and center position B of the obstacle ahead of the host vehicle are in agreement when the host vehicle reaches the position of the obstacle ahead, it is judged that the obstacle ahead of the host vehicle will definitely continue to be an object for control, so confidence factor Prob=1. That is, the higher the confidence that an obstacle ahead of the host vehicle is located ahead of the host vehicle, the larger value is set for confidence factor Prob. The larger the lateral offset value α, the higher the possibility that the obstacle ahead of the host vehicle will not remain as an obstacle ahead of the host vehicle. In this case, the confidence factor Prob that a current obstacle ahead of the host vehicle will remain to be an object for control is gradually reduced. When α>(D0/2+D1/2) or α<(−D0/2−D1/2), the superposing quantity between the host vehicle and the obstacle ahead of the host vehicle in the lateral direction disappears, and confidence factor Prob is set at 0.

In this way, after confidence factor Prob of the obstacle is computed in step S1300, the flow goes to step S300. In step S300, the operation is performed in the same way as in step S300 of Embodiment 1 shown in FIG. 4.

After computing first inter-vehicle distance threshold L*1 in step S300, the flow goes to step S400. In step S400, the alarm flag Fw is computed. The treatment performed in step S400 is the same as that in step S400 in Embodiment 1 shown in FIG. 4.

Then, in step S500, based on the first inter-vehicle distance threshold L*1, target accelerator pedal reactive force FA* for applying on accelerator pedal 72 is determined. In order to compute target accelerator pedal reactive force FA*, first, difference (deviation in inter-vehicle distance) ΔL1 between first inter-vehicle distance threshold L*1 and actual inter-vehicle distance L is computed using the formula (7).

$$\Delta L1 = L*1 - L \tag{7}$$

Then, from first inter-vehicle distance threshold L*1 and inter-vehicle distance deviation ΔL1, formula (8) is used to compute target accelerator pedal reactive force FA*.

$$FA* = Kp \times \Delta L1 \tag{8}$$

Figure 30:
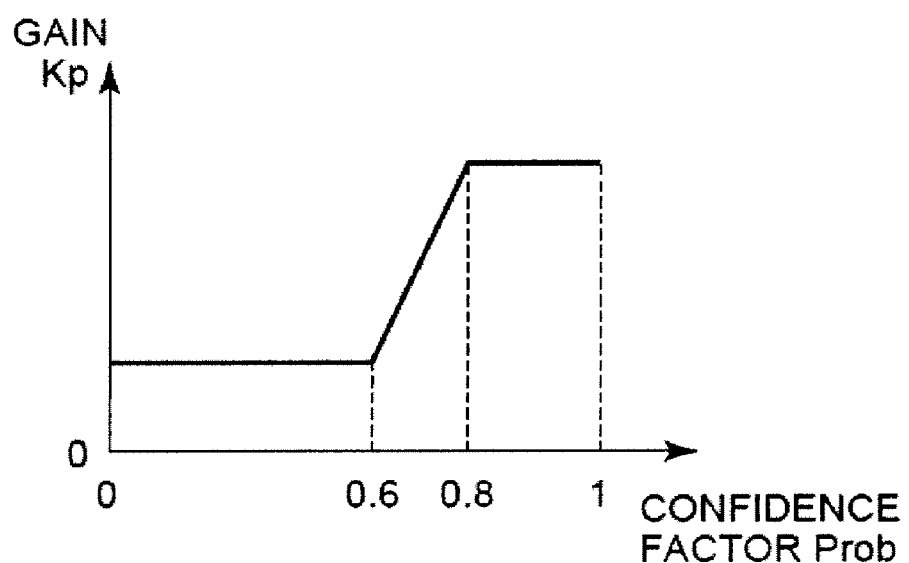
FIG. 30 is a diagram illustrating a process for correcting the target accelerator pedal reactive force.
Figure 31:
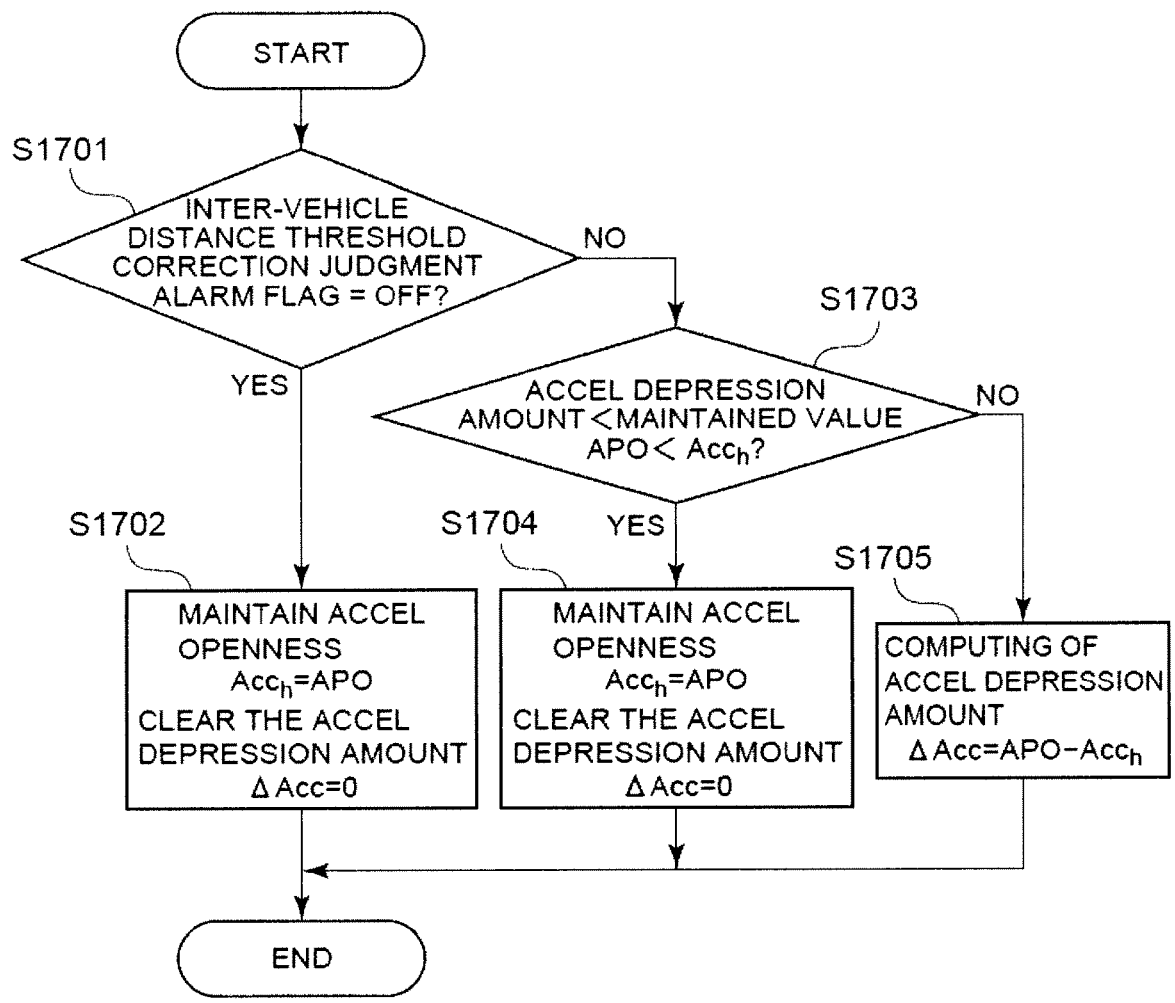
FIG. 31 is a flow chart illustrating a process for judging the driver operation.
Figure 32:
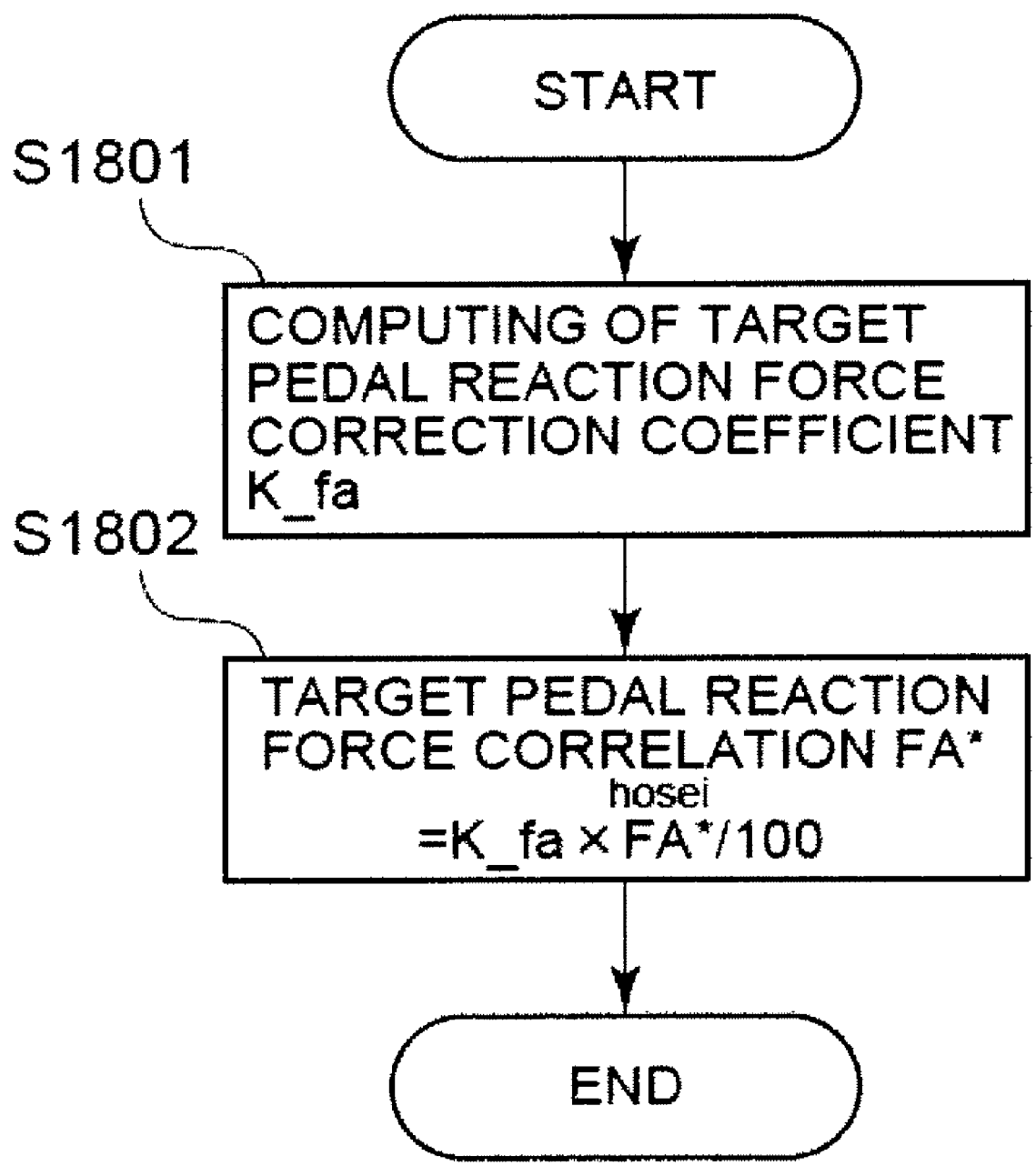
FIG. 32 is a flow chart illustrating a process for correcting the target accelerator pedal reactive force.

In formula 8, Kp represents a gain for computing target accelerator pedal reactive force FA* from inter-vehicle distance deviation ΔL1, and it is set based on confidence factor Prob of the obstacle computed in step S1300. FIG. 30 is a diagram illustrating the relationship between confidence factor Prob and gain Kp. As shown in FIG. 30, the smaller the confidence factor Prob, the lower the gain Kp is set. Here, target accelerator pedal reactive force FA* is computed such that it is larger when actual inter-vehicle distance L decreases with respect to first inter-vehicle distance threshold L*1, and it is smaller when gain Kp computed based on confidence factor Prob is lower. When an obstacle is present directly ahead of the host vehicle, confidence factor Prob is 1. On the other hand, when the host vehicle and the obstacle superpose each other by about half, confidence factor Prob is 0.8. Also, for example, when the right end of the host vehicle and the left end of the obstacle are in agreement, confidence factor Prob is 0.6.

In this way, target accelerator pedal reactive force FA* is computed in step S500. Then, the flow goes to step S1700. In step S1700, judgment is made on whether the operator has further depressed accelerator pedal 72. In the following, an explanation will be given regarding the treatment performed in this case with reference to the flow chart shown in FIG. 31.

In step S1701, as the condition for refreshing accelerator pedal opening retention value Acch, judgment is made on whether alarm flag Fw computed in step S400 is set. When alarm flag Fw is not set (Fw=OFF), the flow goes to step S1702. On the other hand, when alarm flag Fw is set (Fw=ON), the flow goes to step S1703.

In step S1702, accelerator pedal depression quantity APO of accelerator pedal 72, as the driver depresses the pedal, detected by accelerator pedal depression quantity detecting part 73 is set as accelerator pedal opening retention value Acch. Then, accelerator pedal depression increment ΔAcc of accelerator pedal 72 is cleared (Δacc=0). Here, accelerator pedal depression increment ΔAcc is a value indicating whether accelerator pedal 72 is further depressed from the accelerator pedal opening retention value Acch, that is, whether the accelerator pedal is further depressed.

In step S1703, judgment is made on whether accelerator pedal depression quantity APO detected with accelerator pedal depression quantity detecting part 73 is smaller than accelerator pedal opening retention value Acch. If accelerator pedal depression quantity APO is smaller than accelerator pedal opening retention value Acch, the flow goes to step S1704. On the other hand, if accelerator pedal depression quantity APO is larger than accelerator pedal opening retention value Acch, the flow goes to step S1705.

In step S1704, while accelerator pedal depression quantity APO detected with accelerator pedal depression quantity detecting part 73 is set as accelerator pedal opening retention value Acch, accelerator pedal depression increment ΔAcc is cleared (Δacc=0). On the other hand, in step S1705, accelerator pedal depression increment ΔAcc is computed from accelerator pedal depression quantity APO and accelerator pedal opening retention value Acch using the following formula.

$$\Delta Acc = APO - Acch \quad (44)$$

In this way, after the treatment of judgment of the driver operation in step S1700, that is, after judgment on whether the driver has depressed accelerator pedal 72, the flow goes to step S1800. In step S1800, based on the depression operation of the driver judged in step S1700, target accelerator pedal reactive force FA* computed in step S500 is corrected. In the following, an explanation will be given regarding the treatment performed here with reference to the flow chart shown in FIG. 32.

First, in step S1801, based on accelerator pedal depression increment ΔAcc computed in step S1700, target pedal reactive force correction coefficient K_fa for correcting target accelerator pedal reactive force FA* is computed according to the following formula (45).

$$K\_fa = 100 - (\Delta Acc \times Kacc) \quad (45)$$

Figure 33:
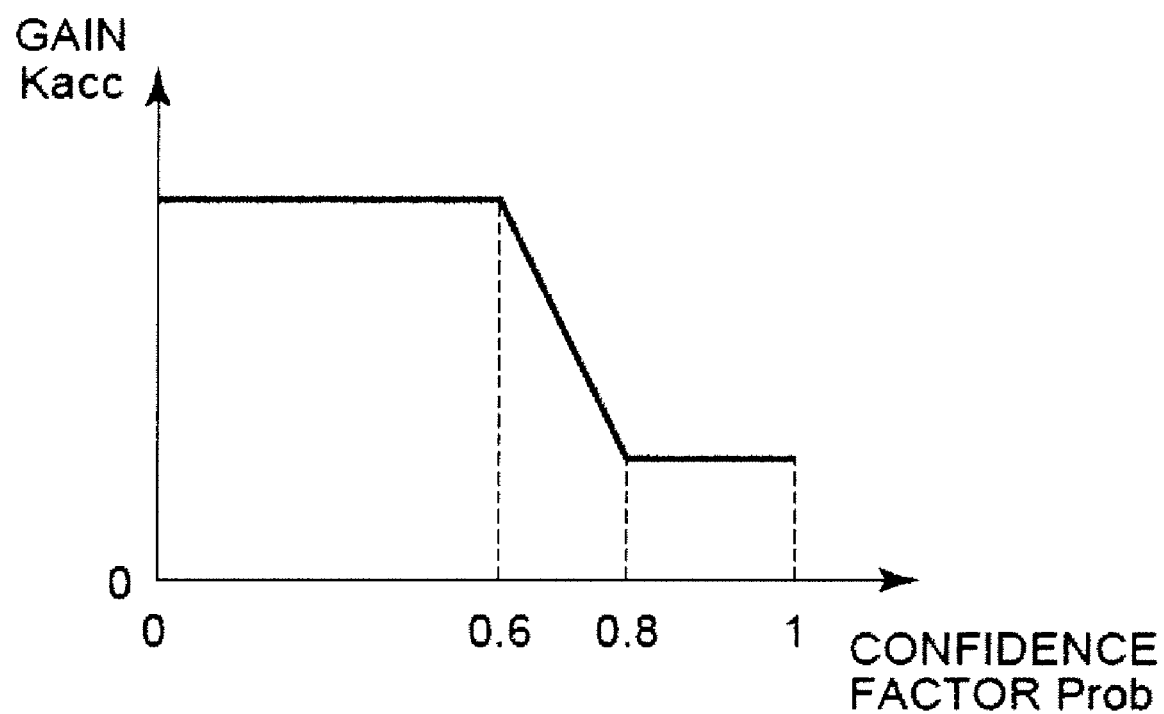
FIG. 33 is a diagram illustrating the relationship between the confidence factor and gain Kacc.
Figure 34:
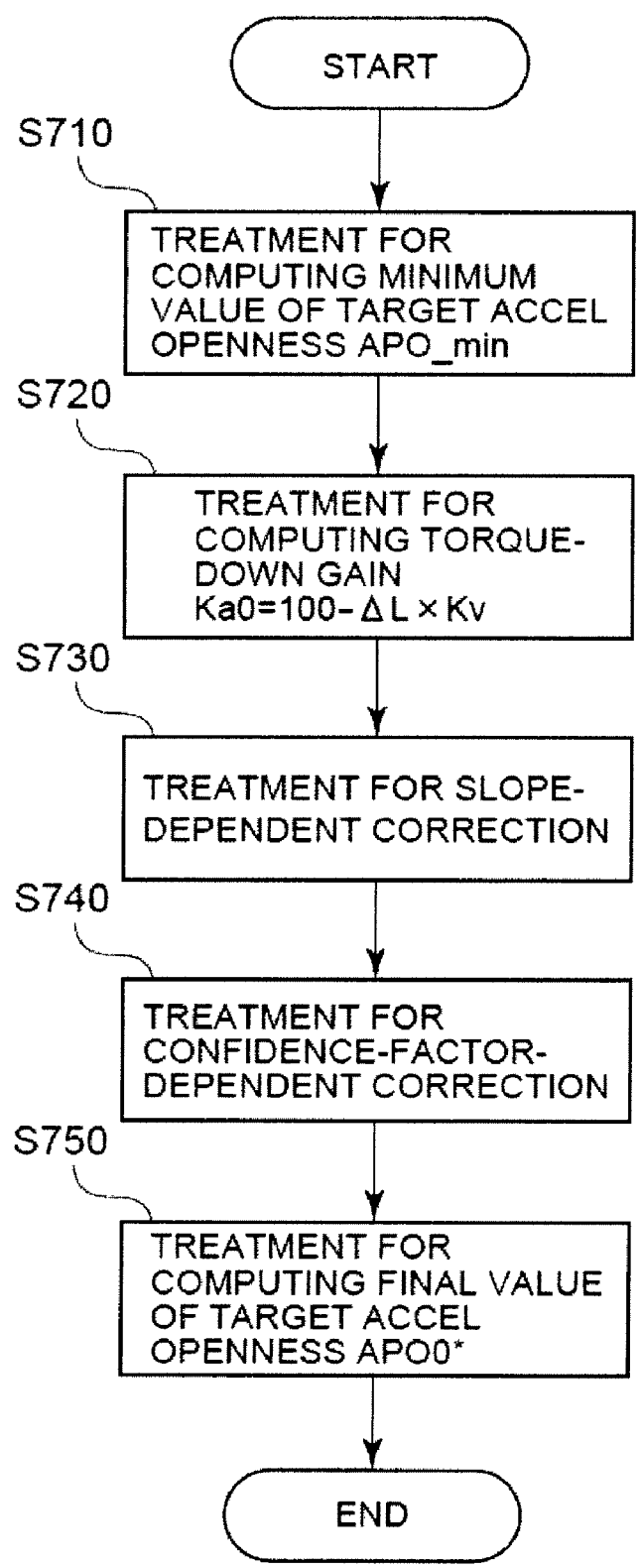
FIG. 34 is a flow chart illustrating a process for computing the final value of the target accelerator pedal opening.

Here, Kacc is the gain for computing target pedal reactive force correction coefficient K_fa from accelerator pedal depression increment ΔAcc, and it is set based on confidence factor Prob of the obstacle computed in step S1300. FIG. 33 is a diagram illustrating the relationship between confidence factor Prob and gain Kacc. As shown in FIG. 33, when confidence factor Prob approaches unity, gain Kacc is set at a minimum value, and it is set such that the smaller the confidence factor Prob, the higher the gain Kacc. Here, the maximum value of target pedal reactive force correction coefficient K_fa is 100, and the minimum is 0.

In step S1802, target accelerator pedal reactive force corrected value FA*corr is computed by means of the following formula (46) from target pedal reactive force correction coefficient K_fa computed in step S1801 and target accelerator pedal reactive force FA* computed in step S500.

$$FA*corr = K\_fa \times FA*/100 \quad (46)$$

Consequently, the smaller the confidence factor Prob, the larger the gain Kacc, and the larger the correction quantity of target accelerator pedal reactive force FA* with respect to accelerator pedal depression increment ΔAcc. That is, in this case, target accelerator pedal reactive force corrected value FA*corr decreases and accelerator pedal 72 can be depressed more easily. Also, the larger the accelerator pedal depression increment ΔAcc, the smaller the target pedal reactive force correction coefficient K_fa, and the smaller the target accelerator pedal reactive force corrected value FA*corr.

In this way, after target accelerator pedal reactive force corrected value FA*corr is computed in step S1800, the flow goes to step S600. In step S600, treatment is performed in the same way as in step S600 shown in FIG. 4.

In this way, after performing the treatment for computing the second inter-vehicle distance threshold in step S600, the flow goes to step S700. In step S700, from second inter-vehicle distance threshold L2* computed in step S600 as well as inter-vehicle distance deviation ΔL2, target accelerator pedal opening final value APO0* for controlling the output quantity of the engine torque with respect to accelerator pedal depression quantity APO by the driver is computed. In the following, an explanation will be given in more detail regarding the treatment for computing the final value of the target accelerator pedal opening in step S700 with reference to the flow chart shown in FIG. 34.

First, in step S710, target accelerator pedal opening minimum value APO_min with respect to accelerator pedal depression quantity APO is computed. The treatment in step S710 is the same as that in step S710 shown in FIG. 11 in Embodiment 1.

In step S720, torque down gain Ka0 is computed. The treatment performed in step S720 is the same as that in step S720 shown in FIG. 11 in Embodiment 1.

In step S730, torque down gain Ka0 computed in step S720 is corrected corresponding to gradient SLP of the road on which the host vehicle runs. First, from the map shown in FIG. 12 of Embodiment 1, gradient-depending corrected gain Ka_slp is computed.

By means of gradient-depending corrected gain Ka_slp computed based on gradient SLP of the road on which the host vehicle runs, torque down gain Ka0 computed in step S720 is corrected, and torque down gain Ka1 is re-computed. The torque down gain Ka1 is computed using the following formula (47).

$$Ka1 = Ka0 + Ka\_slp \quad (47)$$

Here, torque down gain Ka1 has a maximum value of 100 and a minimum value of 0.

Figure 35:
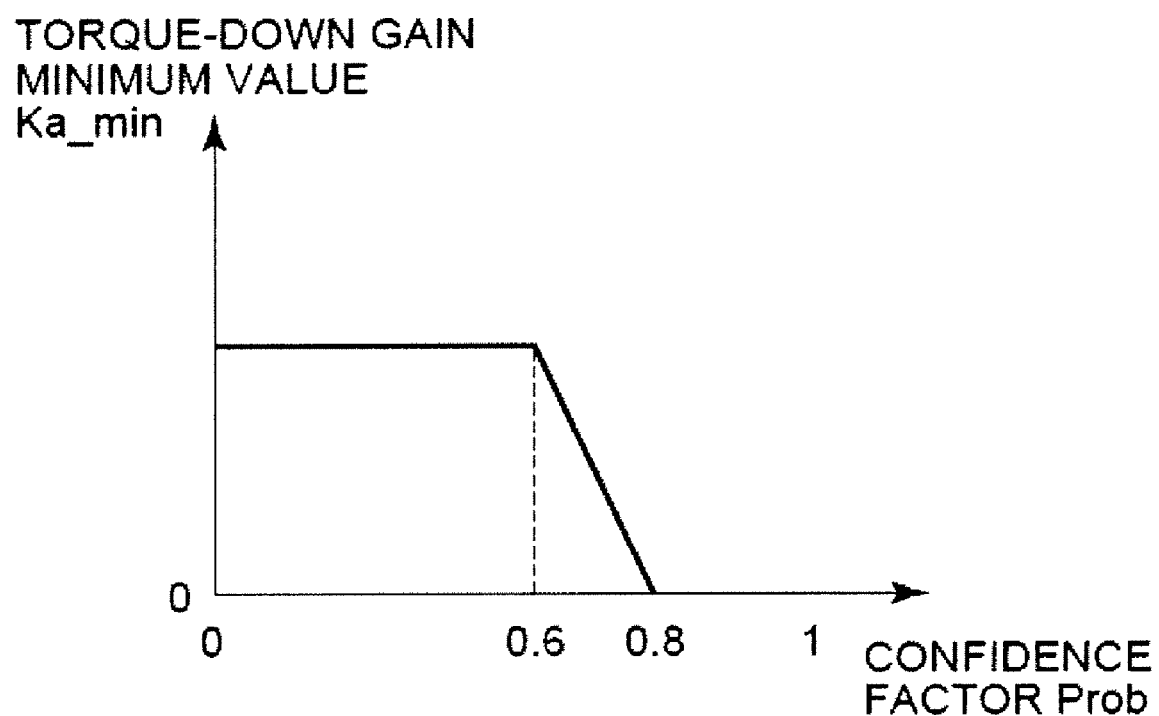
FIG. 35 is a diagram illustrating the relationship between the confidence factor and the torque down gain minimum value.
Figure 36:
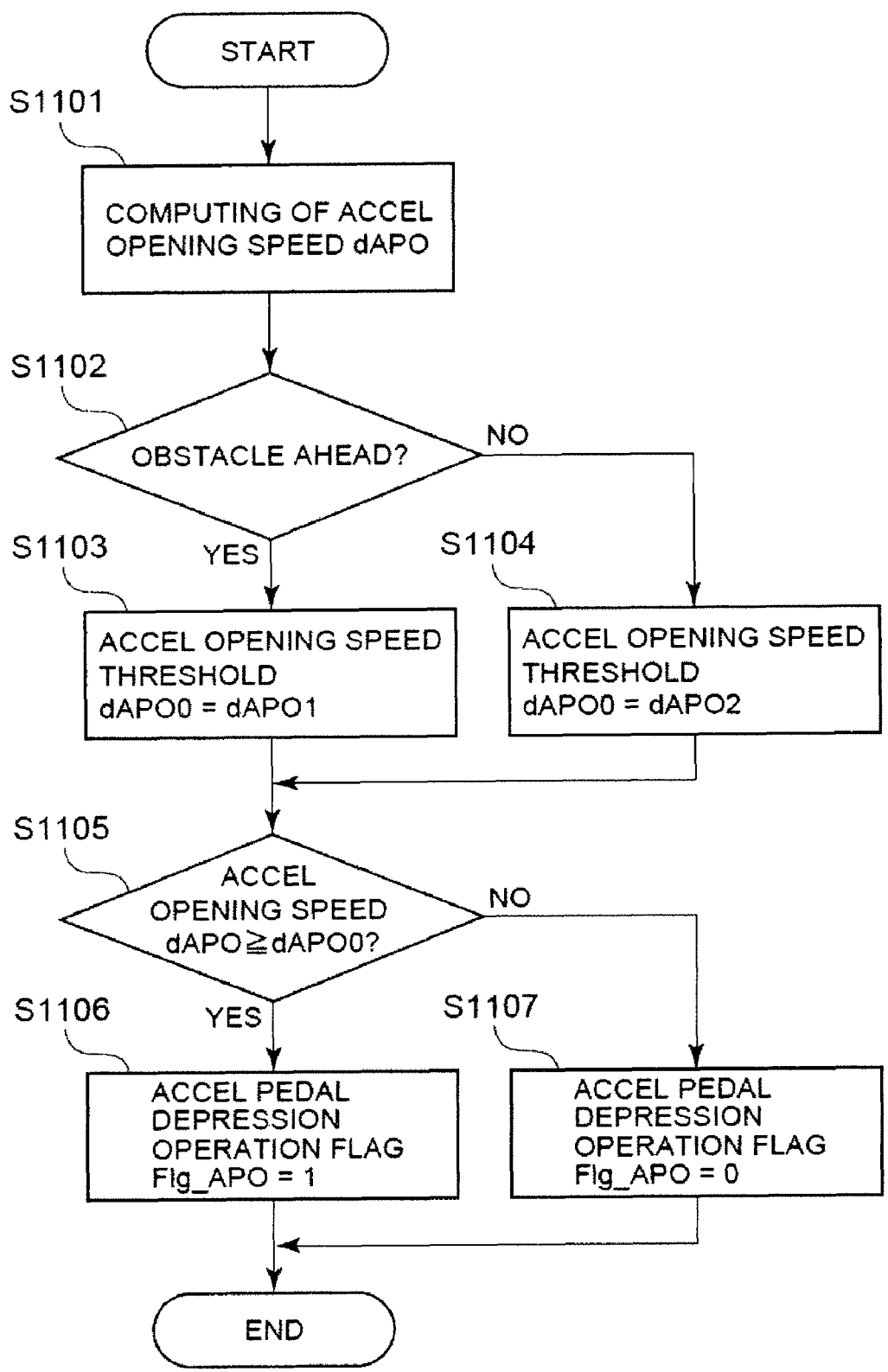
FIG. 36 is a flow chart illustrating a process for detecting the accelerator pedal depression operation.

In step S740, based on confidence factor Prob computed in step S1300, torque down gain Ka1 computed in step S730 is corrected. First, from the map shown in FIG. 35, torque down gain minimum value Ka_min is computed corresponding to confidence factor Prob. As shown in FIG. 35, the smaller the confidence factor Prob of the obstacle, the larger the torque down gain minimum value Ka_min is set. By restricting torque down gain Ka1 computed in step S730 using torque down gain minimum value Ka_min computed based on confidence factor Prob, final torque down gain Ka is computed. More specifically, by means of select-high for torque down gain Ka1 and torque down gain minimum value Ka_min as shown in the following (48), torque down gain Ka is computed.

$$Ka = \max(Ka1, Ka\_min) \quad (48)$$

In step S750, target accelerator pedal opening final value APO0* is computed. Target accelerator pedal opening final value APO0* is computed by interior-dividing target accelerator pedal opening minimum value APO_min computed in step S710 and accelerator pedal depression quantity APO of the driver in torque down gain Ka computed in step S1040. The formula for computing is the same as formula (19) in Embodiment 1.

In this way, after computing target accelerator pedal opening final value APO0* in step S700, the flow goes to step S1100. In step S1100, the treatment for detecting the accelerator pedal depression operation is performed. In the following, an explanation will be given regarding the treatment performed in step S1100 with reference to the flow chart shown in FIG. 36.

In step S1101, by performing differential treatment for accelerator pedal depression quantity APO of the driver detected with accelerator pedal depression quantity detecting part 73, the depression speed of accelerator pedal 72, that is, accelerator pedal opening speed dAPO, is computed.

Figure 37:
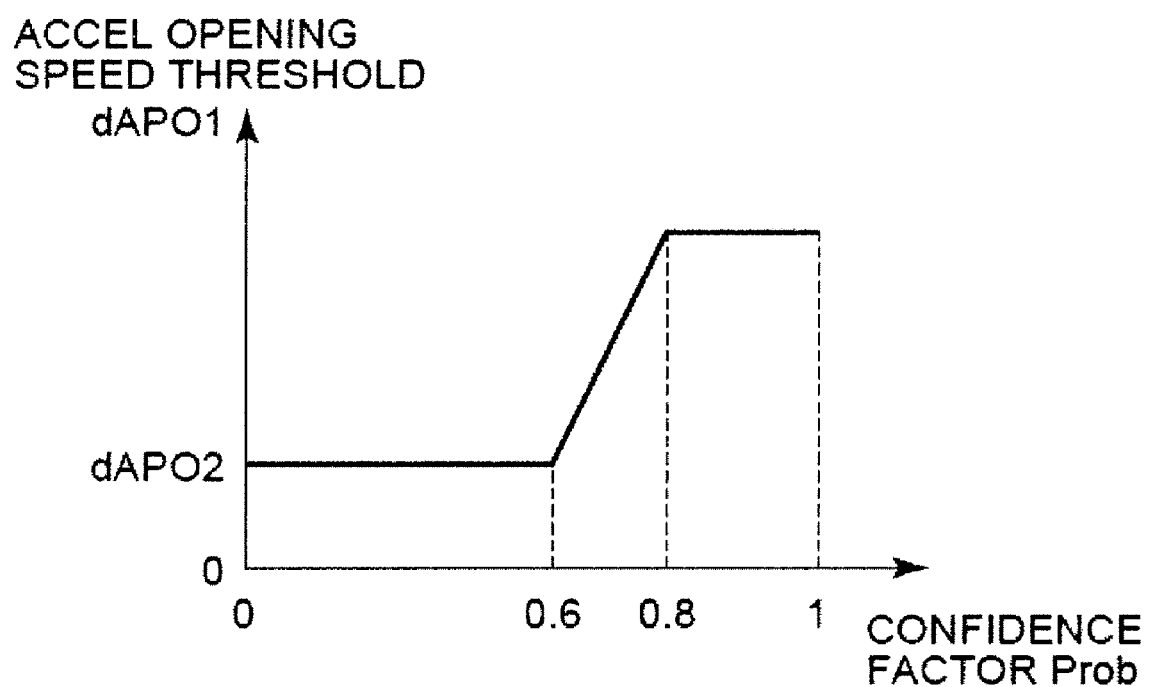
FIG. 37 is a diagram illustrating the relationship between the confidence factor and the accelerator pedal opening speed threshold.

In step S1102, judgment is made on whether an obstacle exists ahead of the host vehicle. When an obstacle ahead of the host vehicle is detected with laser radar 10, the flow goes to step S1103. In step S1103, accelerator pedal opening speed threshold dAPO1 computed based on confidence factor Prob is set in accelerator pedal opening speed threshold dAPO0 as the threshold for judging the depression operation of accelerator pedal 72. FIG. 37 is a diagram illustrating the relationship between confidence factor Prob of the obstacle and accelerator pedal opening speed threshold dAPO1. As shown in FIG. 37, the larger the confidence factor Prob, the larger accelerator pedal opening speed threshold dAPO1 is. When confidence factor Prob is smaller, accelerator pedal opening speed threshold dAPO1 is set smaller. Consequently, the smaller the confidence factor Prob of the obstacle, the earlier can the depression operation of the driver on the accelerator pedal be detected. In other words, a sensitivity of detecting the acceleration intention of the driver is increased when the confidence factor becomes smaller.

When it is judged that an obstacle does not exist ahead of the host vehicle in step S1102, the flow goes to step 1104, and preset value dAPO2 is set as accelerator pedal opening speed threshold dAPO0. Here, value dAPO2 when an obstacle does not exist ahead of the host vehicle corresponds to the minimum value of accelerator pedal opening speed threshold dAPO1 in the map of confidence factor Prob and accelerator pedal opening speed threshold dAPO1 shown in FIG. 37.

In step S1105, judgment is made on whether accelerator pedal opening speed dAPO computed in step S1101 exceeds accelerator pedal opening speed threshold dAPO0 set in step S1103 or S1104. If dAPO≧dAPO0, it is judged that accelerator pedal 72 is depressed, and the flow goes to step S1106, and accelerator pedal depression operation flag Flg_APO is set at 1. On the other hand, if dAPO<dAPO0, it is judged that the driver is not depressing accelerator pedal 72, that is, accelerator pedal 72 is kept as is or is reset, or accelerator pedal 72 is released. Then, the flow goes to step S1107, and accelerator pedal depression operation flag Flg_APO is set at 0, that is, it is cleared.

In this way, after the treatment of detection of the depression operation of accelerator pedal 72 in step S1100, the flow goes to step S900. In step S900, treatment is performed just as in step S900 in FIG. 4 of Embodiment 1.

In step S1000, target accelerator pedal opening APO* computed in step S900 is output to engine controller 74, and, at the same time, target accelerator pedal reactive force corrected value FA*corr computed in step S1800 is output to accelerator pedal reactive force controller 70. Engine controller 74 controls the engine torque generation quantity according to target accelerator pedal opening APO* to perform engine torque control. Accelerator pedal reactive force controller 70 controls the accelerator pedal depression reactive force generated on accelerator pedal 72 corresponding to the target accelerator pedal reactive force corrected value FA*corr. At this point, the treatment of the current round comes to an end.

In the Embodiment 3, the following operational effects can be realized.

(1) The first inter-vehicle distance threshold L*1 is computed based on the state of an obstacle located ahead of the host vehicle, and the reactive force to be generated on accelerator pedal 72 is determined based on computed first inter-vehicle distance threshold L*1 and the positional relationship between the host vehicle and the obstacle. Also, based on the state of the obstacle, second inter-vehicle distance threshold L*2 is computed, and the relationship of the engine torque generation quantity versus accelerator pedal depression quantity APO is corrected in the decreasing direction based on the computed second inter-vehicle distance threshold L2* and the positional relationship between the host vehicle and the obstacle. With the Embodiment 3, for example, when the host vehicle approaches the obstacle ahead of the host vehicle from a more distant site, the engine torque generation quantity is decreased with respect to the depression quantity of accelerator pedal 72, so that the host vehicle can easily enter the running mode in tracking the preceding vehicle. Also, because even in the tracking driving mode, the engine torque is still controlled based on the positional relationship between the host vehicle and the obstacle and second inter-vehicle distance threshold L2*, it is possible to reduce the correction operation of accelerator pedal 72 performed by the driver in the tracking driving mode, and it is possible to reduce the physical load on the driver. Also, the confidence factor concerning the continuous presence of the obstacle ahead of the host vehicle is computed, and, based on the computed confidence factor, decrease correction of the engine torque is further performed. Consequently, when the driver tries to pass the obstacle ahead of the host vehicle, it is possible to reduce the feeling of discomfort caused by poor acceleration, that is, the desired acceleration cannot be obtained although accelerator pedal 72 is depressed.

(2) By correcting the accelerator pedal reactive force based on the confidence factor, for example, when the driver tries to pass the obstacle ahead of the host vehicle, it is possible to reduce the difficulty in depressing the accelerator pedal caused by a higher reactive force on accelerator pedal 72.

(3) When the relationship of the engine torque generation quantity versus the accelerator pedal depression quantity corrected in the decreasing direction corresponding to the positional relationship between the host vehicle and the obstacle is reset to the normal relationship, the resetting control is corrected based on the confidence factor. For example, when the driver tries to pass the obstacle ahead of the host vehicle, it is possible to appropriately reset the relationship of the engine torque generation quantity versus the accelerator pedal depression quantity.

(4) Controller 50 performs a correction such that the smaller the confidence factor Prob, the larger the engine torque generation quantity with respect to the accelerator pedal depression quantity. More specifically, as shown in FIG. 35, the smaller the confidence factor Prob of the obstacle, the larger the torque down gain minimum value Ka_min is set, and target accelerator pedal opening final value APO0 is calculated. Consequently, for example, when the driver tries to pass the obstacle ahead of the host vehicle, it is possible to realize acceleration corresponding to the depression operation of the driver on the accelerator pedal.

(5) Controller 50 performs a correction such that the smaller the confidence factor Prob, the smaller the accelerator pedal reactive force. More specifically, as shown in FIG. 30, the smaller the confidence factor Prob, the lower the gain Kp is set, and gain Kp is used to compute target accelerator pedal reactive force FA*. As a result, for example, when the driver tries to pass the obstacle ahead of the host vehicle, it is possible to reduce the difficulty in operation of accelerator pedal 72 due to a higher reactive force on the accelerator pedal.

(6) When it is detected that accelerator pedal 72 is further depressed, correction is performed such that the smaller the confidence factor Prob, the smaller the accelerator pedal reactive force. More specifically, as shown in FIG. 33, the smaller the confidence factor Prob, the higher the gain Kacc is set, and target accelerator pedal reactive force corrected value FA*corr is computed based on gain Kacc and accelerator pedal depression increment ΔAcc. As a result, when the host vehicle approaches the obstacle ahead of the host vehicle, the driver is prompted reliably by the accelerator pedal reactive force to operate appropriately. In addition, when the driver tries to pass the obstacle ahead of the host vehicle, correction can be made so that the accelerator pedal reactive force is decreased at an earlier timing, and it is possible to reduce the difficulty in performing the depression operation on accelerator pedal 72 caused by an increased reactive force on accelerator pedal 72.

(7) When the depression operation of accelerator pedal 72 is detected, controller 50 resets the relationship of the engine torque generation quantity versus the accelerator pedal depression quantity to the normal relationship. As a result, it is possible to reduce the feeling of discomfort of the driver due to acceleration of the host vehicle caused by resetting the relationship of the engine torque generation quantity versus the accelerator pedal depression quantity although the driver holds accelerator pedal 72.

(8) Correction is performed such that the smaller the confidence factor Prob, the earlier the detection timing of the depression operation of accelerator pedal 72. More specifically, as shown in FIG. 37, the smaller the confidence factor Prob, the smaller the accelerator pedal opening speed threshold dAPO1 of accelerator pedal opening speed dAPO of accelerator pedal 72 is set. As a result, when the driver depresses accelerator pedal 72, the depression operation by the driver can be detected at an earlier timing.

(9) Controller 50 resets the relationship of the engine torque generation quantity versus accelerator pedal depression quantity APO to the normal relationship earlier when confidence factor Prob is smaller. More specifically, according to the map shown in FIG. 35, torque down gain output value Ka_out is computed using torque down gain minimum value Ka_min set corresponding to confidence factor Prob, and target accelerator pedal opening APO* is computed. As a result, for example, when the driver tries to pass the obstacle ahead of the host vehicle, it is possible to reset the relationship of the engine torque generation quantity versus the accelerator pedal depression quantity to the normal relationship at an earlier timing, and it is possible to reduce the feeling of discomfort caused by poor acceleration.

MODIFIED EXAMPLES (1) In said explanation, as shown in FIG. 17, the setting is such that when the actual inter-vehicle distance L is greater, limiter Ka_up1 for increasing the torque down gain is gradually increased, so that the rate of increase of target accelerator pedal opening APO* when increase correction is performed for target accelerator pedal opening APO* with respect to accelerator pedal depression quantity APO is higher as inter-vehicle distance L increases. However, the present invention is not limited to this case. One may also adopt a configuration in which when vehicle speed VSP or relative speed Vr with respect to the preceding vehicle is higher, the rate of increase of target accelerator pedal opening APO* when increase correction is performed for target accelerator pedal opening APO* with respect to accelerator pedal depression quantity APO is higher.

(2) In said explanation, as the control instruction value to engine controller 74, controller 50 computes target accelerator pedal opening APO*. However, the present invention is not limited to this case. One may also adopt a scheme in which the throttle valve opening is computed as an engine control instruction. Also, one may adopt a scheme in which a gradient detection sensor is set for detecting gradient SLP of the road on which the host vehicle runs, and the treatment in computing the determined value of the gradient in step S610 can be omitted.

(3) In said explanation, accelerator pedal 72 has been taken as an example of driving operational equipment. However, the present invention is not limited to this case. The present invention may also be adopted for various other types of driving operational equipment for accelerating a vehicle corresponding to its operational quantity or for controlling acceleration/deceleration, such as a so-called joystick, manipulating lever, etc.

(4) In said Embodiment 3, as shown in FIGS. 30, 33, 35, 37, a map corresponding to confidence factor Prob is set. Here, the characteristics of the gain and threshold with respect to confidence factor Prob are not restricted to these figures. For example, by setting for change along a curve, certain changes may be made. Also, in said embodiment, corresponding to confidence factor Prob, the treatment for computing target accelerator pedal reactive force FA*, the treatment for detecting the accelerator pedal depression operation, the treatment for controlling the engine torque, and the treatment for resetting the engine torque are corrected. Any of them may be adopted. For example, one may also adopt a configuration in which only the treatment for correcting the relationship of the engine torque generation quantity versus accelerator pedal depression quantity APO corresponding to probability Prob is performed, while the other correction treatments corresponding to the confidence factor are omitted.

(5) In said Embodiment 3, as the control instruction value output to engine controller 74, controller 50 is used to compute target accelerator pedal opening APO*. However, the present invention is not limited to this case. One may also adopt a scheme in which the throttle valve opening is computed as the engine control instruction value. Also, a gradient detection sensor for detecting gradient SLP of the road on which the host vehicle runs may be set, and the treatment for computing the determined value of the gradient in step S910 may be omitted.

(6) Said embodiments and modified examples may be combined with each other.

In said embodiments and modified examples, for example, laser radar 10 and vehicle speed sensor 20 work as obstacle detecting means; first inter-vehicle distance threshold computing parts 52, 153 work as the first inter-vehicle distance threshold computing means; accelerator pedal reactive force determining parts 53, 153 work as the operational reactive force computing means; accelerator pedal reactive force controller 70 works as the operational reactive force generating means; second inter-vehicle distance threshold computing parts 55, 158 work as the second inter-vehicle distance threshold computing means. Also, engine controller 74 works as the engine control means; target accelerator pedal opening computing parts 56, 159 work as the engine torque control means; target accelerator pedal opening resetting parts 58, 161 work as the engine torque correcting means; accelerator pedal depression quantity detecting part 73 and accelerator pedal depression operation detecting part 160 work as the driving operational equipment operational state detection means; and gradient determined value computing part 54 works as the gradient determined value computing means. Also, confidence factor computing part 152 works as the confidence factor computing means; accelerator pedal reactive force correcting part 156 works as the operational reactive force correcting means; and driver operation judgment part 155 works as operational quantity increase detection means. However, the present invention is not limited to this case. One may also adopt a scheme in which a millimeter wave radar is used as the obstacle detection means instead of laser reader 10, and the state of the obstacle can also be detected with inter-vehicle communication or the like. That which is presented above is merely an example. When the present invention is explained, there is no specific restriction on the corresponding relationship between the described items of said embodiments and the description items in the Claims.

Given the disclosure of the present invention, one versed in the art would appreciate that there may be other embodiments and modifications within the scope of the invention. Accordingly, all modifications attainable by one versed in the art from the present disclosure within the scope of the present invention are to be included as further embodiments of the present invention. The scope of the present invention is to be defined as set forth in the following claims.

What is claimed is:

1. An inter-vehicle distance maintenance supporting system for a host vehicle, comprising
    an obstacle detector configured to detect a state of an obstacle located ahead of the host vehicle,
    a first inter-vehicle distance threshold computing device configured to compute a first inter-vehicle distance threshold based on the state of the obstacle detected with said obstacle detector,
    a driving operational equipment configured to operate the host vehicle via input from a driver of the host vehicle,
    an operational reactive force generating device, in communication with said driving operational equipment, configured to generate an operational reactive force for said driving operational equipment based on said first inter-vehicle distance threshold,
    a second inter-vehicle distance threshold computing device configured to compute a second inter-vehicle distance threshold with a value larger than said first inter-vehicle distance threshold based on the state of the obstacle detected by said obstacle detector,
    a driving operational equipment state detector, in communication with said driving operational equipment, configured to detect an operational state of said driving operational equipment and an acceleration intent of the driver,
    an engine controller configured to control an engine torque corresponding to the operational state of said driving operational equipment detected by said driving operational equipment state detector, and
    an engine torque correcting device configured to perform a decrease correction of the engine torque such that the engine torque generated with respect to the operational state is decreased when a distance to the obstacle located ahead of the host vehicle is less than the second inter-vehicle distance threshold before the operational reactive force generating device generates the operational reactive force for said driving operational equipment,
    wherein said decrease correction is suppressed when the decrease correction is performed, such that the decrease correction is reduced gradually over time when the distance to the obstacle located ahead of the host vehicle becomes greater than said second inter-vehicle distance threshold or the obstacle is no longer detected ahead of the host vehicle and said driving operational equipment state detector detects the acceleration intent of the driver.

2. The inter-vehicle distance maintenance supporting system according to claim 1, wherein said engine torque correcting device is configured to continue said suppression of the decrease correction for a prescribed time after said driving operational equipment state detector has not detected the acceleration intent of the driver.

3. The inter-vehicle distance maintenance supporting system according to claim 1, wherein said engine torque correcting device is configured to finish said suppression of the decrease correction when said driving operational equipment state detector detects that said driving operational equipment is no longer operated or said driving operational equipment is operated at an operational rate higher than a prescribed operational rate such that an acceleration operation of the host vehicle is ended.

4. The inter-vehicle distance maintenance supporting system according to claim 1, wherein said engine torque correcting device is configured to suppress the decrease correction by increasing the engine torque.

5. The inter-vehicle distance maintenance supporting system according to claim 4, wherein said engine torque correcting device is configured to raise a rate of increase of the engine torque based on the operational state detected by the driving operational equipment state detector.

6. The inter-vehicle distance maintenance supporting system according to claim 5, wherein said engine torque correcting device is configured to raise the rate of increase of the engine torque when an obstacle is not detected ahead of the host vehicle with said obstacle detector, as compared with a case when an obstacle is detected ahead of the host vehicle with said obstacle detector.

7. The inter-vehicle distance maintenance supporting system according to claim 5, wherein said engine torque correcting device is configured to raise a rate of increase of the engine torque as the distance to the obstacle ahead of the host vehicle detected by said obstacle detector becomes larger.

8. The inter-vehicle distance maintenance supporting system according to claim 1, further comprising:
    a gradient determined value computing device configured to determine a gradient of a road on which the host vehicle runs,
    and wherein said second inter-vehicle distance threshold computing device is configured to compute said second inter-vehicle distance threshold based on a result of said gradient determined value computing device.

9. The inter-vehicle distance maintenance supporting system according to claim 8, wherein said second inter-vehicle distance threshold computing device is configured to decrease the second inter-vehicle distance threshold when said gradient determined value computing device determines that the road has an upward slope, and to increase the second inter-vehicle distance threshold when said gradient determined value computing device determines that the road has a downward slope.

10. The inter-vehicle distance maintenance supporting system according to claim 1, wherein said engine torque correcting device is configured to decrease the engine torque generated with respect to the operational state when the distance to the obstacle ahead of the host vehicle, as detected by said obstacle detector, is less than the second inter-vehicle distance threshold.

11. The inter-vehicle distance maintenance supporting system according to claim 1, further comprising:
    a confidence factor computing device configured to compute a confidence factor for treating the obstacle as a preceding vehicle ahead of the host vehicle based on the state of the obstacle detected by said obstacle detector, and
    wherein said engine torque correcting device is configured to execute the decrease correction in said engine controller based on said confidence factor computed by said confidence factor computing device.

12. The inter-vehicle distance maintenance supporting system according to claim 11, further comprising:
an operational reactive force correcting device configured to correct said operational reactive force generated by said operational reactive force generating device based on said confidence factor computed by said confidence factor computing device.

13. The inter-vehicle distance maintenance supporting system according to claim 11, wherein said engine torque correcting device is configured to suppress the decrease correction by increasing the engine torque, and to execute said increase of engine torque based on said confidence factor computed by said confidence factor computing device.

14. The inter-vehicle distance maintenance supporting system according to claim 11, wherein said engine torque correcting device is configured to increase the engine torque as said confidence factor becomes smaller.

15. The inter-vehicle distance maintenance supporting system according to claim 12, wherein said operational reactive force correcting device is configured to decrease said operational reactive force as said confidence factor becomes smaller.

16. The inter-vehicle distance maintenance supporting system according to claim 1, wherein said driving operational equipment is an accelerator pedal, and said driving operational equipment state detector is configured to detect the acceleration intent of the driver by detecting a depression of the accelerator pedal.

17. The inter-vehicle distance maintenance supporting system according to claim 11, wherein said driving operational equipment state detector is configured to make a sensitivity of detecting the acceleration intention of the driver increase as said confidence factor becomes smaller.

18. The inter-vehicle distance maintenance supporting system according to claim 13, wherein said engine torque correcting device is configured to raise a rate of increase of the engine torque as said confidence factor becomes smaller.

19. An inter-vehicle distance maintenance supporting method for a host vehicle, comprising:
detecting a state of an obstacle located ahead of the host vehicle,
computing a first inter-vehicle distance threshold based on said detected state of the obstacle,
generating an operational reactive force for a driving operational equipment operated by a driver of the host vehicle based on said first inter-vehicle distance threshold,
computing a second inter-vehicle distance threshold having a value larger than said first inter-vehicle distance threshold based on said detected state of the obstacle,
detecting an operational state of said driving operational equipment and an acceleration intent of the driver,
controlling an engine torque corresponding to the detected operational state of said driving operational equipment,
performing a decrease correction of the engine torque such that the engine torque generated with respect to the operational state is decreased when a distance to the obstacle located ahead of the host vehicle is less than the second inter-vehicle distance threshold and before the operational reactive force is generated for said driving operational equipment, and
suppressing the decrease correction when the decrease correction is performed, such that the decrease correction is reduced gradually over time when the distance to the detected obstacle located ahead of the host vehicle becomes greater than said computed second inter-vehicle distance threshold or no obstacle is detected ahead of the host vehicle, and the acceleration intent of the driver is detected.

20. An inter-vehicle distance maintenance supporting system for a host vehicle, comprising:
an obstacle detecting means for detecting a state of an obstacle located ahead of the host vehicle,
a first inter-vehicle distance threshold computing means for computing a first inter-vehicle distance threshold based on the state of the obstacle detected with said obstacle detecting means,
a driving operational equipment means for operating the host vehicle by a driver of the host vehicle,
an operational reactive force generating means for generating an operational reactive force for said driving operational equipment means based on said first inter-vehicle distance threshold,
a second inter-vehicle distance threshold computing means for computing a second inter-vehicle distance threshold with a value larger than said first inter-vehicle distance threshold based on the state of the obstacle detected by said obstacle detecting means,
a driving operational equipment state detecting means for detecting an operational state of said driving operational equipment means and an acceleration intent of the driver,
an engine controlling means for controlling an engine torque corresponding to the operational state of said driving operational equipment means detected by said driving operational equipment state detecting means, and
an engine torque correcting means for performing a decrease correction of the engine torque such that the engine torque generated with respect to the operational state is decreased when a distance to the obstacle located ahead of the host vehicle is less than the second inter-vehicle distance threshold before the operational reactive force generating means generates the operational reactive force for said driving operational equipment means,
wherein said decrease correction is suppressed when the decrease correction is performed, such that the decrease correction is reduced gradually over time when the distance to the obstacle located ahead of the host vehicle becomes greater than said second inter-vehicle distance threshold or no obstacle is detected ahead of the host vehicle and said driving operational equipment state detecting means detects the acceleration intent of the driver.

21. The inter-vehicle distance maintenance supporting system according to claim 1, wherein the engine torque is based upon a target acceleration,
wherein, when the decrease correction is performed, the target acceleration differs from the acceleration intent of the driver,
wherein the decrease correction is suppressed by increasing the target acceleration to approach the acceleration intent of the driver.

22. The inter-vehicle distance maintenance supporting system according to claim 21, wherein, when the decrease correction is suppressed by increasing the target acceleration, an amount by which the target acceleration is increased is limited.

23. The inter-vehicle distance maintenance supporting system according to claim 1, wherein the decrease correction is suppressed when the driver operates the operational equipment to exhibit an intent for increased acceleration.

* * * * *